United States Patent
Sasaki et al.

(10) Patent No.: US 10,850,444 B2
(45) Date of Patent: Dec. 1, 2020

(54) METHOD AND APPARATUS FOR FABRICATING THREE-DIMENSIONAL OBJECT

(71) Applicant: RICOH COMPANY, LTD., Tokyo (JP)

(72) Inventors: Takafumi Sasaki, Kanagawa (JP); Soyoung Park, Kanagawa (JP); Hiroyuki Miyata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 814 days.

(21) Appl. No.: 15/186,731

(22) Filed: Jun. 20, 2016

(65) Prior Publication Data

US 2016/0368214 A1   Dec. 22, 2016

(30) Foreign Application Priority Data

Jun. 22, 2015 (JP) .................................. 2015-124650
Aug. 25, 2015 (JP) .................................. 2015-166209

(51) Int. Cl.
| | | |
|---|---|---|
| *B29C 64/165* | (2017.01) | |
| *B29C 67/00* | (2017.01) | |
| *B33Y 10/00* | (2015.01) | |
| *B33Y 30/00* | (2015.01) | |
| *B33Y 50/02* | (2015.01) | |
| *B29C 64/214* | (2017.01) | |

(52) U.S. Cl.
CPC .......... *B29C 64/165* (2017.08); *B29C 64/214* (2017.08); *B29C 67/0081* (2013.01); *B33Y 10/00* (2014.12); *B33Y 30/00* (2014.12); *B33Y 50/02* (2014.12)

(58) Field of Classification Search
CPC ...... B29C 67/0081; B33Y 10/00; B33Y 30/00
See application file for complete search history.

(56) References Cited

U.S. PATENT DOCUMENTS 6,036,777 A * 3/2000 Sachs .................. B05C 19/04
118/56
2015/0343533 A1   12/2015 Park et al.

FOREIGN PATENT DOCUMENTS

| JP | 6-218712 | 8/1994 |
| JP | 2000-336403 | 12/2000 |

(Continued)

*Primary Examiner* — Jacob T Minskey
*Assistant Examiner* — Melody Tsui
(74) *Attorney, Agent, or Firm* — Oblon, McClelland, Maier & Neustadt, L.L.P.

(57) ABSTRACT

A three-dimensional fabrication apparatus includes a fabrication chamber, a liquid discharge device, a vibration applicator, and a controller. In the fabrication chamber, powder is layered to form a powder layer, the powder of the powder layer is bonded together in a desired shape to form a layered fabrication object, and another layered fabrication object is laminated on the layered fabrication object. The liquid discharge device discharges a fabrication liquid onto the powder in the fabrication chamber. The vibration applicator applies vibration to the powder layer onto which the fabrication liquid is discharged from the liquid discharge device. The controller controls and drives the vibration applicator to apply vibration to the powder layer when the liquid discharge device discharges the fabrication liquid onto the powder layer to form the layered fabrication object.

13 Claims, 48 Drawing Sheets

(56) References Cited

FOREIGN PATENT DOCUMENTS

| | | | |
|---|---|---|---|
| JP | 2000336403 A | * 12/2000 | |
| JP | 2004-143581 | 5/2004 | |
| JP | 2005-014556 | 1/2005 | |
| JP | 2015-227021 | 12/2015 | |
| WO | WO93/25336 A1 | 12/1993 | |
| WO | WO-9325336 A1 | * 12/1993 | ............. B29C 41/36 |

* cited by examiner

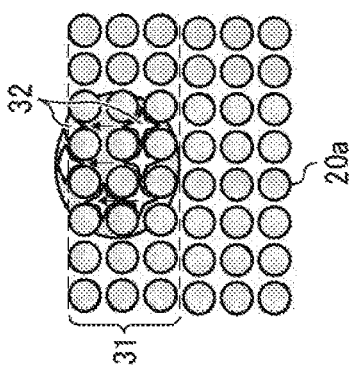
FIG. 11A
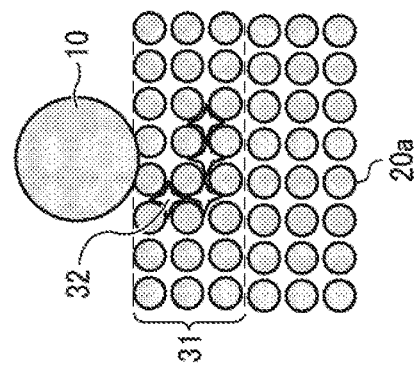
FIG. 11B
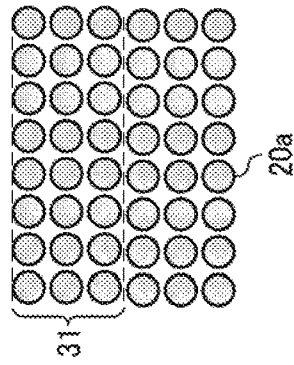
FIG. 11C
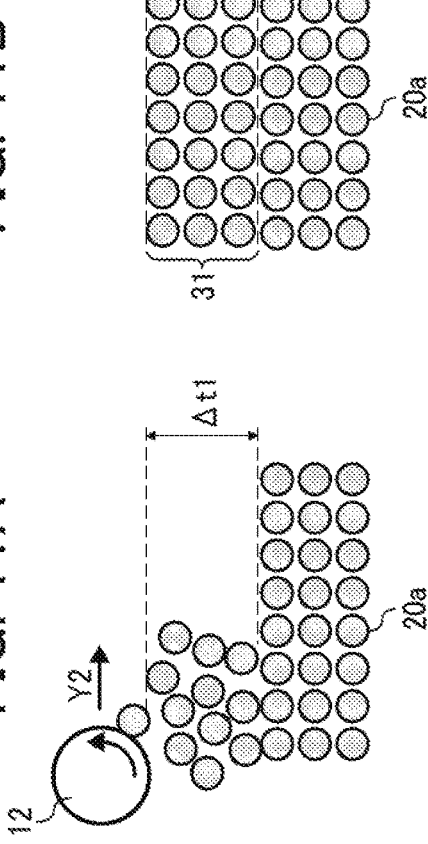
FIG. 11D
FIG. 11E
FIG. 11F
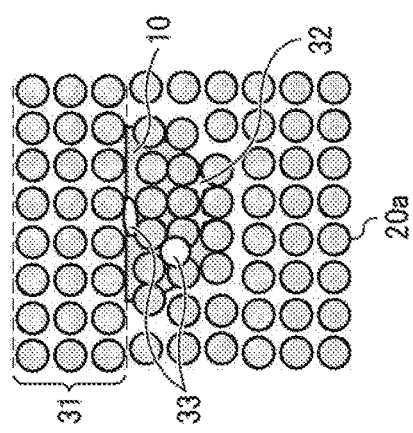
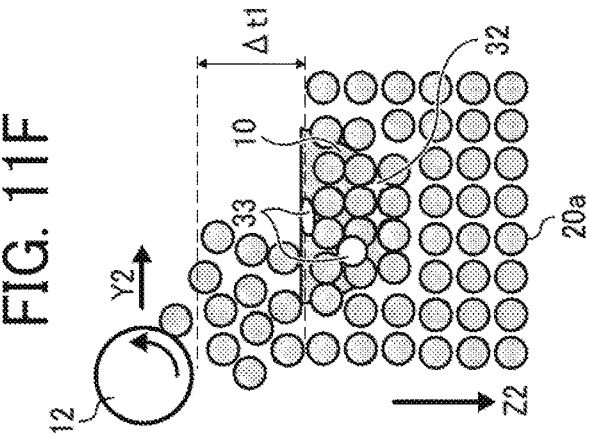
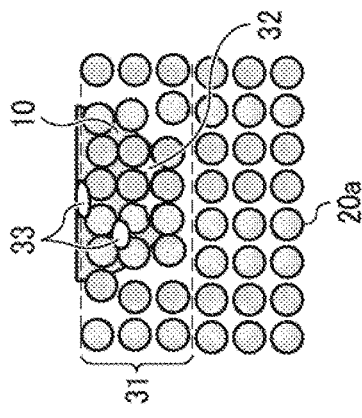
FIG. 11G

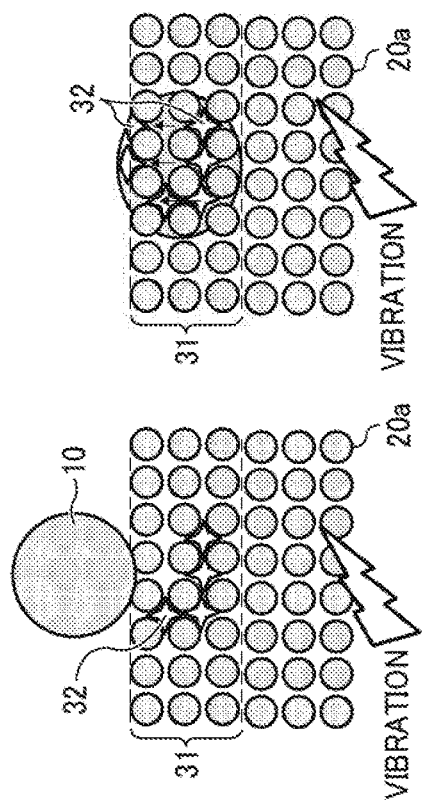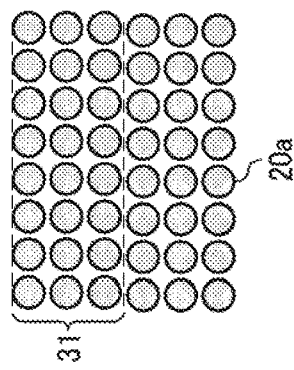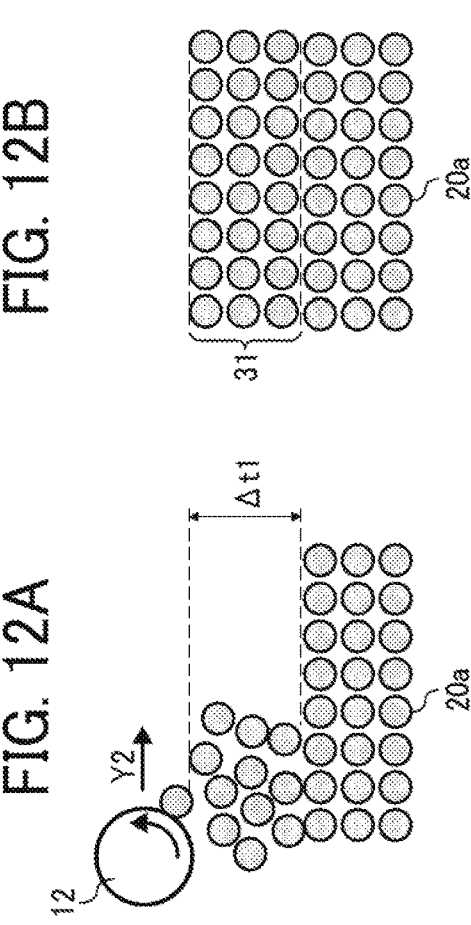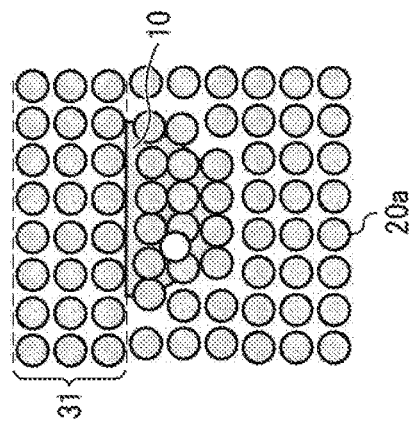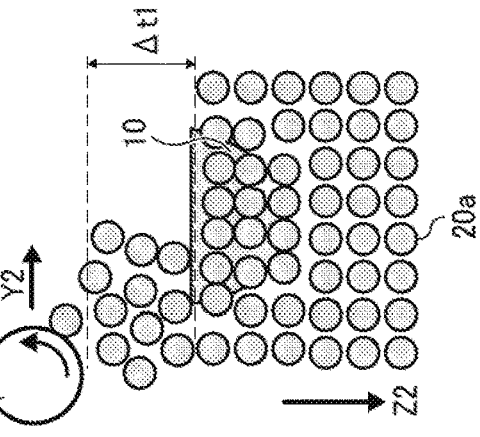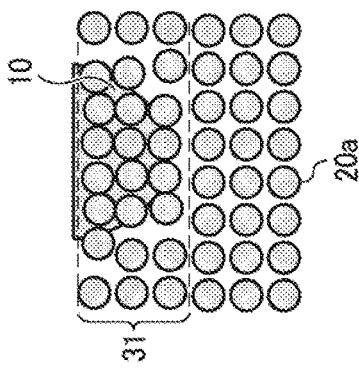

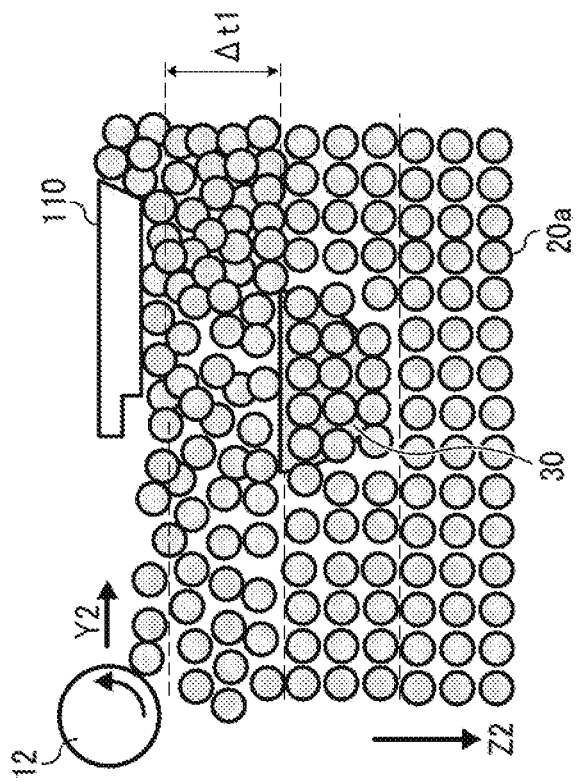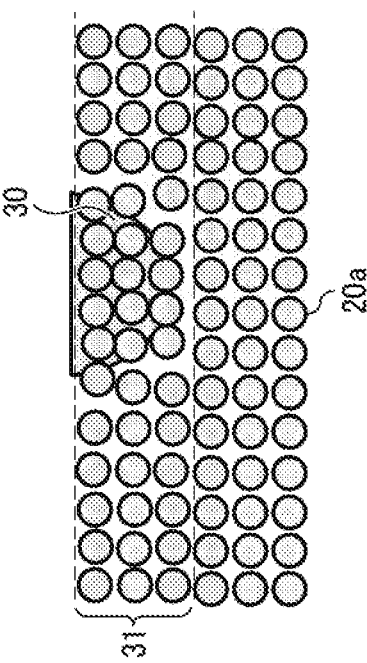

METHOD AND APPARATUS FOR FABRICATING THREE-DIMENSIONAL OBJECT

CROSS-REFERENCE TO RELATED APPLICATIONS

This patent application is based on and claims priority pursuant to 35 U.S.C. § 119(a) to Japanese Patent Application Nos. 2015-124650, filed on Jun. 22, 2015, and 2015-166209, filed on Aug. 25, 2015, in the Japan Patent Office, the entire disclosure of each of which is hereby incorporated by reference herein.

BACKGROUND

Technical Field

Aspects of the present disclosure relate to a method and an apparatus for fabricating a three-dimensional object.

Related Art

A solid (three-dimensional) fabricating apparatus uses, for example, a lamination fabrication method to fabricate a solid (three-dimensional) object. In this method, for example, a flattened metal or non-metal powder is formed in a shape of layer on a fabrication stage, and fabrication liquid is discharged from a head to a layered powder (referred to as "powder layer") on the fabrication stage to form a layered fabrication object (referred to as "fabrication layer") in which powder particles are bonded together. A step of forming another powder layer on the fabrication layer to reform the fabrication layer is repeated to laminate the fabrication layers one on another, thus fabricating a three-dimensional object.

SUMMARY

In an aspect of this disclosure, there is provided a three-dimensional fabrication apparatus that includes a fabrication chamber, a liquid discharge device, a vibration applicator, and a controller. In the fabrication chamber, powder is layered to form a powder layer, the powder of the powder layer is bonded together in a desired shape to form a layered fabrication object, and another layered fabrication object is laminated on the layered fabrication object. The liquid discharge device discharges a fabrication liquid onto the powder in the fabrication chamber. The vibration applicator applies vibration to the powder layer onto which the fabrication liquid is discharged from the liquid discharge device. The controller controls and drives the vibration applicator to apply vibration to the powder layer when the liquid discharge device discharges the fabrication liquid onto the powder layer to form the layered fabrication object.

In another aspect of this disclosure, there is provided a three-dimensional fabrication method that includes layering powder to form a powder layer, bonding the powder of the powder layer together in a desired shape to form a layered fabrication object, laminating another layered fabrication object on the layered fabrication object, discharging a fabrication liquid onto the powder in the fabrication chamber, applying vibration to the powder layer onto which the fabrication liquid is discharged, and driving the vibration applicator to apply vibration to the powder layer when the fabrication liquid is discharged onto the powder layer to form the layered fabrication object.

In yet another aspect of this disclosure, there is provided a three-dimensional fabrication apparatus that includes a fabrication chamber, a liquid discharge device, a flattening unit, and a vibration applicator. In the fabrication chamber, powder is layered to form a powder layer, the powder of the powder layer is bonded together in a desired shape to form a layered fabrication object, and another layered fabrication object is laminated on the layered fabrication object. The liquid discharge device discharges a fabrication liquid onto the powder in the fabrication chamber. The flattening unit flattens the powder supplied to the fabrication chamber to from the powder layer. The vibration applicator applies vibration to the powder when the powder is supplied to the fabrication chamber. When the vibration applicator applies to vibration to the powder supplied onto a surface of the powder layer, in which the layered fabrication object has been formed, a gap between a contact surface of the vibration applicator to contact the powder and the surface of the powder layer on which the powder is supplied is maximum when the powder is supplied to the powder layer in which at least a lowermost layered fabrication object has been formed.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIGS. 11A to 11G are illustrations of steps from the discharge of fabrication liquid onto a powder layer to the supply of powder to the next layer in a comparative example;

FIGS. 12A to 12G are illustrations of steps from the discharge of fabrication liquid onto a powder layer to the supply of powder to the next layer in the first embodiment;

FIGS. 20A and 20B are illustrations of an example of formation of a thin layer of powder (formation of a powder layer) by a vibration blade and a flattening roller;

Figure 1:
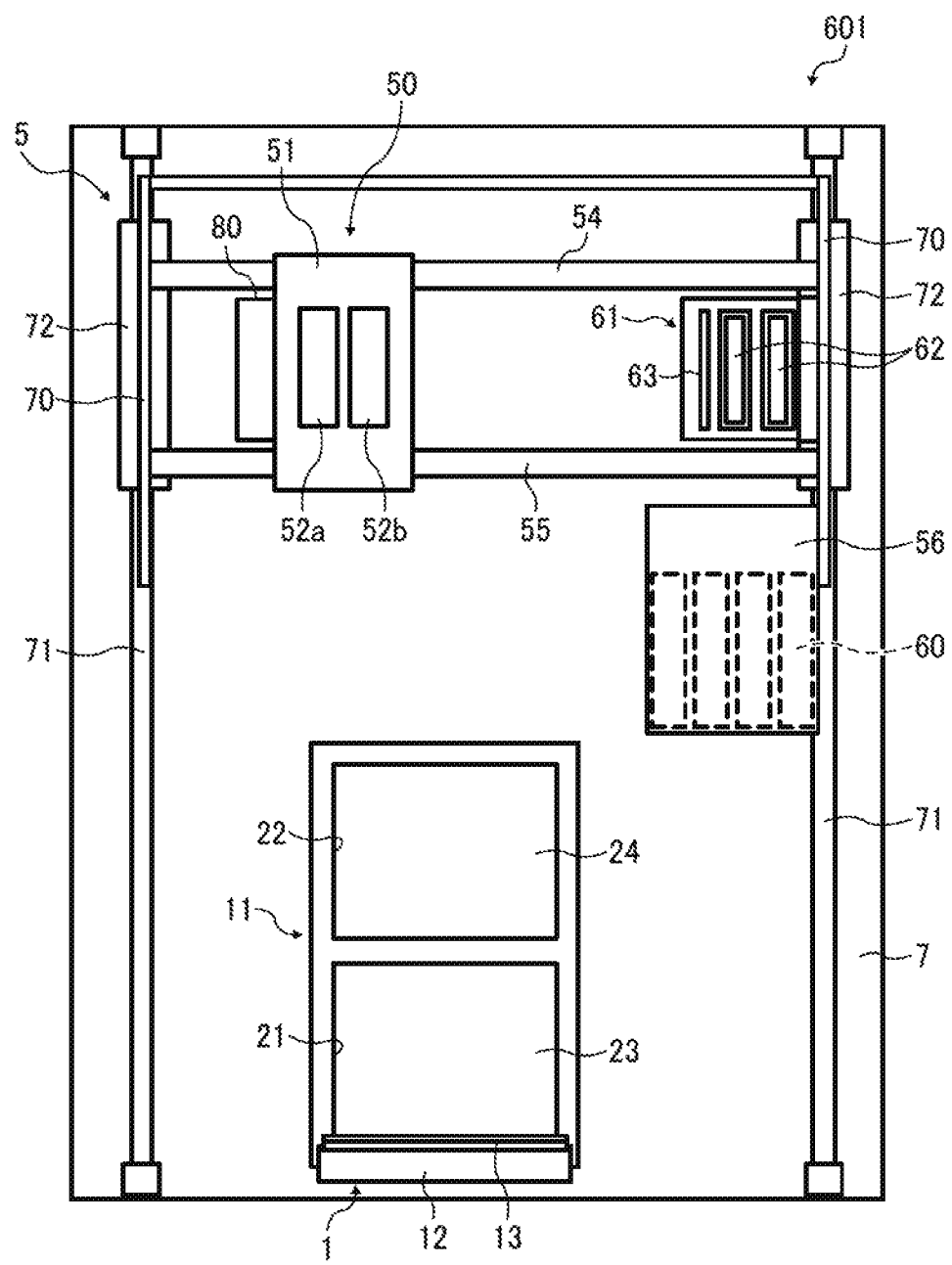
FIG. 1 is a plan view of an example of a three-dimensional fabricating apparatus according to a first embodiment of this disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, wherein like reference numerals designate identical or corresponding parts throughout the several views, exemplary embodiments of the present disclosure are described below. First, an example of a three-dimensional fabricating apparatus according to a first embodiment of this disclosure is described with reference to FIGS. 1 through 5.

Figure 2:
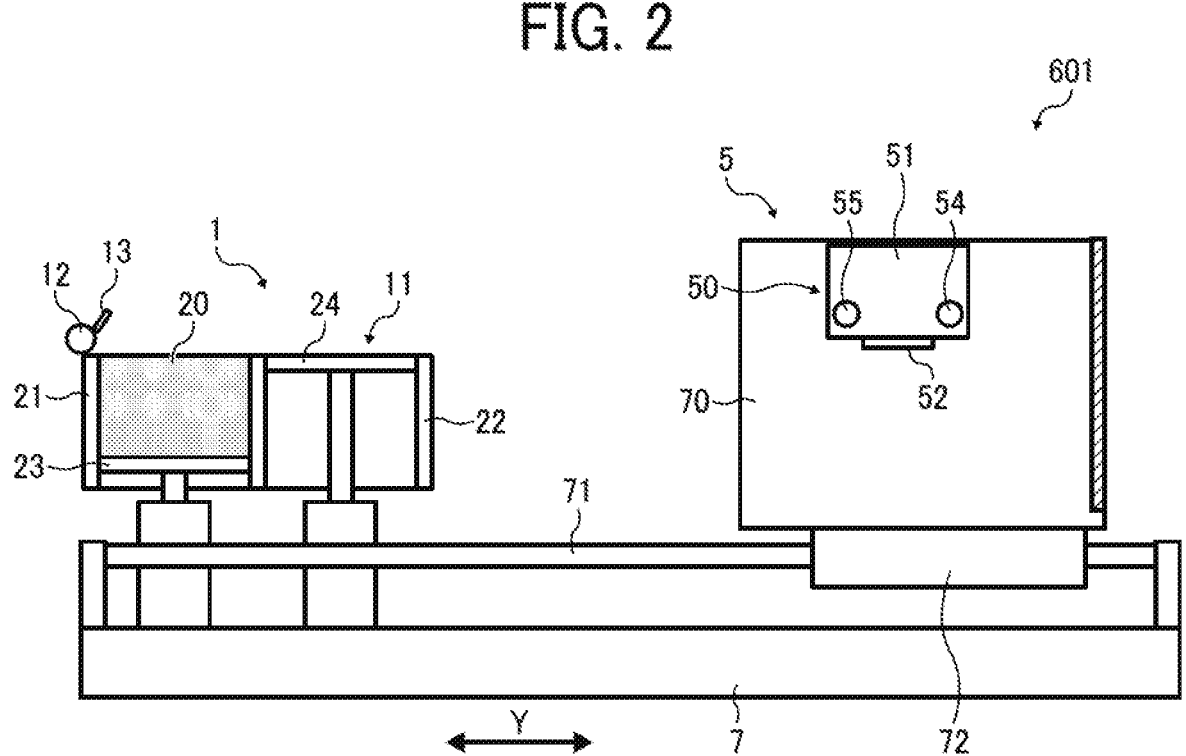
FIG. 2 is a side view of the three-dimensional fabricating apparatus of FIG. 1.
Figure 3:
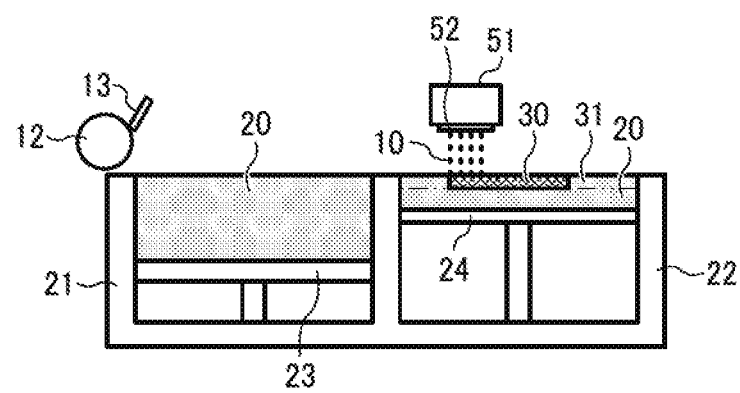
FIG. 3 is a cross-sectional view of a fabrication section of the three-dimensional fabricating apparatus of FIG. 1.
Figure 4:
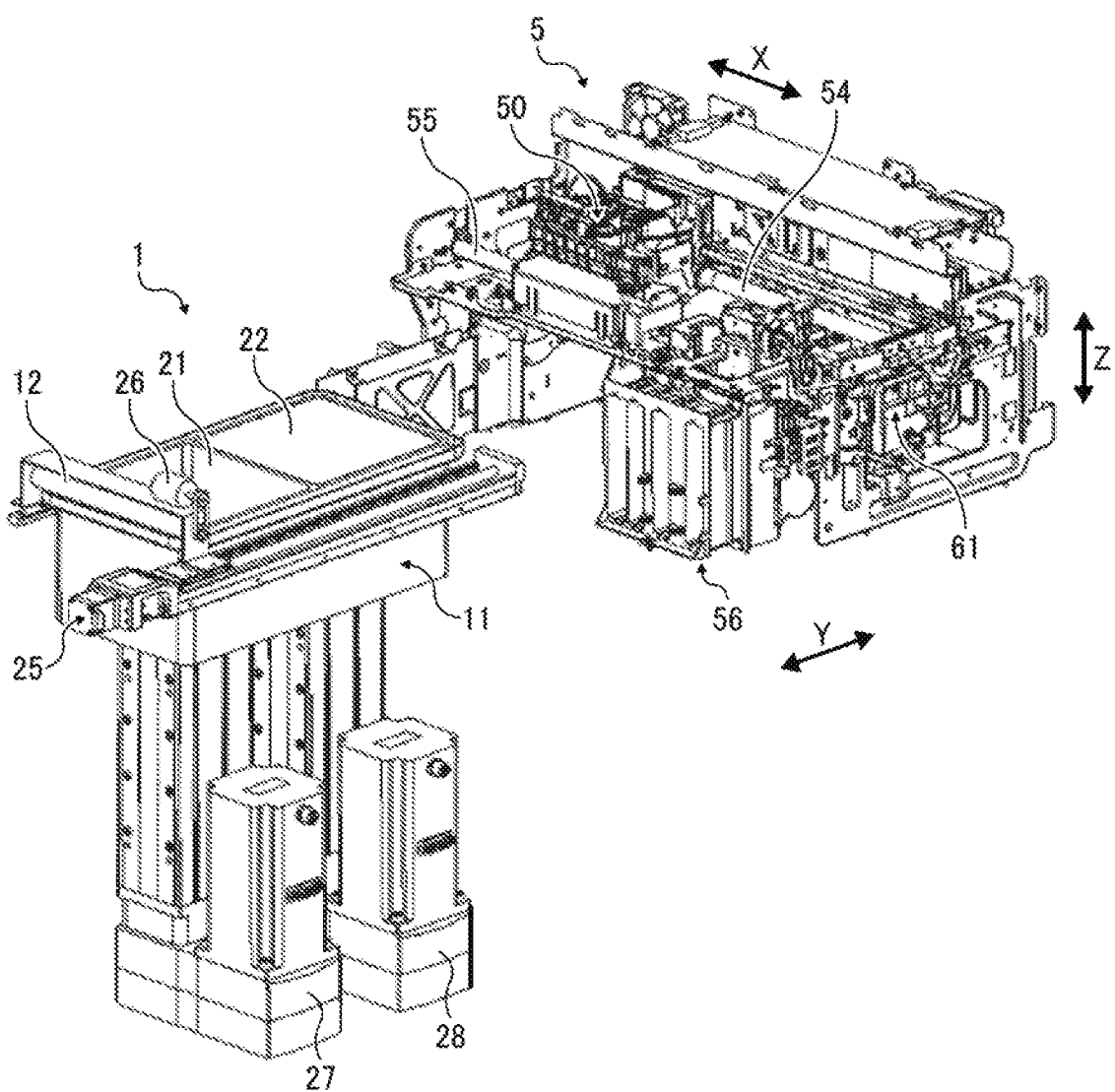
FIG. 4 is a partial perspective view of an example of a configuration of the three-dimensional fabricating apparatus according to the first embodiment.
Figure 5:
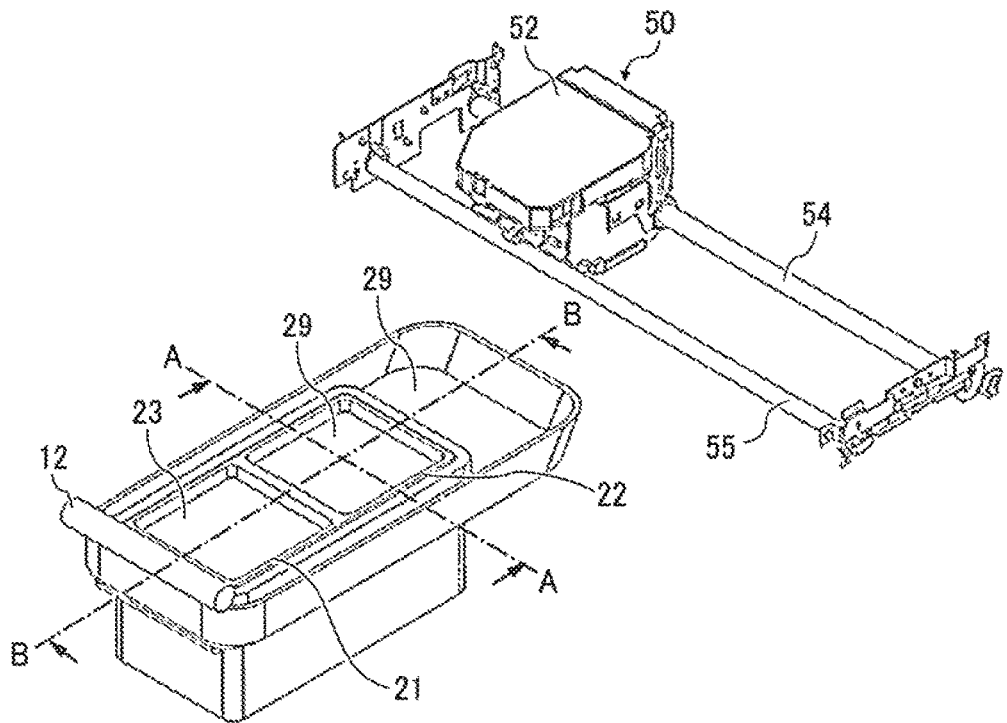
FIG. 5 is a perspective view of another example of the configuration of the fabricating section.

FIG. 1 is a plan view of the three-dimensional fabricating apparatus according to the first embodiment of this disclosure. FIG. 2 is a cross-sectional view of a fabrication section of the three-dimensional fabricating apparatus of FIG. 1. FIG. 3 is a cross-sectional view of the fabrication section of FIG. 2. In FIG. 3, a state of the fabricating section during fabrication is illustrated. FIG. 4 is a partial perspective view of an example of a configuration of the three-dimensional fabricating apparatus according to the first embodiment of the present disclosure. FIG. 5 is a perspective view of another example of the configuration of the fabricating section.

In this embodiment, a three-dimensional fabricating apparatus 601 is a powder fabricating apparatus (also referred to as a powder fabricating apparatus). The three-dimensional fabricating apparatus 601 includes a fabrication section 1 and a fabrication unit 5. The fabrication section 1 forms a fabrication layer 30 that is a layered fabrication object in which powders are bonded together. The fabrication unit 5 fabricates a three-dimensional object by discharging fabrication liquid 10 onto a powder layer 31 being powder overlaid in layers in the fabrication section 1.

The fabrication section 1 includes a powder chamber 11 and a flattening roller 12 as a rotary body that is a flattening unit (recoater). Note that the flattening unit may be, for example, a plate member (blade) instead of the rotary body.

The powder chamber 11 includes a supply chamber 21 to supply powder 20 and a fabrication chamber 22 in which fabrication layers 30 are laminated to fabricate an object.

As illustrated in FIG. 5, the powder chamber 11 may include a surplus powder chamber 29 to store a surplus of the powder 20, which falls without forming the powder layer 31, of the powder 20 transferred and supplied by the flattening roller 12 to form the powder layer 31.

A bottom portion of the supply chamber 21 serves as a supply stage 23 and is movable upward and downward in a vertical direction (height direction). Similarly, a bottom portion of the fabrication chamber 22 serves as a fabrication stage 24 and is movable upward and downward in the vertical direction (height direction). A three-dimensional object in which the fabrication layers 30 are laminated is fabricated on the fabrication stage 24.

For a configuration including the surplus powder chamber 29, a suction unit to suck the powder 20 may be disposed on a bottom face of the surplus powder chamber 29 or the surplus powder chamber 29 may be removable in a simple manner.

For example, as illustrated in FIG. 4, a motor 27 moves the supply stage 23 upward and downward along a direction indicated by arrow Z. Likewise, a motor 28 moves the fabrication stage 24 upward and downward along a direction indicated by arrow Z.

The flattening roller 12 transfers and supplies the powder 20, which has been supplied on the supply stage 23 of the supply chamber 21, to the fabrication chamber 22 and smooths and flattens the surface of a layer of the powder 20 to form the powder layer 31.

The flattening roller 12 is disposed to be relatively reciprocally movable with respect to a stage surface (a surface on which powder 20 is stacked) of the fabrication stage 24 along a direction indicated by arrow Y in FIG. 2, which is a direction along the stage surface of the fabrication stage 24. The flattening roller 12 is moved by a reciprocal moving assembly 25. The flattening roller 12 is driven to rotate by a motor 26.

The fabrication unit 5 includes a liquid discharge unit 50 to discharge fabrication liquid 10 to the powder layer 31 on the fabrication stage 24.

The liquid discharge unit 50 includes a carriage 51 and two liquid discharge heads (hereinafter referred to as simply "head(s)") 52a and 52b as liquid discharge devices mounted on the carriage 51. In FIG. 1, two liquid discharge heads are illustrated. However, in some embodiments, the number of liquid discharge heads is one or three or more.

The carriage 51 is movably held with guides 54 and 55. The guides 54 and 55 are held with lateral side plates 70 so as to be movable upward and downward.

Via a pulley and a belt, an X-direction scanning motor constituting an X-direction scanning assembly 550 reciprocally moves the carriage 51 along the direction indicated by arrow X that is a main scanning direction. Note that, hereinafter, the direction indicated by arrow X is simply referred to as "X direction", and the same applies to "Y direction" and "Z direction".

Each of the two heads 52a and 52b (hereinafter, referred to as "heads 52" unless distinguished) includes two nozzle rows, each including a plurality of nozzles arrayed to discharge fabrication liquid. Two nozzle rows of one head 52a discharge, for example, cyan fabrication liquid and magenta fabrication liquid. Two nozzle rows of the other head 52a discharge, for example, yellow fabrication liquid and black fabrication liquid. Note that the configuration of head is not limited to the above-described configuration of the heads 52 and may be any other suitable configuration.

A tank mount 56 mounts a plurality of tanks 60 containing cyan fabrication liquid, magenta fabrication liquid, yellow fabrication liquid, and black fabrication liquid. The fabrication liquids are supplied to the heads 52a and 52b through, e.g., supply tubes.

Further, a maintenance assembly 61 to maintain and recover the heads 52 of the liquid discharge unit 50 in good condition is disposed at one end in the X direction.

The maintenance assembly 61 includes caps 62 and a wiper 63. The caps 62 are brought into close contact with nozzle faces (nozzle formed faces) of the heads 52, and fabrication liquid is sucked from nozzles. Thus, powder clogged at the nozzles and thickened fabrication liquid is discharged. Then, the wiper 63 wipes the nozzle faces to form menisci in the nozzles (with the interiors of the nozzles being in negative pressure state). When fabrication liquid is not discharged, the maintenance assembly 61 covers the nozzle faces of the heads 52 with the caps 62 to prevent incorporation of powder 20 into nozzles and drying of the fabrication liquid 10.

The fabrication unit 5 includes a slider portion 72 slidably supported on a guide 71 above a base 7. The entire fabrication unit 5 is reciprocally movable in the Y direction perpendicular to the X direction. The entire fabrication unit 5 is reciprocally moved along the Y direction by the Y-direction scanning assembly 552.

The liquid discharge unit 50 is disposed to be movable upward and downward along the Z direction together with the guides 54 and 55. A Z-direction elevation assembly 551 moves the liquid discharge unit 50 upward and downward along the Z direction.

In the following, the fabrication section 1 is further described. Note that, in the following description, the configuration including the surplus powder chamber 29 is described.

The powder chamber 11 has a box shape and includes three chambers, the supply chamber 21, the fabrication chamber 22, and the surplus powder chamber 29, each of which is open at the upper side thereof. The supply stage 23 and the fabrication stage 24 are arranged inside the supply chamber 21 and the fabrication chamber 22, respectively, so as to be movable upward and downward.

Lateral faces of the supply stage 23 are disposed to contact inner lateral faces of the supply chamber 21. Lateral faces of the fabrication stage 24 are disposed to contact inner lateral faces of the fabrication chamber 22. The upper faces of the supply stage 23 and the fabrication stage 24 are held horizontally.

The surplus powder chamber 29 may be disposed adjacent to the fabrication chamber 22 in an area surrounding the supply chamber 21 and the fabrication chamber 22 (see FIG. 5).

For the configuration including the surplus powder chamber 29, a surplus of the powder 20 transferred and supplied with the flattening roller 12 in formation of a powder layer 31 falls to the surplus powder chamber 29. Surplus powder 20 having fallen to the surplus powder chamber 29 is returned to a powder supplier 554 that supplies powder 20 to the supply chamber 21.

The powder supplier 554 is disposed above the supply chamber 21. In an initializing operation of fabrication or when the amount of powder in the supply chamber 21 decreases, powder in a tank constituting the powder supplier 554 is supplied to the supply chamber 21. Examples of a powder transporting method for supplying powder include a screw conveyor method utilizing a screw and an air transport method utilizing air.

The flattening roller 12 transfers and supplies powder 20 from the supply chamber 21 to the fabrication chamber 22 and smooths and flattens the surface of the powder 20 to form a powder layer 31 as a layered powder having a desired thickness.

The flattening roller 12 is a bar longer than an inside dimension of the fabrication chamber 22 and the supply chamber 21 (that is, a width of a portion to which powder is supplied or stored). The reciprocal moving assembly 25 reciprocally moves the flattening roller 12 in the Y direction (a sub-scanning direction) along the stage surface.

The flattening roller 12, while being rotated by the motor 26, horizontally moves to pass an area above the supply chamber 21 and the fabrication chamber 22 from the outside of the supply chamber 21. Accordingly, the powder 20 is transferred and supplied onto the fabrication chamber 22, and the flattening roller 12 flattens the powder 20 while passing over the fabrication chamber 22, thus forming the powder layer 31.

As illustrated in FIG. 2, a powder removal plate 13 serving as a powder remover to remove the powder 20 attached to the flattening roller 12 is disposed in contact with a circumferential surface of the flattening roller 12.

The powder removal plate 13 moves together with the flattening roller 12 in contact with the circumferential surface of the flattening roller 12. The powder removal plate 13 may be oriented in any direction to follow or counter a direction of rotation of the flattening roller 12 to flatten the powder 20.

Figure 6:
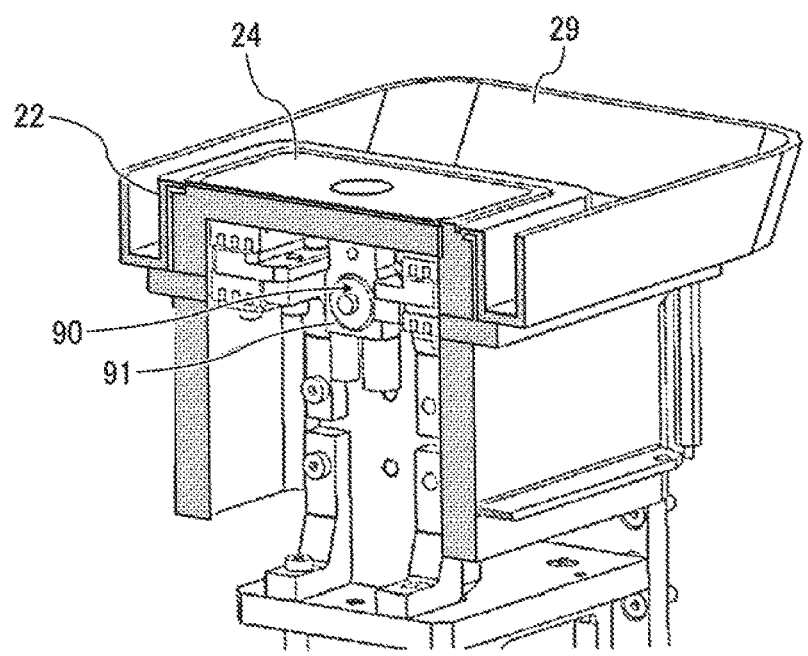
FIG. 6 is a perspective view of the fabrication section with a cross section cut along line A-A of FIG. 5.
Figure 7:
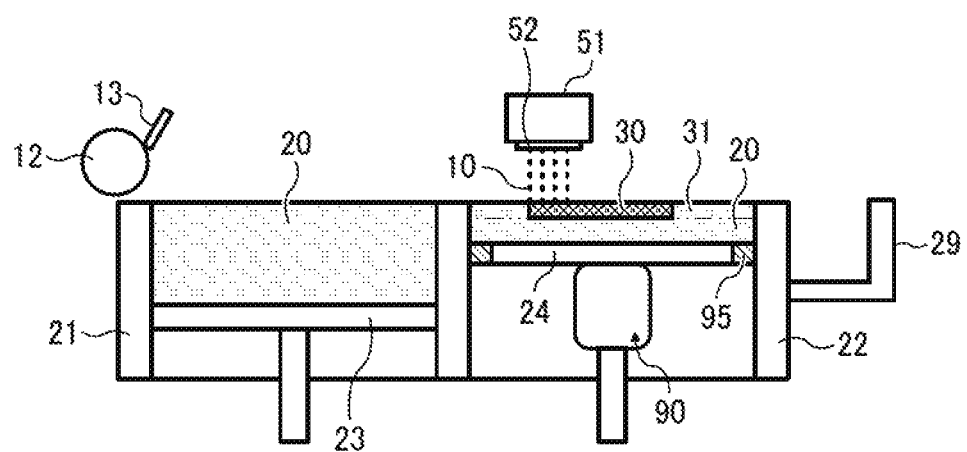
FIG. 7 is a cross-sectional view of the fabrication section cut along line B-B of FIG. 5.

Next, a first vibration applicator according to this embodiment is described with reference to FIGS. 6 and 7. FIG. 6 is a perspective view of the fabrication section with a cross section cut along line A-A of FIG. 5. FIG. 7 is a cross-sectional view of the fabrication section cut along line B-B of FIG. 5.

A vibration generator 90 as the first vibration applicator is disposed on a lower surface of the fabrication stage 24. The vibration generator 90 includes, for example, a vibrator 91, such as a small-size air vibrator or a piezoelectric vibrator, and an electric motor.

The vibrator 91 is preferably driven so that the fabrication stage 24 vibrates with an amplitude of from about 10 μm to about 30 μm and a vibration frequency of from about 100 Hz to about 300 Hz. Note that an elastic member 95, such as urethane, is disposed between the fabrication stage 24 and a wall of the fabrication chamber 22 so that the fabrication stage 24 is movable upward and downward and leakage of the powder 20 is prevented.

Figure 8:
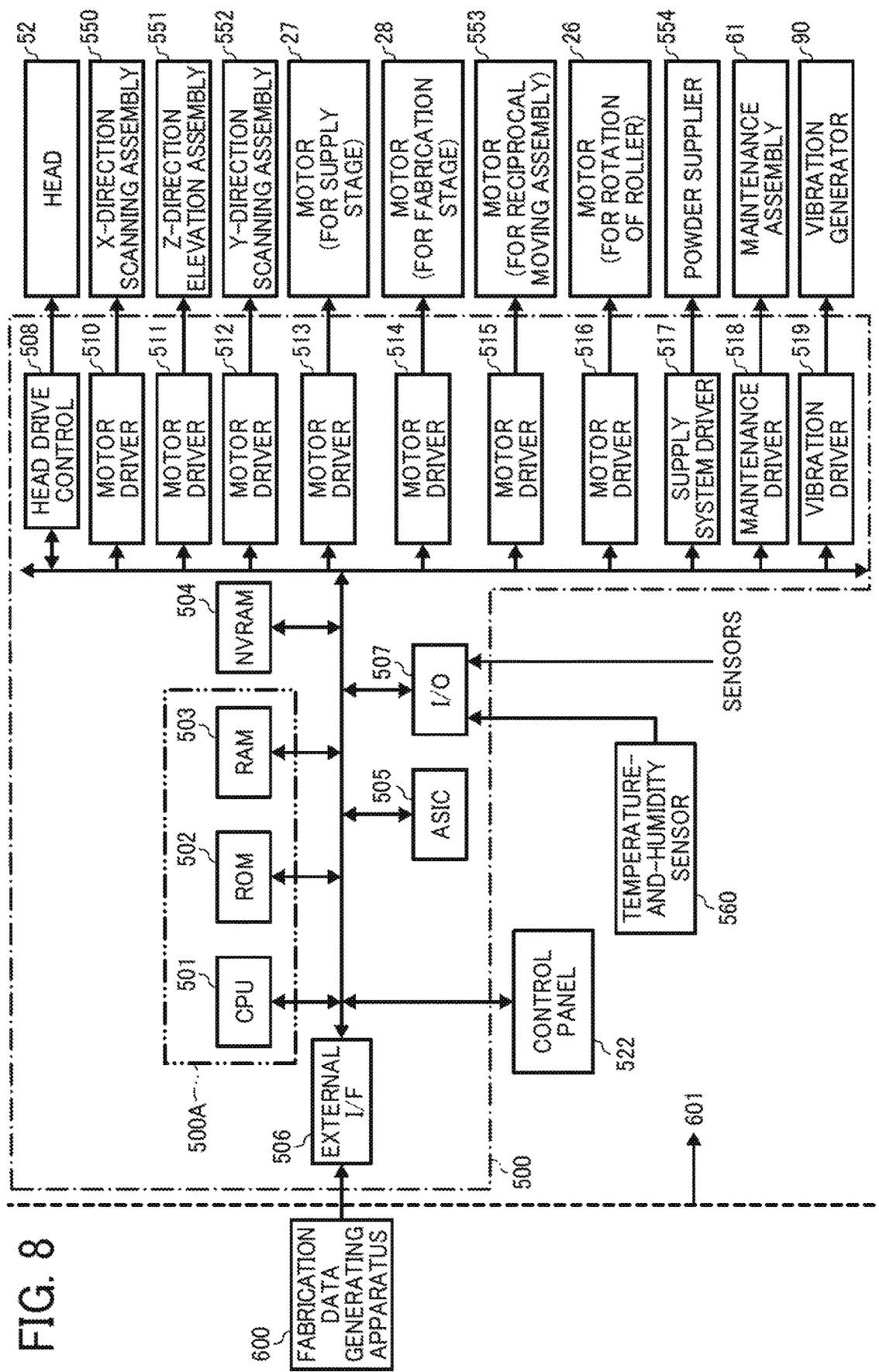
FIG. 8 is a block diagram of a controller of the three-dimensional fabricating apparatus in the first embodiment.

Next, an outline of a controller of the three-dimensional fabricating apparatus in the first embodiment is described with reference to FIG. 8. FIG. 8 is a block diagram of a controller of the three-dimensional fabricating apparatus 601 according to the first embodiment.

A controller 500 serving as the controller includes a main controller 500A. The main controller 500A includes a central processing unit (CPU) 501, a read-only memory (ROM) 502, a random access memory (RAM) 503, a non-volatile random access memory (NVRAM) 504, and an application-specific integrated circuit (ASIC) 505. The CPU 501 manages the control of the entire three-dimensional fabricating apparatus 601. The ROM 502 stores programs executed by the CPU 501 and other fixed data. The programs stored in the ROM 502 include programs for causing the CPU 501 to execute control of three-dimensional fabricating operation which includes control according to embodiments of the present disclosure. The RAM 503 temporarily stores fabrication data and other data.

The NVRAM 504 retains data even when the apparatus is powered off. The ASIC 505 performs image processing, such as processing of various signals on image data, and processes input and output signals to control the entire apparatus.

The controller 500 also includes an interface (I/F) 506 to send and receive data and signals used in receiving fabrication data from an external fabrication data generation apparatus 600. The fabrication data generating apparatus 600 generates fabrication data in which a final-form object is sliced in multiple fabrication layers, and is constituted of an information processing apparatus, such as a personal computer.

The controller 500 includes an input-output (I/O) unit to receive detection signals of various sensors.

The controller 500 includes a head drive controller 508 to control driving of each head 52 of the liquid discharge unit 50.

The controller 500 includes a motor driver 510 and a motor driver 512. The motor driver 510 drives a motor constituting the X-direction scanning assembly 550 to move the carriage 51 of the liquid discharge unit 50 in the X direction (the main scanning direction). The motor driver 512 drives a motor constituting the Y-direction scanning assembly 552 to move the fabrication unit 5 in the Y direction (the sub-scanning direction).

The controller 500 includes a motor driver 511 to drive a motor constituting the Z-direction elevation assembly 551 to move (elevate) the carriage 51 of the liquid discharge unit 50 upward and downward in the Z direction. Note that the fabrication unit 5 may be elevated in the direction indicated by arrow Z.

The controller 500 includes a motor driver 513 and a motor driver 514. The motor driver 513 drives the motor 27 to elevate the supply stage 23 upward and downward. The motor driver 514 drives the motor 28 to elevate the fabrication stage 24 upward and downward.

The controller 500 includes a motor driver 515 and a motor driver 516. The motor driver 515 drives a motor 553 of the reciprocal moving assembly 25 to move the flattening roller 12. The motor driver 516 includes the motor 26 to rotate the flattening roller 12.

The controller 500 includes a supply system driver 517 and a maintenance driver 518. The supply system driver 517 drives the powder supplier 554 to supply powder 20 to the supply chamber 21. The maintenance driver 518 drives the maintenance assembly 61 of the liquid discharge unit 50.

The controller 500 includes a vibration driver 519 to drive the vibrator 91 of the vibration generator 90 to vibrate the fabrication stage 24, thus applying vibration to the powder layer 31 on which fabrication liquid on the fabrication stage 24 is landed.

The I/O unit 507 receives detection signals from, e.g., a temperature-and-humidity sensor 560 to detect temperature and humidity as environmental conditions of the apparatus and detection signals from other sensors.

The controller 500 is connected to a control panel 522 for inputting and displaying information necessary to the three-dimensional fabricating apparatus 601.

Note that the fabrication data generation apparatus 600 and the three-dimensional fabricating apparatus (powder lamination fabrication apparatus) 601 constitutes a fabrication system according to an embodiment of the present disclosure.

Next, a flow of fabrication in the first embodiment is described with reference to FIGS. 9A through 9E. FIGS. 9A through 9E are illustrations of the fabrication section 1 in the first embodiment.

First, a description is given of a state in which a first fabrication layer 30 is formed on the fabrication stage 24 of the fabrication chamber 22.

Figure 9A:
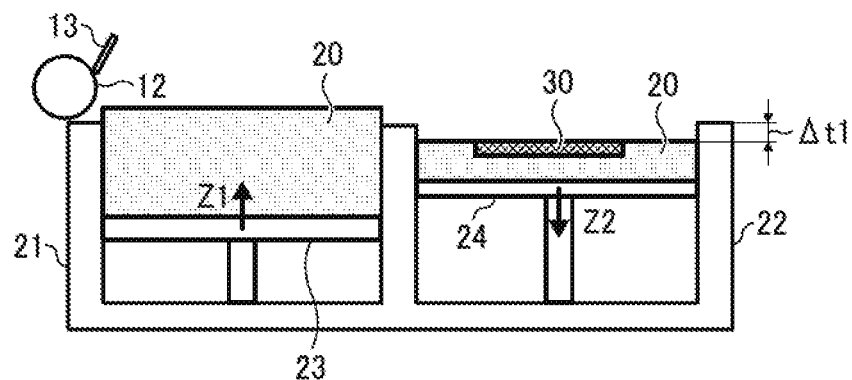
FIGS. 9A through 9E are illustrations of a flow of fabrication in the first embodiment.

When a second fabrication layer 30 is formed on the first fabrication layer 30, as illustrated in FIG. 9A, the supply stage 23 of the supply chamber 21 moves upward in a direction indicated by arrow Z1, and the fabrication stage 24 of the fabrication chamber 22 moves downward in a direction indicated by arrow Z2.

At this time, a downward movement distance of the fabrication stage 24 is set so that a distance between an upper surface of the fabrication chamber 22 and a lower portion (lower tangential portion) of the flattening roller 12 is Δt1. The distance Δt1 corresponds to the thickness (lamination pitch) of the powder layer 31 to be formed next. The distance Δt1 is preferably about several tens μm to about 300 μm.

Figure 9B:
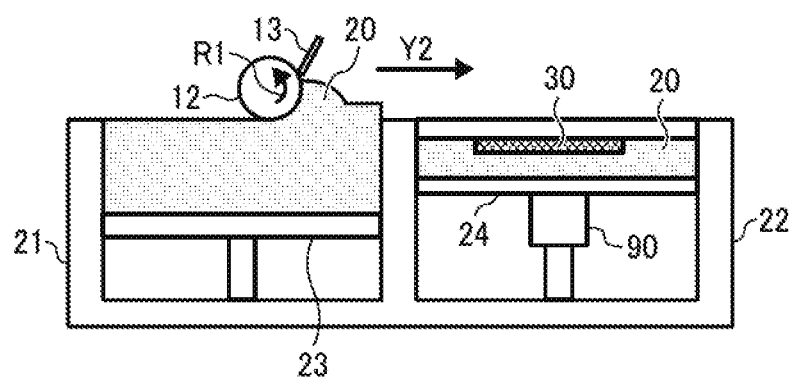

Next, as illustrated in FIG. 9B, by moving the flattening roller 12 in a direction indicated by arrow Y2 toward the fabrication chamber 22 while rotating the flattening roller 12 in a reverse direction (indicated by arrow R1), powder 20 upper than the level of a top face of the supply chamber 21 is transferred and supplied to the fabrication chamber 22 (powder supply).

Figure 9C:
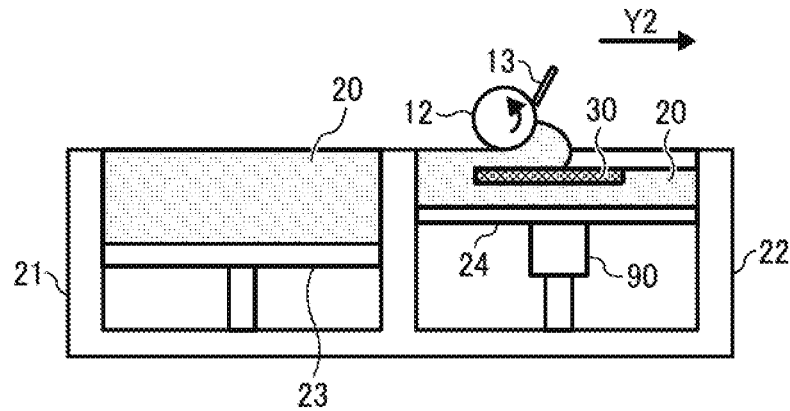
Figure 9D:
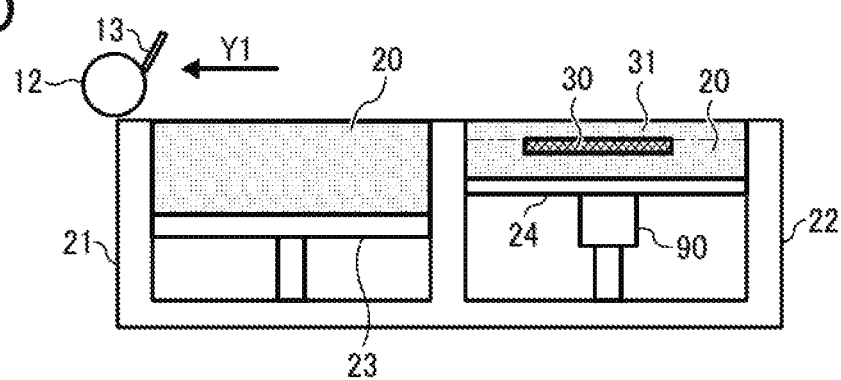

As illustrated in FIG. 9C, the flattening roller 12 is moved in parallel to the stage surface of the fabrication stage 24 of the fabrication chamber 22. As illustrated in FIG. 9D, a powder layer 31 having a thickness of Δt1 is formed on the fabrication layer 30 of the fabrication stage 24 (flattening). At this time, the surplus powder 20, which has not been used for the formation of the powder layer 31, falls into the surplus powder chamber 29.

After the powder layer 31 is formed, as illustrated in FIG. 9D, the flattening roller 12 is moved in the direction indicated by arrow Y1 and returned to an initial position (original position).

Here, the flattening roller 12 is movable while maintaining a constant distance between the fabrication chamber 22 and the level of the top face of the supply chamber 21. Such a configuration allows formation of a uniform thickness Δt1 of the powder layer 31 on the fabrication chamber 22 or the fabrication layer 30 already formed while transporting the powder 20 to an area above the fabrication chamber 22 with the flattening roller 12.

Figure 9E:
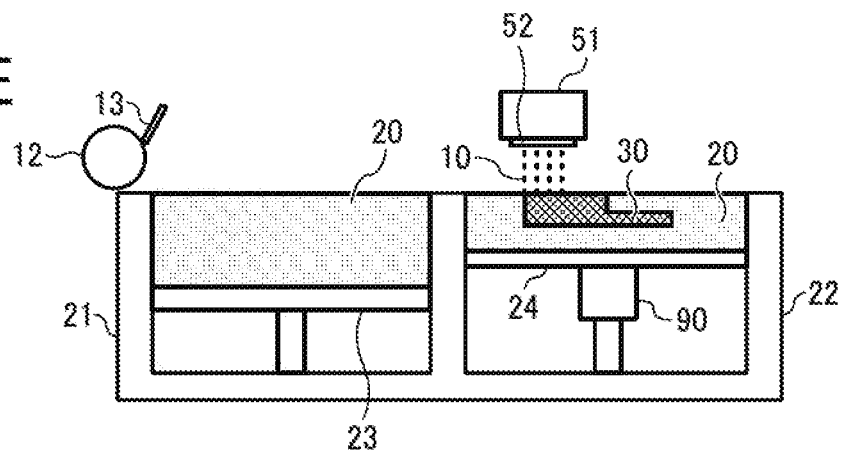

Then, as illustrated in FIG. 9E, droplets of fabrication liquid 10 are discharged from the heads 52 of the liquid discharge unit 50 to form and laminate a desired shape of the next fabrication layer 30 on the powder layer 31 (fabrication). At this time, when the vibrator 91 of the vibration generator 90 is driven to form the first fabrication layer 30, vibration is applied to the powder layer 31.

For the fabrication layer 30, for example, when the fabrication liquid 10 discharged from the heads 52 is mixed with the powder 20, adhesives contained in the powder 20 dissolve and bond together. Thus, particles of the powder 20 bind together to form the fabrication layer 30.

Next, the step of forming the powder layer 31 by the above-described powder supply and flattening and the step of discharging the fabrication liquid with the heads 52 are repeated to form a new fabrication layer 30. At this time, a new fabrication layer 30 and the fabrication layer 30 below the new fabrication layer 30 are united to form part of a three-dimensional fabrication object.

Then, the step of forming the powder layer 31 by the powder supply and flattening and the step of discharging the fabrication liquid with the heads 52 are repeated a required number of times to finish the three-dimensional fabrication object (solid fabrication object).

Figure 10:
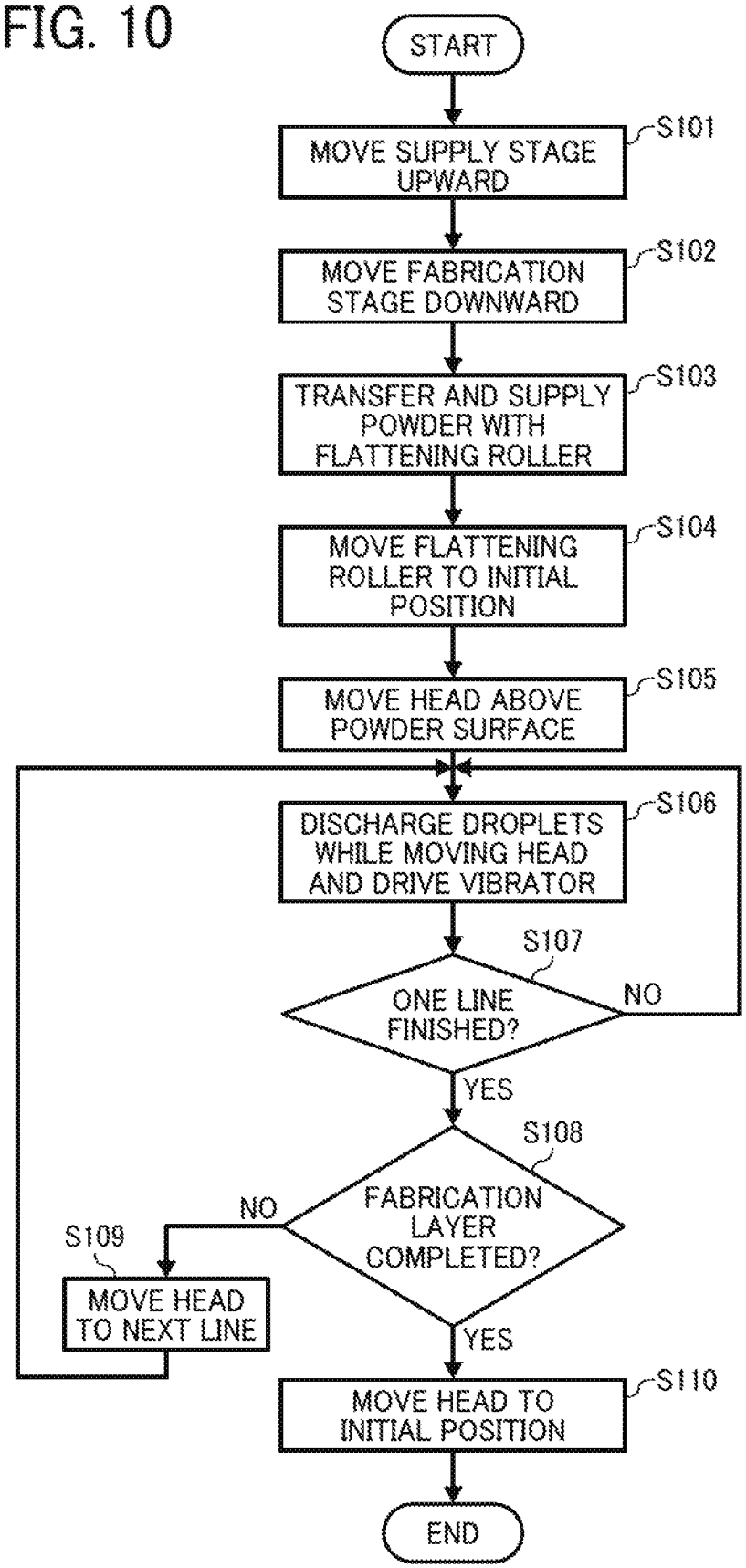
FIG. 10 is a flowchart of a control of fabricating operation performed by the controller according to the first embodiment.

Next, a control of fabricating operation performed by the controller according to the first embodiment is described with reference to FIG. 10.

At S101, the supply stage 23 of the supply chamber 21 is moved upward by a predetermined amount (e.g., 200 μm). At S102, the fabrication stage 24 is moved downward by an amount corresponding to a lamination pitch Δt1 (e.g., 100 μm). Note that the order of S101 and S102 may be reversed.

At S103, the flattening roller 12 is moved toward the fabrication chamber 22 to from the powder layer 31. At S104, the flattening roller 12 is returned to the initial position. Before the flattening roller 12 is returned to the initial position, both the fabrication stage 24 and the supply stage 23 are preferably lowered by a predetermined amount (e.g., 300 μm) so that the flattening roller 12 does not contact the surface of powder. After the flattening roller 12 is returned to the initial position, both the fabrication stage 24 and the supply stage 23 are preferably raised by the predetermined amount.

At S105, the fabrication unit 5 is moved in the Y direction and the carriage 51 is moved in the X direction so that the heads 52 is placed above the fabrication chamber 22 to oppose the fabrication chamber 22. A position of the heads 52 at this time is defined as a fabrication start position. Here, the fabrication start position is the position of one end in single scanning.

While the carriage 51 moves in the X direction, the heads 52 discharge droplets of fabrication liquid a powder layer 31 to fabricate a fabrication layer 30 of a desired shape. When droplets of the fabrication liquid are discharged from the heads 52 onto the powder layer 31 to fabricate the fabrication layer 30, at S106 the vibrator 91 of the vibration generator 90 is driven to apply vibration to the powder layer 31 of the fabrication stage 24.

When one scanning (scanning of one line) of the carriage 51 is finished (YES at S107), at S108 the controller 500 determines whether fabrication of the fabrication layer 30 in the powder layer 31 is completed.

When fabrication of the fabrication layer 30 is not completed (NO at S108), at S109 the fabrication unit 5 is moved for line feed by an amount corresponding to one nozzle row in the Y direction. At S106, droplets of the fabrication liquid are discharged to fabricate the next line. At this time, likewise, when droplets of the fabrication liquid are discharged from the heads 52 onto the powder layer 31 to fabricate the fabrication layer 30, the vibrator 91 of the vibration generator 90 is driven to apply vibration to the powder layer 31 of the fabrication stage 24.

After fabrication of the first fabrication layer 30 is completed (YES at S108), at S110 the heads 52 are returned to the initial position to perform the next fabrication layer.

The above-described control of three-dimensional fabricating operation is performed by the main controller 500A according to programs according to this embodiment of the present disclosure (which is the same in other embodiments described below).

Next, steps from the discharge of fabrication liquid onto a powder layer to the supply of powder to the next layer in a comparative example are described with reference to FIGS. 11A to 11G.

For the comparative example, when fabrication liquid is discharged to a powder layer to form a first fabrication layer, no vibration is applied to the powder layer.

For the comparative example, as illustrated in FIG. 11A, the powder 20 supplied with the flattening roller 12 is smoothed, and as illustrated in FIG. 11B, the powder layer 31 of the predetermined thickness Δt1 is formed. Note that the powder 20 is aggregation of powder particles (hereinafter, simply referred to as "particles 20a").

At this time, just after recoating (flattening), the powder layer 31 has a loose bulk density and includes more spaces. However, particles 20a of the powder 20 are not arrayed in an ordered manner as illustrated in FIG. 11B. In FIGS. 11A to 11G, the particles 20a of the powder 20 are illustrated to be arrayed slightly away from each other to make the richness of space more easily understood. For example, for gas atomized powder PSS316L (of 20 μm grade and the average particle diameter of 14 μm) produced by SANYO SPECIAL STEEL Co., Ltd., the bulk density is 3 g/cc and only 37% relative to true density.

As illustrated in FIG. 11C, droplets of fabrication liquid 10 are discharged onto the powder layer 31 to land (adhere) on the surface of the powder layer 31. In such a state, air 32 is present in the powder layer 31.

As illustrated in FIG. 11D, the fabrication liquid 10 having landed on the surface of the powder layer 31 permeates into the powder layer 31 and causes the particles 20a of the powder 20 to come closer to each other. Joining of air in the powder layer 31 facilitates movement of the particles 20a of the powder 20. In such a permeation area of fabrication liquid 10, the powder density is not greater than the tap density (e.g., 3.6 g/cc and 45% in the gas atomized powder PSS316L (of 20 μm grade and the average particle diameter of 14 μm) produced by SANYO SPECIAL STEEL Co., Ltd.

Here, as illustrated in FIG. 11D, a portion of air 32 contained in the powder layer 31 before landing of fabrication liquid 10 is exhausted above the powder layer 31 by buoyant force.

However, since spaces among the particles 20a of the powder 20 are fine and complex, as illustrated in FIG. 11E, portions of air 32 contained in the powder layer 31 before landing of the fabrication liquid 10 join together and remain trapped as bubbles 33 in the permeation area of fabrication liquid 10.

At this time, a portion of bubbles 33 remains present without being collapsed by the viscosity of components of the fabrication liquid 10 (binder).

Then, as illustrated in FIG. 11F, the powder 20 is supplied and flattened with the flattening roller 12. As illustrated in FIG. 11G, when the next powder layer 31 is formed, bubbles 33 remain at a border of the powder layer 31 or inside the fabrication layer 30.

As a result, bubbles 33 are dispersed in the entire fabrication object, thus causing an uneven and reduced density of the three-dimensional object.

Next, steps from the discharge of fabrication liquid onto a powder layer to the supply of powder to the next layer in this embodiment are described with reference to FIGS. 12A to 12G.

In this embodiment, when fabrication liquid 10 is discharged onto a powder layer 31 to form a fabrication layer 30, vibration is applied to the powder layer 31.

For example, as illustrated in FIG. 12A, powder 20 supplied with the flattening roller 12 is smoothed, and as illustrated in FIG. 12B, the powder layer 31 of a predetermined thickness Δt1 is formed.

As illustrated in FIG. 12C, droplets of the fabrication liquid 10 are discharged onto the powder layer 31 to land (adhere) on the surface of the powder layer 31. As illustrated in FIG. 12D, the fabrication liquid 10 having landed on the surface of the powder layer 31 permeates into the powder layer 31 and causes the particles 20a of the powder 20 to come closer to each other. Joining of air in the powder layer 31 facilitates movement of the particles 20a of the powder 20.

At this time, in other words, when droplets of the fabrication liquid 10 having landed on the surface of the powder layer 31 permeate into the powder layer 31 as illustrated in FIGS. 12C and 12D, vibration is applied to the powder layer 31.

Such a configuration allows effective removal of air 32 contained in a mixture (slurry) of the powder 20 and the fabrication liquid 10 having a relatively high flowability just after landing of fabrication liquid 10.

As described above, air 32 in the fabrication layer 30 is likely to rise by buoyancy force. If rising of air 32 is hampered, air 32 might be trapped in complicated spaces among the particles 20a. As an elapsed time from landing of fabrication liquid 10 increases, reactions, such as drying and cross-linking, occur, thus raising the viscosity of the slurry and reducing the flowability.

The rising speed of air (bubbles) in the fabrication liquid 10 is expressed by Stokes' law, and is proportional to the square of the radius of bubble and inversely proportional to the viscosity of the fabrication liquid 10. Accordingly, as the viscosity of the fabrication liquid 10 is lower, bubbles are more likely to rise. By applying further vibration to the slurry in such a state, gas, which has been balanced and secured in interfaces between solid (powder), liquid (fabrication liquid), and gas (air), becomes more easily movable, thus reducing bubbles in the fabrication object.

By contrast, for a slurry having already been dried and thickened, application of vibration would unfavorably make the removal of air difficult.

Typically, the time from the discharge of the fabrication liquid 10 from the heads 52 to the landing of the fabrication liquid 10 on a powder surface (the surface of the powder layer 31) is a short time corresponding to a distance of from about 100 μm to 200 μm. For example, the time is about 143 μs where the flying speed of a droplet of the fabrication liquid 10 is 7 m/s and the distance from the nozzle to the powder surface is 1 mm.

Therefore, in one scanning, vibration is applied for a time period including a time during which the fabrication liquid 10 is discharged to form the fabrication layer 30 and a time of from 100 μs to 500 μs before and after the discharge of the fabrication liquid 10.

Figure 13:
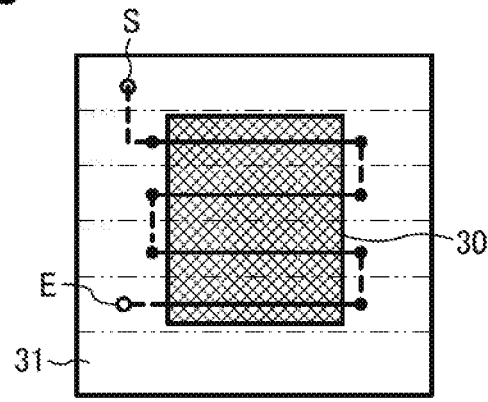
FIG. 13 is an illustration of a first example of a drive pattern of a vibrator in the first embodiment.

The relation is described below with reference to FIGS. 13 and 14. FIGS. 13 and 14A and 14B are illustrations of drive patterns of the vibrator in this embodiment.

Note that, in this embodiment, movement of the carriage 51 starts from a start position S and finishes at an end position. In FIGS. 13 and 14A and 14B, ON-state of the vibrator is indicated by solid line and OFF-state of the vibrator is indicated by broken line. ON-timing (position) of the vibrator is indicated by solid circle and OFF-timing (position) of the vibrator is indicated by solid square.

For a first example illustrated in FIG. 13, in one scanning, the vibrator 91 is in ON-state in a fabrication area (in which the fabrication layer 30 is formed) and in OFF-state outside the fabrication area.

Figure 14A:
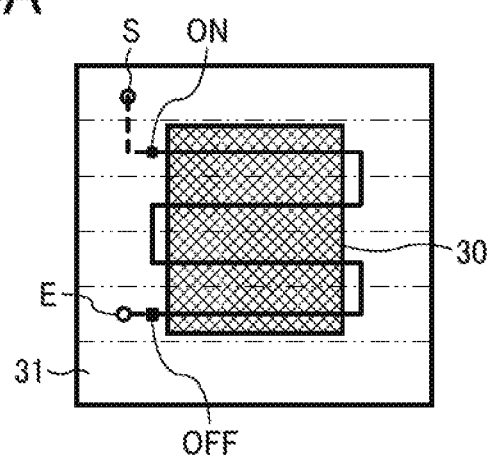
FIGS. 14A and 14B are illustrations of a second example of a drive pattern of the vibrator.
Figure 14B:
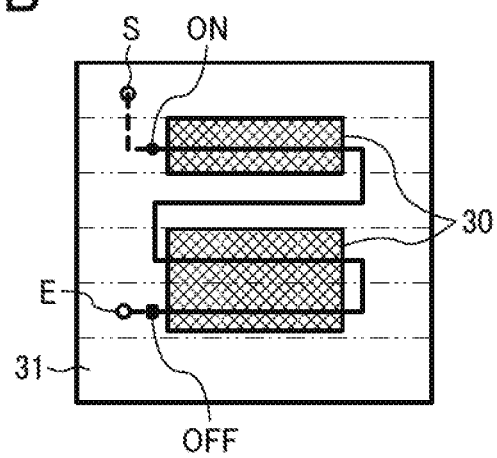

For a second example illustrated in FIGS. 14A and 14B, when the fabrication layer 30 is formed in one powder layer 31, the vibrator 91 is continuously in ON-state during a time period from the start of fabrication to the end of fabrication and in OFF-state except the time period.

Accordingly, for the second example, in any case of when multiple fabrication areas continue as illustrated in FIG. 14A and when multiple fabrication areas are separated from each other as illustrated in FIG. 14B, the vibrator 91 is turned ON when fabrication is started. Then, the ON-state of the vibrator 91 is continued even in an area other than the fabrication area. When the fabrication ends, the vibrator 91 is turned OFF.

According to this embodiment, the time in which vibration is applied to the powder layer 31 is limited to a short time including a discharge time period in which the fabrication liquid 10 is discharged and time periods before and after the discharge time period. In addition, in a state in which the viscosity of the slurry is low, vibration is applied. Such a configuration suppresses a reduction in accuracy of the fabrication object within a minimum range while effectively removing air in the fabrication layer 30 at low vibration energy.

Note that the application of vibration to the powder layer 31, to which the fabrication liquid 10 is discharged, is performed in a time period from the start to the end of the formation of the fabrication layer 30 in one powder layer 31, that is, a time period from the start to the end of fabrication on the powder layer 31 according to slice data. For example, application and stop of vibration are performed in response to discharge and non-discharge, respectively, of the fabrication liquid 10 (driving and non-driving of the heads 52). However, the timings of application and stop of vibration are not limited to such timings.

As in this embodiment, when the vibrator 91 of the vibration generator 90 is provided with the fabrication stage 24, for example, in a first layer just after the start of fabrication, the distance between the fabrication layer 30 and the vibrator 91 is relatively close. However, as the fabrication advances, the distance between the vibrator 91 and the nth layer increases.

Hence, vibration energy is properly adjusted in accordance with the distance between the fabrication layer 30 and the vibrator 91. For example, vibration energy to vibrate a first powder layer 31 is set to be lowest. As the number of layers laminated increases, vibration energy is increased in turn. Further, the intensity of vibration may be adjusted according to the thickness of lamination per layer.

Figure 15:
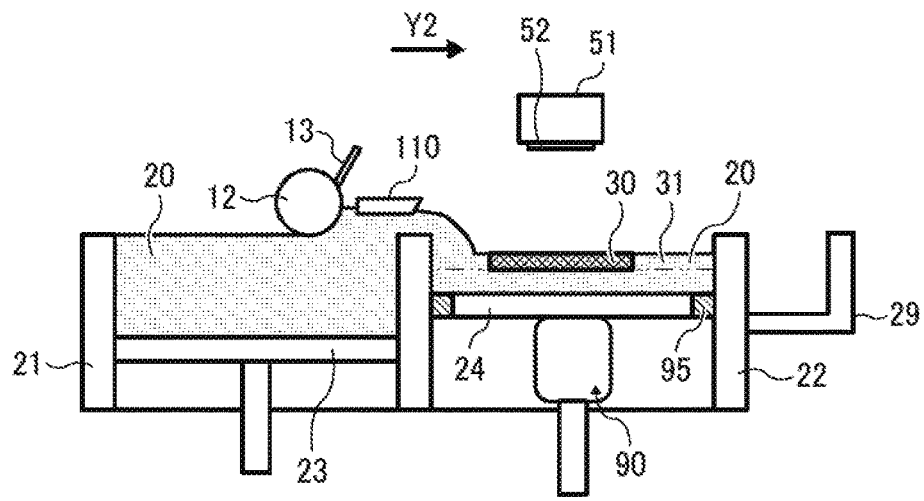
FIG. 15 is an illustration of the fabrication section according to a second embodiment of the present disclosure.
Figure 16:
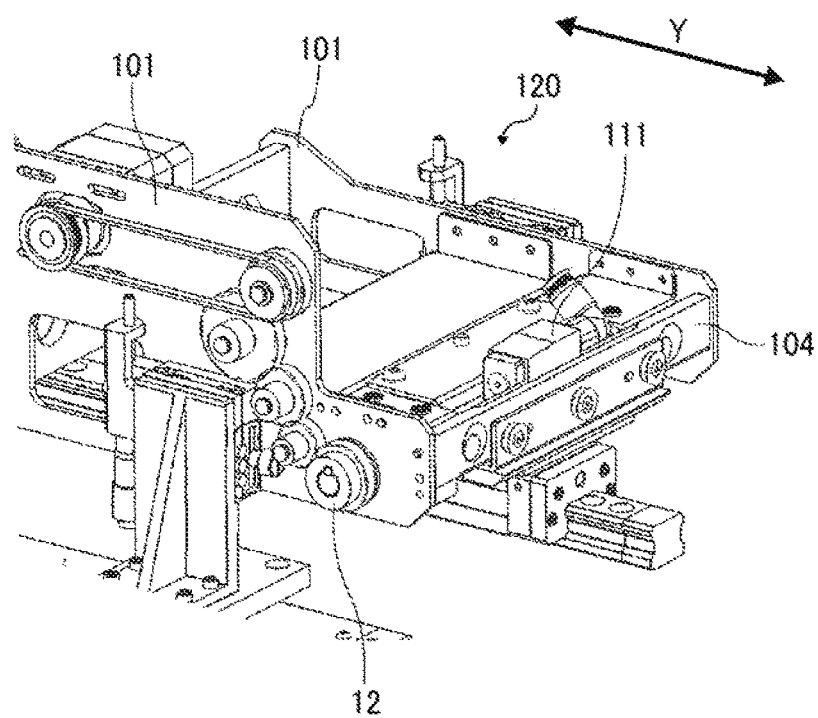
FIG. 16 is a partial perspective view of a recoater unit in the second embodiment.
Figure 17:
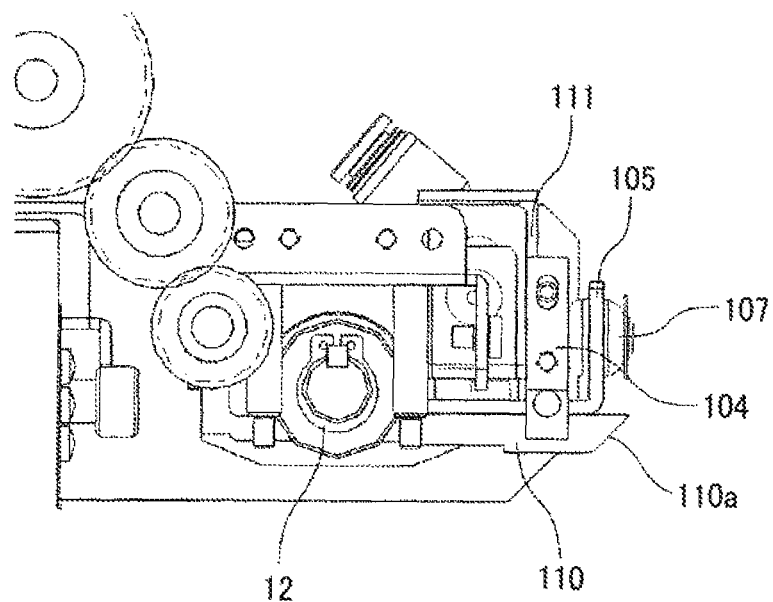
FIG. 17 is a side view of the recoater unit of FIG. 16.
Figure 18:
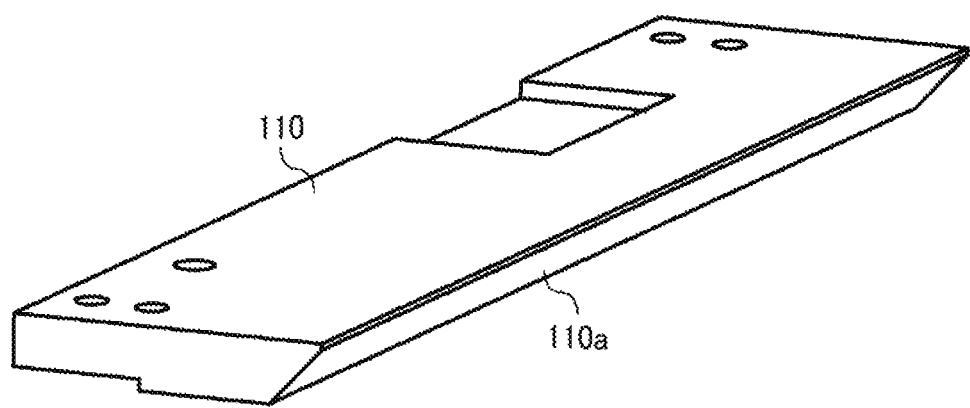
FIG. 18 is a perspective view of a vibration blade in the second embodiment.

Next, a second embodiment of the present disclosure will be described with reference to FIGS. 15 to 18. FIG. 15 is an illustration of the fabrication section according to the second embodiment. FIG. 16 is a partial perspective view of a recoater unit in the second embodiment. FIG. 17 is a side view of the recoater unit of FIG. 16. FIG. 18 is a perspective view of a vibration blade in the second embodiment.

In this embodiment, a vibration blade 110 as a second vibration applicator is disposed forward in a direction (indicated by arrow Y2 in FIG. 15) of transfer and supply of the flattening roller 12 (that is, forward in a direction in which the flattening roller 12 transfers and supplies powder 20). The vibration blade 110 and the flattening roller 12 are attached with screws to a bracket 105 joined to a stay 104 that is held by side plates 101.

A vibrator 111 is disposed on the vibration blade 110 to drive the vibrator 111 to vibrate the entire vibration blade 110. A leading end of the vibration blade 110 has a tapered portion (slant portion) 10a.

A vibration isolator 107 is disposed between the stay 104 and the bracket 105, to reduce the transmission of vibration to the flattening roller 12.

A recoater unit 120 including the flattening roller 12 and the vibration blade 110 is reciprocally movable along the direction indicated by arrow Y in FIG. 16.

Here, since the flattening roller 12 and the vibration blade 110 are held by the side plates 101, the flattening roller 12 as the flattening unit and the vibration blade 110 as the second vibration applicator may be moved by a common drive source, for example, the motor 553 of the reciprocal moving assembly 25 described in the above-described first embodiment.

Note that driving of the vibrator 111 to vibrate the vibration blade 110 is controlled by the controller as in the above-described embodiment.

Figure 19:
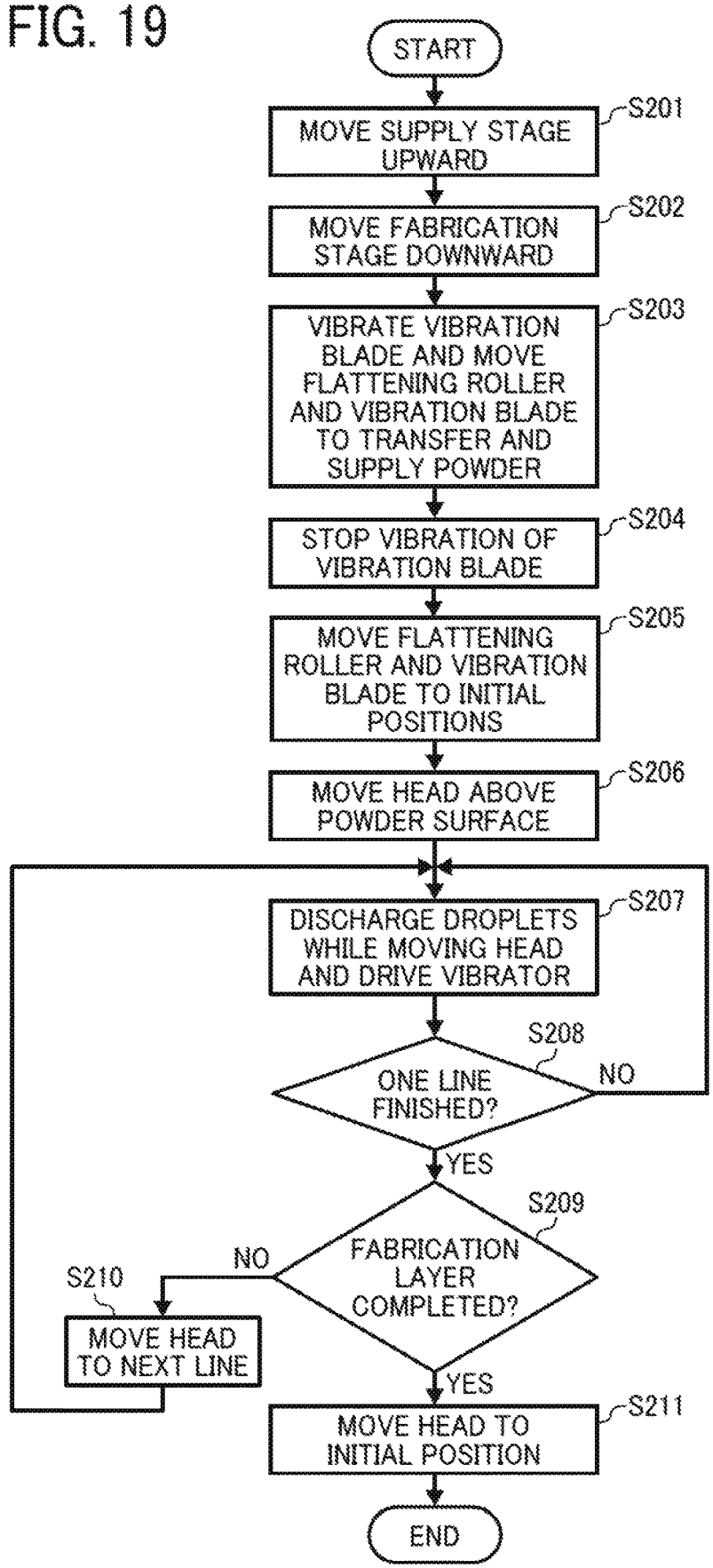
FIG. 19 is a flowchart of a control of fabricating operation performed by the controller according to the second embodiment.

Next, a control of fabricating operation performed by the controller according to the second embodiment is described with reference to FIG. 19.

At S201, the supply stage 23 of the supply chamber 21 is moved upward by a predetermined amount (e.g., 200 μm). At S202, the fabrication stage 24 is moved downward by an amount corresponding to a lamination pitch Δt1 (e.g., 100 μm). Note that the order of S201 and S202 may be reversed.

At S203, the recoater unit 120 is moved in the Y2 direction of FIG. 13. At this time, the flattening roller 12 is rotated and driving of the vibrator 111 is started with movement of the recoater unit 120 to vibrate the vibration blade 110.

When the vibration blade 110 passes the fabrication chamber 22, at S204 the vibration of the vibration blade 110 is stopped. At S205, the recoater unit 120 including the flattening roller 12 and the vibration blade 110 is returned to the initial position.

Before the flattening roller 12 is returned to the initial position, both the fabrication stage 24 and the supply stage 23 are preferably lowered by a predetermined amount (e.g., 300 μm) so that the flattening roller 12 does not contact the surface of powder. After the flattening roller 12 is returned to the initial position, both the fabrication stage 24 and the supply stage 23 are preferably raised by the predetermined amount.

At S206, the fabrication unit 5 is moved in the Y direction and the carriage 51 is moved in the X direction so that the heads 52 is placed above the fabrication chamber 22 to oppose the fabrication chamber 22.

While the carriage 51 moves in the X direction, at S207 the heads 52 discharge droplets of fabrication liquid a powder layer 31 to fabricate a fabrication layer 30. When droplets of the fabrication liquid 10 are discharged from the heads 52 onto the powder layer 31 to fabricate the fabrication layer 30, the vibrator 91 of the vibration generator 90 is driven to apply vibration to the powder layer 31 of the fabrication stage 24.

When one scanning (scanning of one line) of the carriage 51 is finished (YES at S208), at S209 the controller 500 determines whether fabrication of the fabrication layer 30 in the powder layer 31 is completed.

When fabrication of the fabrication layer 30 is not completed (NO at S209), at S210 the fabrication unit 5 is moved for line feed by an amount corresponding to one nozzle row in the Y direction. At S207, droplets of the fabrication liquid are discharged to fabricate the next line. At this time, likewise, when droplets of the fabrication liquid are discharged from the heads 52 onto the powder layer 31 to fabricate the fabrication layer 30, the vibrator 91 of the vibration generator 90 is driven to apply vibration to the powder layer 31 of the fabrication stage 24.

After fabrication of the first fabrication layer 30 is completed (YES at S209), at S211 the heads 52 are returned to the initial position to perform the next fabrication layer.

As described above, when the powder 20 is transferred and supplied to the fabrication chamber 22 to form the powder layer 31, the vibration blade 110 applies vibration to the powder 20. Accordingly, the particles 20a of the powder 20 overcome the adhesion force among the particles 20a and between the particles 20a and walls, to move. Reducing spaces among the particles 20a densifies the powder 20, thus increasing the density of the fabrication object.

Here, after passing above the fabrication chamber 22, the vibration blade 110 may continue vibration to a position at which the vibration blade 110 opposes the surplus powder chamber 29.

Such a configuration allows the powder 20 adhering to the vibration blade 110 to be dropped into the surplus powder chamber 29. When the recoater unit 120 is returned to the initial position, the powder 20 is dropped onto the surface of the powder layer 31 of the fabrication chamber 22, thus preventing a reduction in quality of the fabrication object.

Next, an example of formation of a thin layer of powder (formation of a powder layer) by the vibration blade and the flattening roller 12 is described with reference to FIGS. 20A and 20B.

In a state in which the fabrication liquid 10 lands on the powder layer 31 and the fabrication layer 30 is formed as illustrated in FIG. 20A, the vibration blade 110 applies vibration to the powder 20 while the vibration blade 110 and the flattening roller 12 transfer and supply the powder 20 from the supply chamber 21 side as illustrated in FIG. 20B.

At this time, the vibration blade 110 does not directly contact the fabrication layer 30 already formed, and is disposed higher than the fabrication layer 30 by a height of the powder 20 corresponding to one or more layer of the powder layer 31.

A lowest surface of the vibration blade 110 is disposed at a position higher than a lowest surface of the flattening roller 12. Accordingly, a powder surface roughened by the vibration blade 110 is also smoothed with the flattening roller 12, thus hardly affecting the accuracy (flatness) of the fabrication object.

Next, differences in the fabrication object between when vibration is applied in fabrication and when no vibration is applied in fabrication is described with reference to FIGS. 21A and 21B.

Figure 21A:
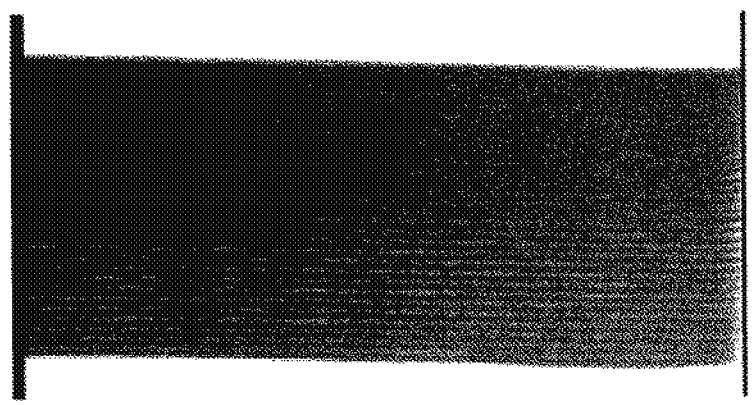
FIGS. 21A and 21B are illustrations of differences in the fabrication object between when vibration is applied in fabrication and when no vibration is applied in fabrication.
Figure 21B:
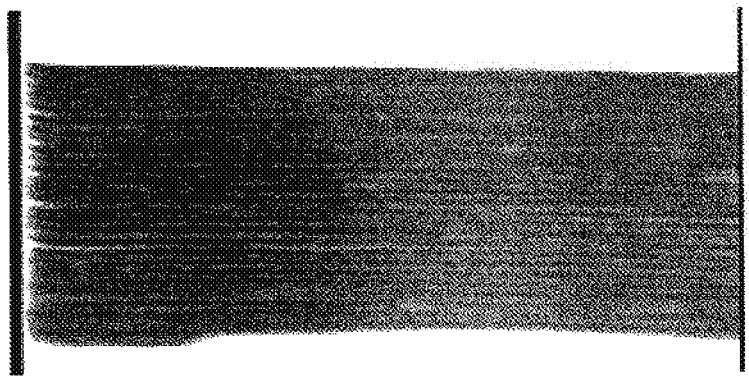

FIGS. 21A and 21B are illustrations of transparent X-ray images taken with X-ray projected from a direction perpendicular to a direction of lamination of layers fabricated.

In FIG. 21A, a case is illustrated in which, as described in the second embodiment, vibration of the vibration blade 110 and vibration of the fabrication stage 24 by the vibration generator 90 are performed in fabrication. In FIG. 21B, a case is illustrated in which none of the vibration of the vibration blade 110 and the vibration of the fabrication stage 24 are performed in fabrication.

As the image is darker, the density of the powder is higher.

In FIG. 21A, the color of the image is more even and darker. By contrast, in FIG. 21B, the image includes white spots or scattered voids. Further, in FIG. 21A, spaces between the layers are narrower and less obvious.

Figure 22:
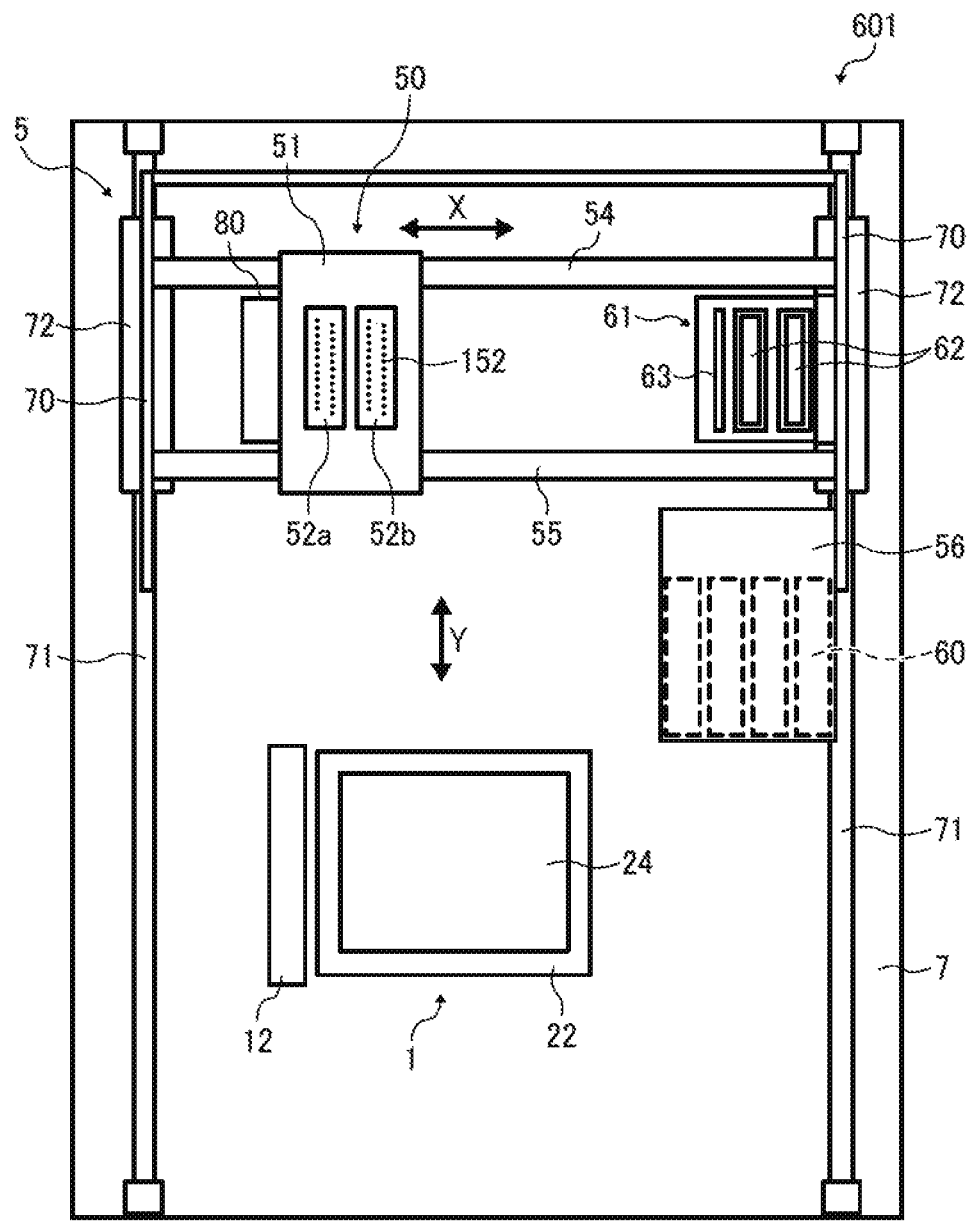
FIG. 22 is a plan view of the three-dimensional fabricating apparatus according to a third embodiment of this disclosure.
Figure 23:
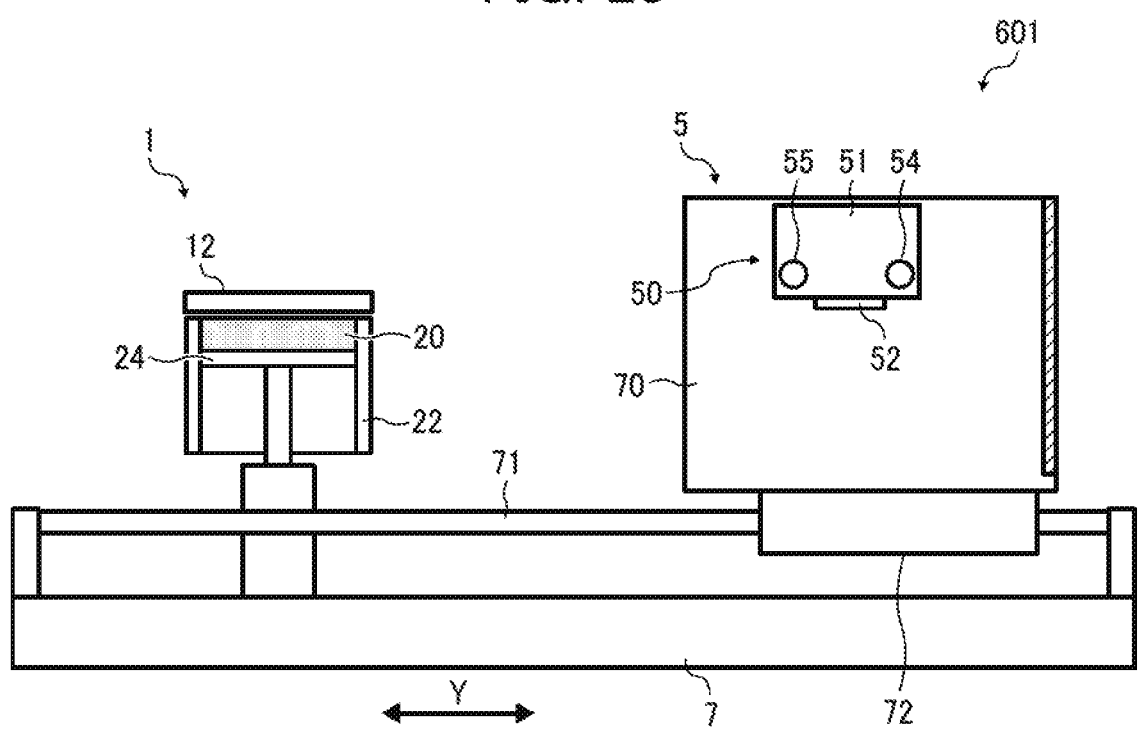
FIG. 23 is a side view of the three-dimensional fabricating apparatus of FIG. 22.

Next, the three-dimensional fabricating apparatus according to a third embodiment of the present disclosure is described with reference to FIGS. 22 and 23. FIG. 22 is a plan view of a three-dimensional fabricating apparatus according to the third embodiment of this disclosure. FIG. 23 is a side view of the three-dimensional fabricating apparatus of FIG. 22.

In the third embodiment, the fabrication section 1 has a single chamber structure of the fabrication chamber 22. The flattening roller 12 is movable in the X direction to smooth and flatten the powder 20 supplied to the fabrication chamber 22.

Note that other configurations may be similar to, if not the same as, the configurations of the first embodiment and therefore, descriptions thereof are omitted here.

Figure 24:
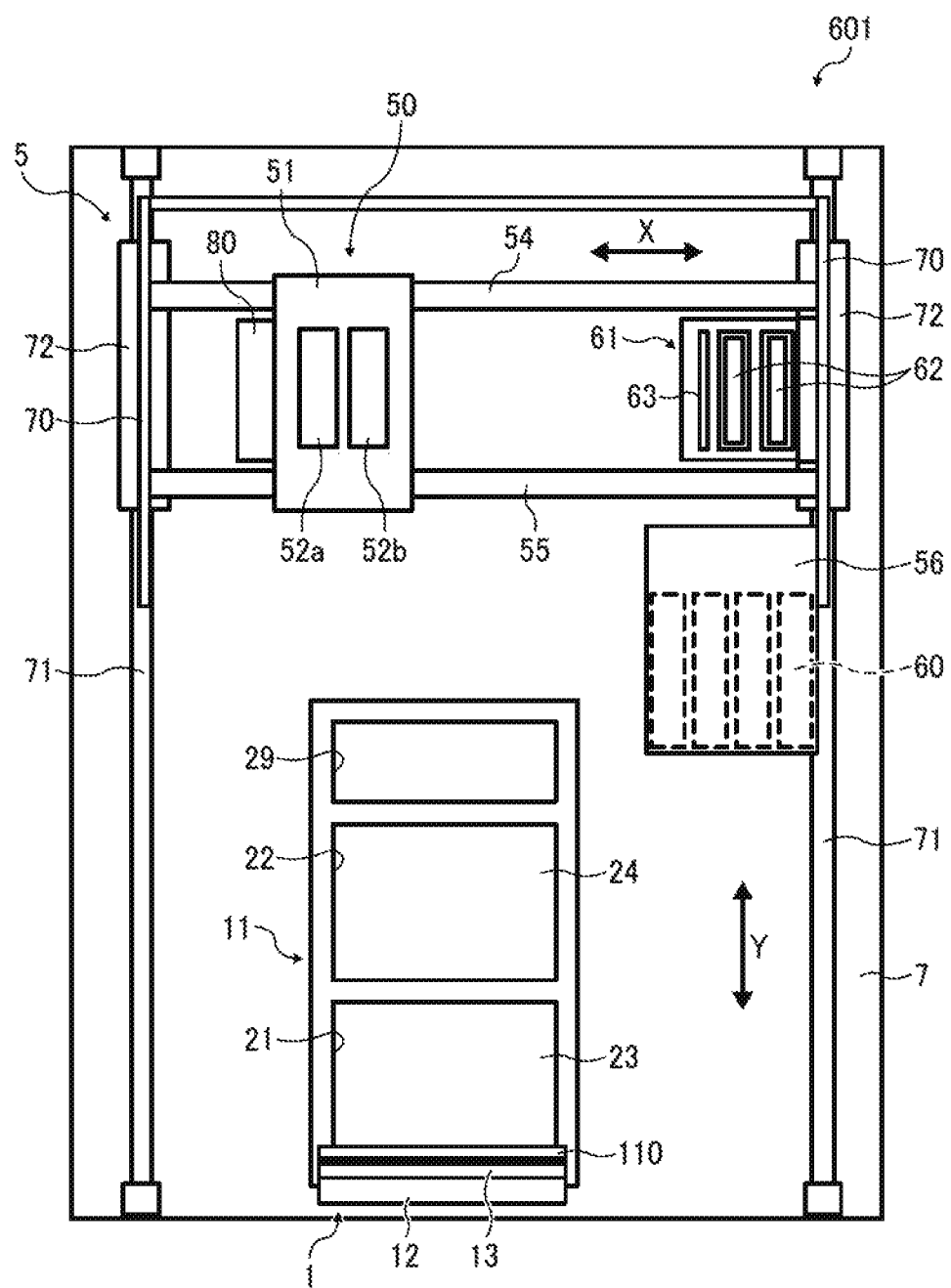
FIG. 24 is a plan view of the three-dimensional fabricating apparatus according to a fourth embodiment of this disclosure.
Figure 25:
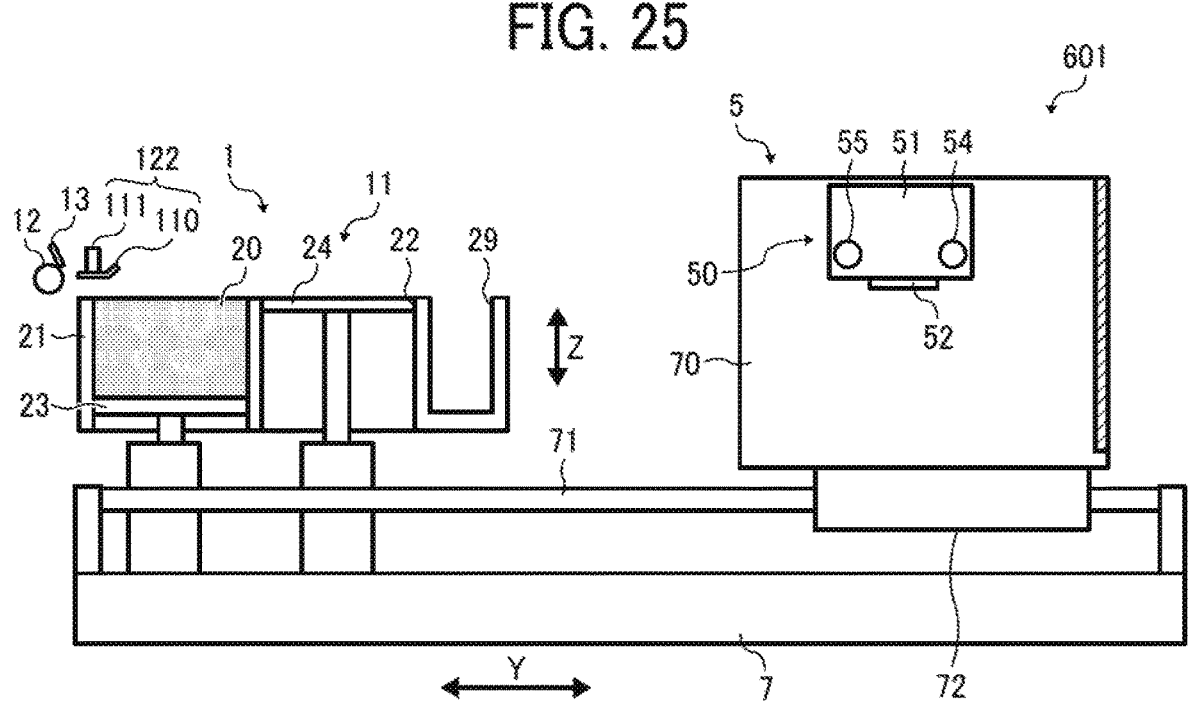
FIG. 25 is a cross-sectional view of the fabrication section of the three-dimensional fabricating apparatus of FIG. 24.
Figure 26:
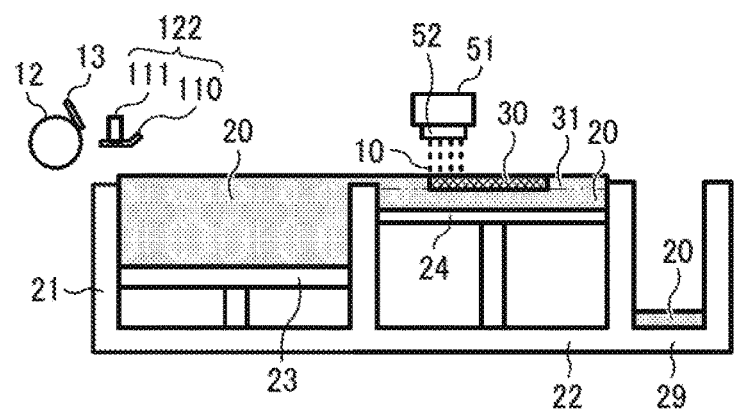
FIG. 26 is a cross-sectional view of the fabrication section of FIG. 25.
Figure 27:
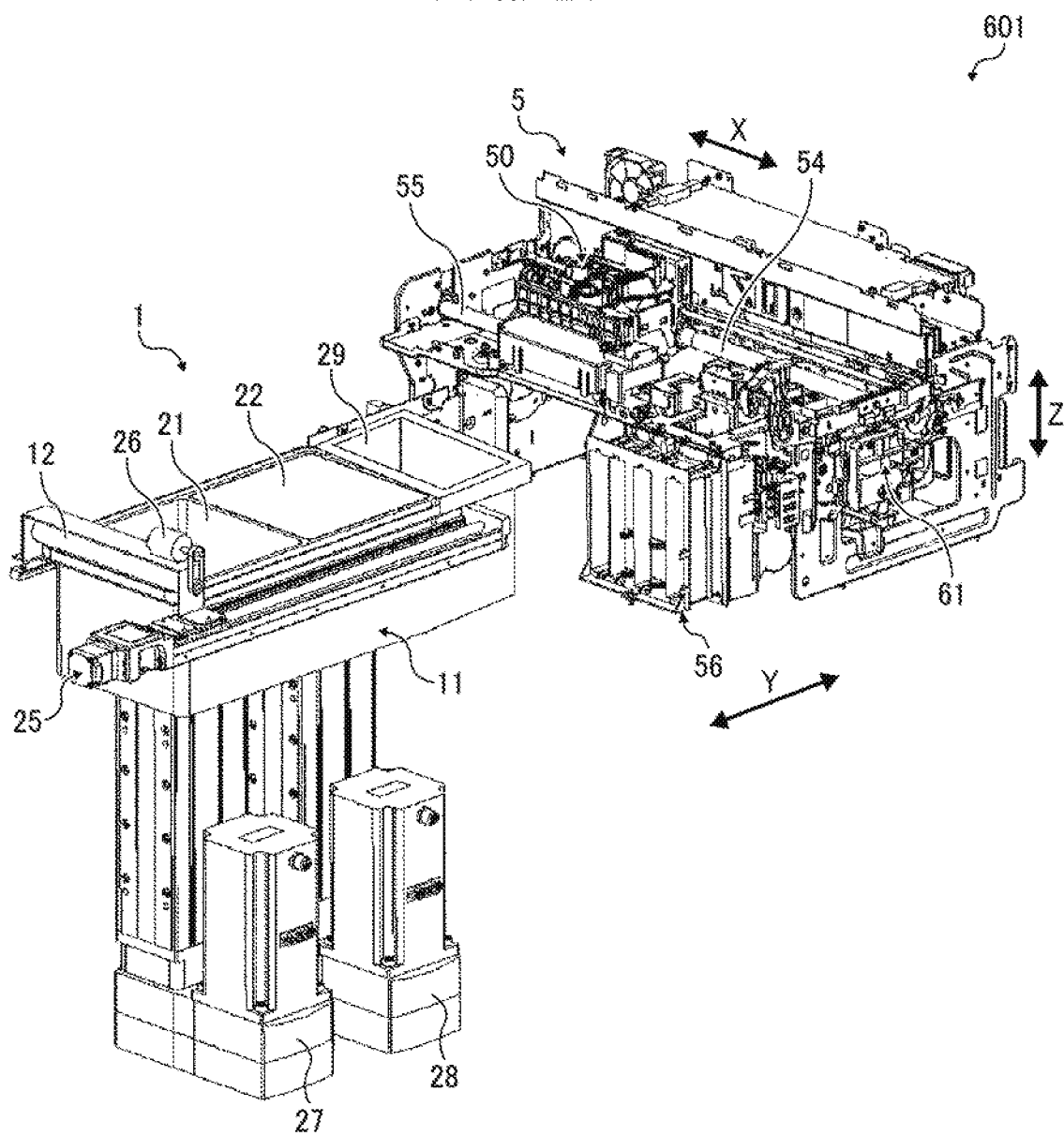
FIG. 27 is a partial perspective view of the three-dimensional fabricating apparatus according to the fourth embodiment of the present disclosure.

Next, the three-dimensional fabricating apparatus according to a fourth embodiment of the present disclosure is described with reference to FIGS. 24 to 27. FIG. 24 is a plan view of the three-dimensional fabricating apparatus according to the first embodiment of this disclosure. FIG. 25 is a cross-sectional view of a fabrication section of the three-dimensional fabricating apparatus of FIG. 24. FIG. 26 is a cross-sectional view of the fabrication section of FIG. 25. In FIG. 26, a state of the fabricating section during fabrication is illustrated. FIG. 27 is a partial perspective view of the three-dimensional fabricating apparatus according to the fourth embodiment of the present disclosure.

In the fourth embodiment, the three-dimensional fabricating apparatus 601 according to the first embodiment illustrated in FIGS. 1 to 4 includes the surplus powder chamber 29 illustrated in FIG. 5. In the fourth embodiment, the three-dimensional fabricating apparatus 601 does not include the vibration generator 90 as the first vibration applicator to vibrate the fabrication stage 24 of the fabrication chamber 22. However, the vibration generator 90 may be attached.

In the fourth embodiment, the three-dimensional fabricating apparatus 601 includes a vibration applicator unit 122 including the vibration blade 110 and the vibrator 11*l* as vibration applicators.

Next, a flow of fabrication without using the vibration applicators in the fourth embodiment is described with reference to FIGS. 28A through 28E. FIGS. 28A through 28E are illustrations of the fabrication section 1 in this embodiment.

Figure 28A:
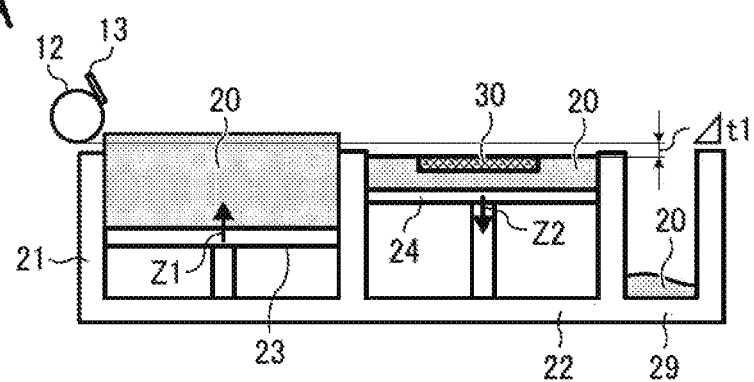
FIGS. 28A through 28E are illustrations of a flow of fabrication without using the vibration applicators in the fourth embodiment.
Figure 28B:
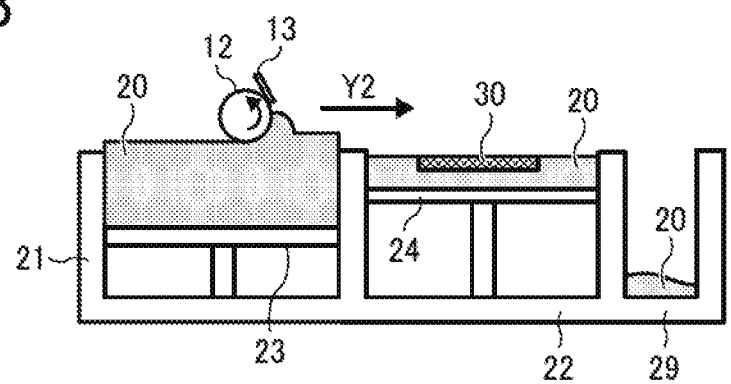
Figure 28C:
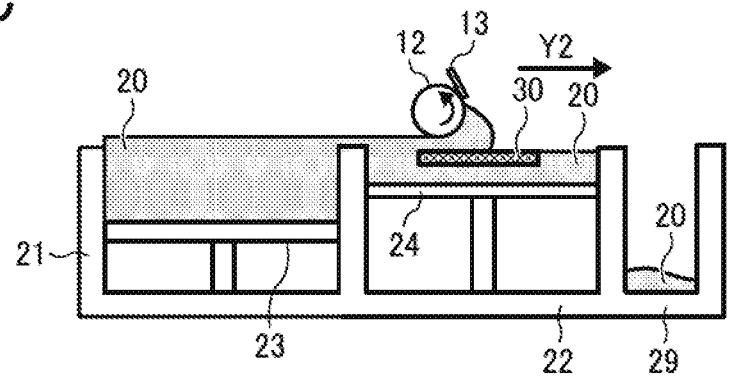
Figure 28D:
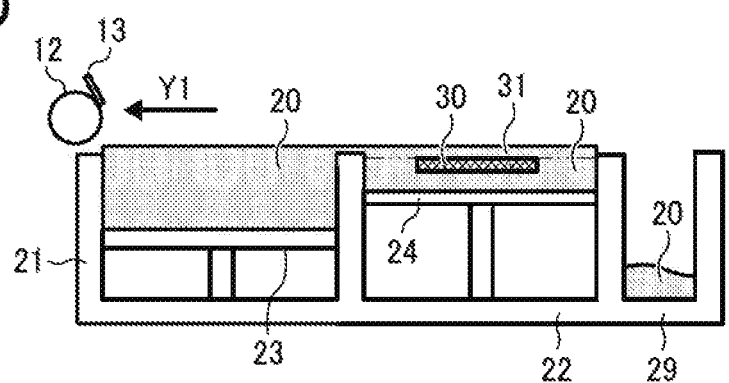
Figure 28E:
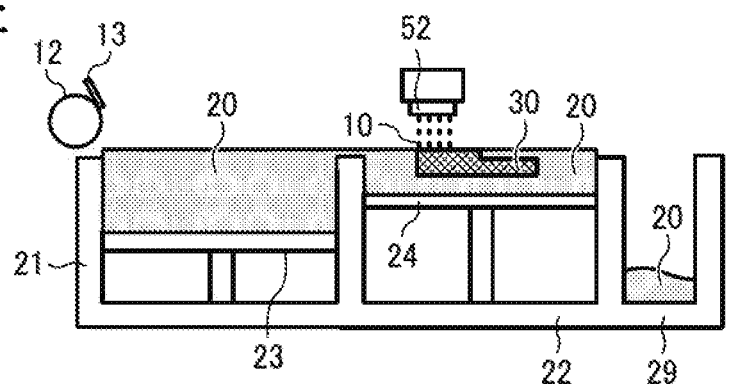

In the fourth embodiment, likewise, when a second fabrication layer 30 is formed on the first fabrication layer 30, as illustrated in FIG. 28A, the supply stage 23 of the supply chamber 21 moves upward in a direction indicated by arrow Z1, and the fabrication stage 24 of the fabrication chamber 22 moves downward in a direction indicated by arrow Z2.

At this time, a downward movement distance of the fabrication stage 24 is set so that a distance between an upper face of a surface (powder surface) of the powder layer 31 of the fabrication chamber 22 and a lower portion (lower tangential portion) of the flattening roller 12 is Δt1.

In such a case, the flattening roller 12 is disposed at a distance from an upper end surface of each of the supply chamber 21 and the fabrication chamber 22. Accordingly, in this embodiment, when the powder 20 is transferred and supplied to the fabrication chamber 22 for flattening, the surface (powder surface) of the powder layer 31 is placed at a position higher than the upper end surface of each of the supply chamber 21 and the fabrication chamber 22.

Such a configuration reliably prevents the flattening roller 12 from contacting the upper end surface of each of the supply chamber 21 and the fabrication chamber 22, thus reducing the damage of the flattening roller 12. If the surface of the flattening roller 12 is damaged, streaks would occur in the surface of the powder layer 31, thus reducing flatness.

Other steps are similar to, even if not the same as, the steps of the flow described in the first embodiment, and therefore redundant descriptions thereof are omitted here.

Figure 29:
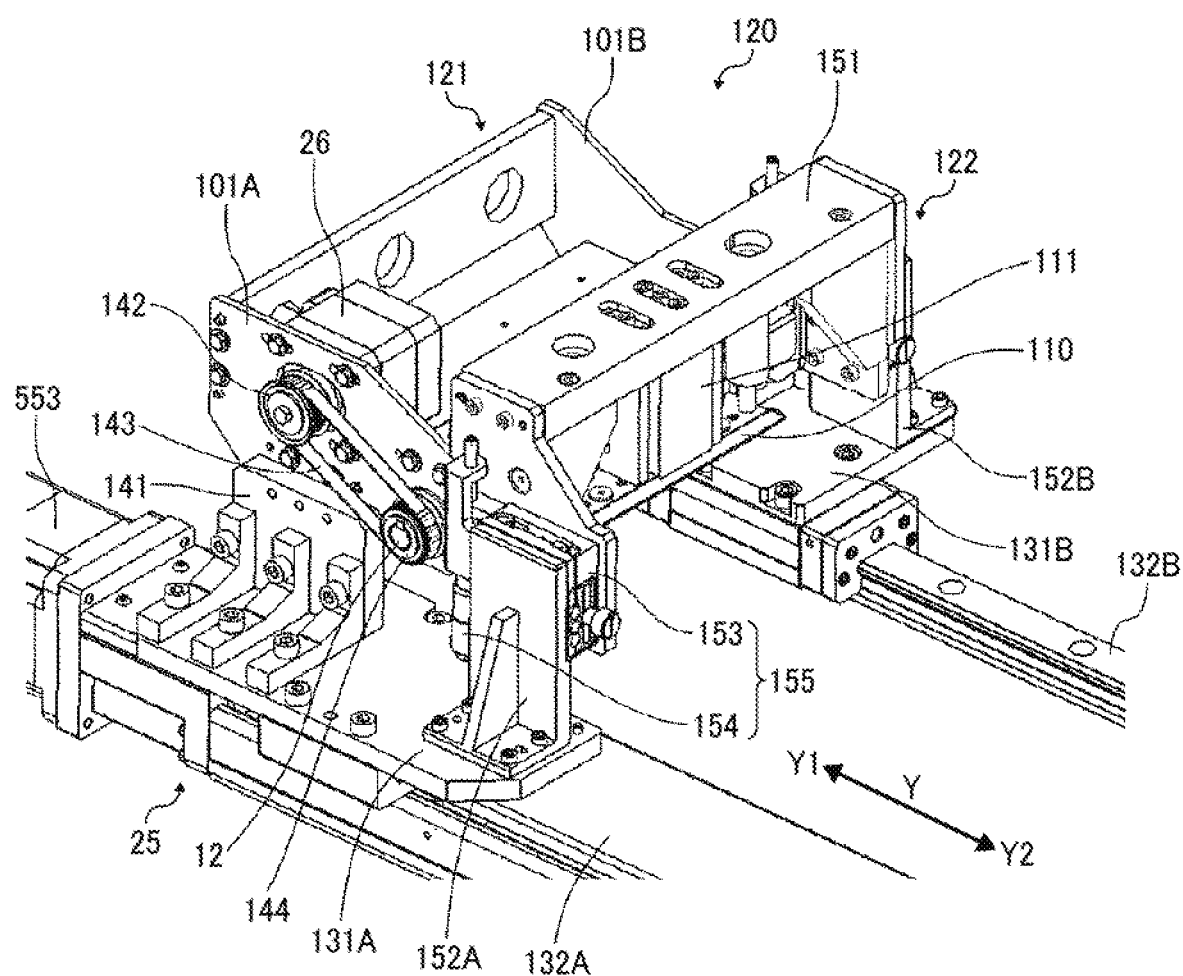
FIG. 29 is a perspective view of the recoater unit including vibration applicators in the fourth embodiment.
Figure 30:
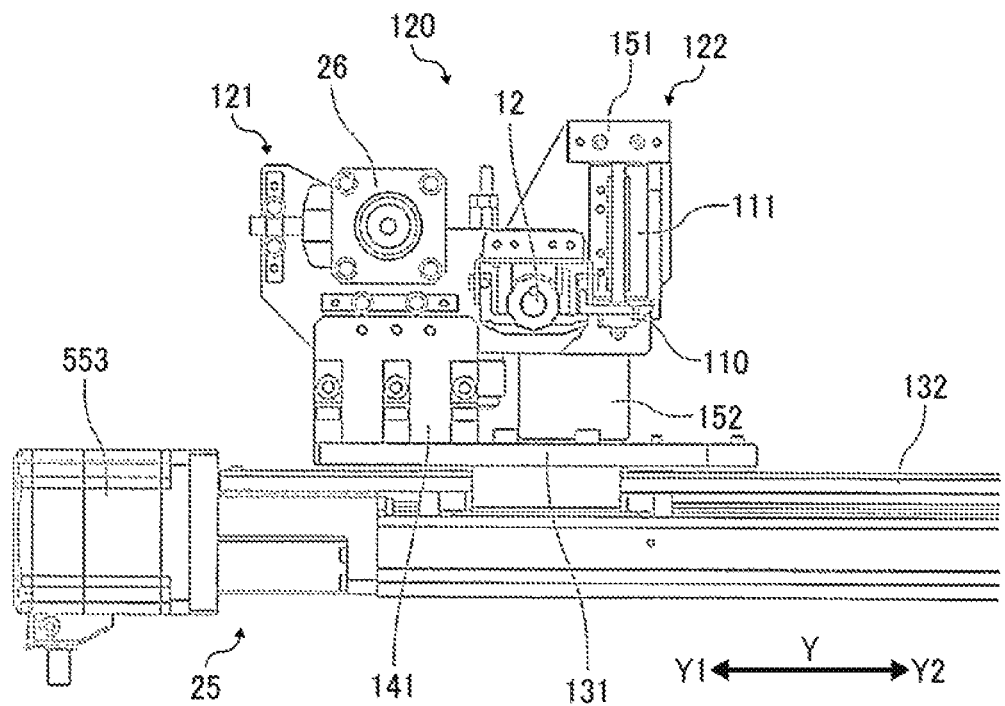
FIG. 30 is a side view of the recoater unit of FIG. 29.
Figure 31:
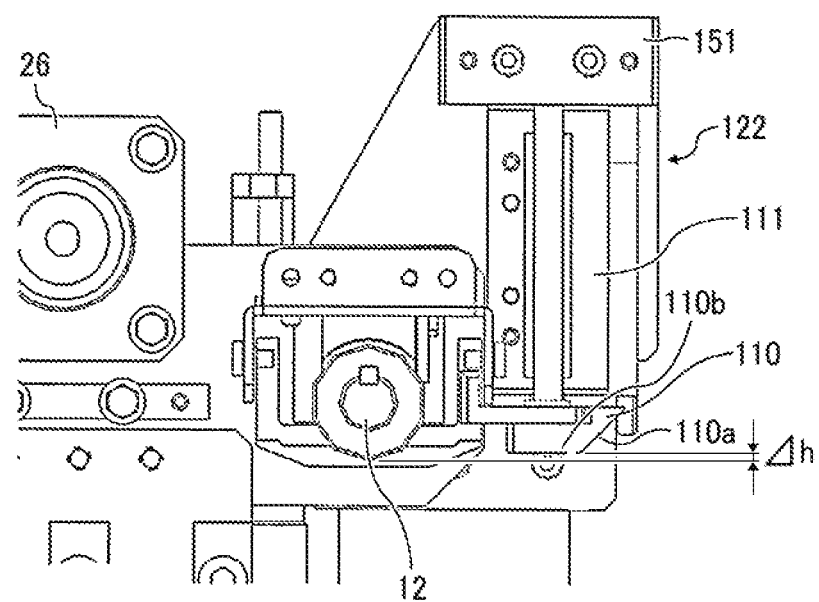
FIG. 31 is a partially enlarged side view of the recoater unit.
Figure 32:
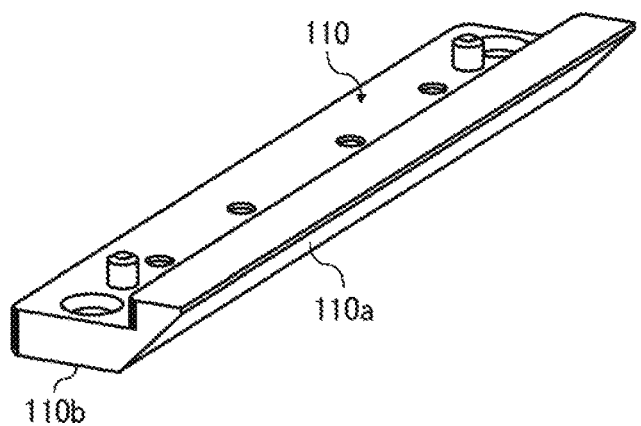
FIG. 32 is a perspective view of the vibration blade in the fourth embodiment.
Figure 33:
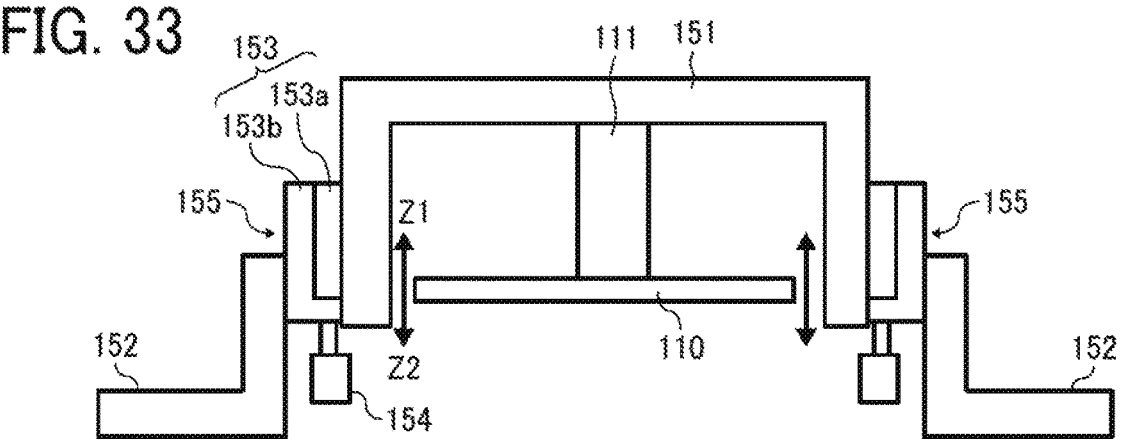
FIG. 33 is a front view of a height adjustment mechanism of the vibration blade.
Figure 34:
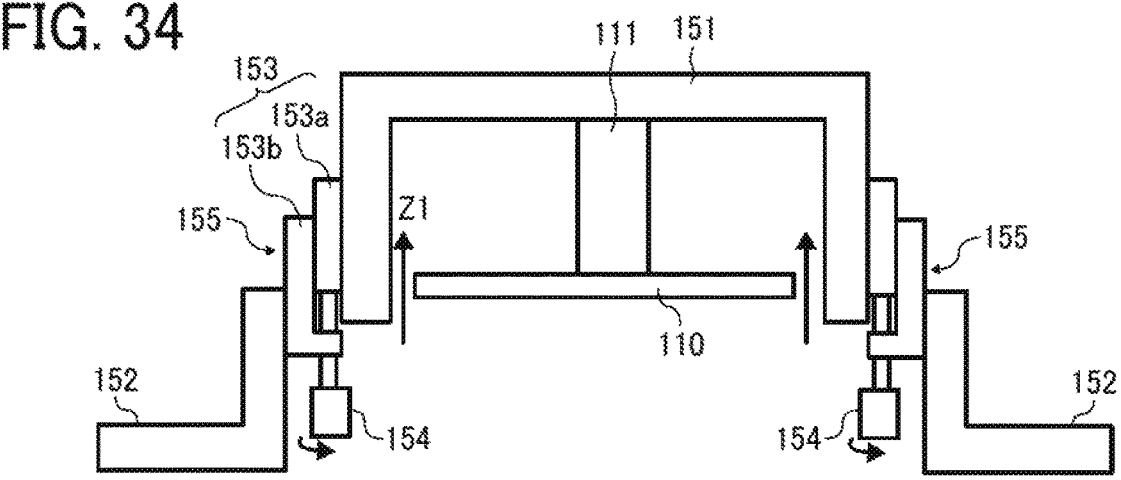
FIG. 34 is a front view of the vibration blade in a state in which the vibration blade is raised from the state of FIG. 33.

Next, the vibration applicators in the fourth embodiment is described with reference to FIGS. 29 to 34. FIG. 29 is a perspective view of the recoater unit including the vibration applicators in the fourth embodiment. FIG. 30 is a side view of the recoater unit of FIG. 29. FIG. 31 is a partially enlarged side view of the recoater unit. FIG. 32 is a perspective view of the vibration blade in the fourth embodiment. FIG. 33 is a front view of a height adjustment mechanism of the vibration blade. FIG. 34 is a front view of the vibration blade in a state in which the vibration blade is raised from the state of FIG. 33.

In the fourth embodiment, the recoater unit 120 includes a flattening unit 121 including the flattening roller 12 and the vibration applicator unit 122 as the vibration applicator. The vibration applicator unit 122 includes a vibration blade 110 as a blade disposed forward in a direction (indicated by arrow Y2 in FIG. 15) of transfer and supply of the flattening roller 12 (that is, forward in a direction in which the flattening roller 12 transfers and supplies powder 20).

The flattening unit 121 and the vibration applicator unit 122 are held on movable bases 131A and 131B constituting the reciprocal moving assembly 25. The movable bases 131A and 131B are movably held on guide rails 132A and 132B disposed along the Y direction (including the Y2 direction and the Y1 direction).

By driving the motor 553 of the reciprocal moving assembly 25, the movable base 131A moves along the guide rail 132A, thus reciprocally moving the entire recoater unit 120 including the flattening unit 121 and the vibration applicator unit 122 along the Y direction.

In other words, in this embodiment, the vibration applicator and the flattening unit are moved by a common drive source (the motor 553).

The flattening unit 121 includes the flattening roller 12 rotatably held with side plates 101A and 101B (hereinafter, referred to as "the side plates 101" unless distinguished). The side plates 101 are held on the movable bases 131 with brackets 141. Rotation of the motor 26 is transmitted to the flattening roller 12 via a pulley 142, a timing belt 143, and a pulley 144 to rotate the flattening roller 12.

The vibration applicator unit 122 includes a holder 151 to hold the vibration blade 110 and the vibrator 111 as a vibrator to vibrate the vibration blade 110. Note that, for example, an eccentric motor, an air vibrator, or a laminated piezoelectric element is used as the vibrator. In this embodiment, a laminated piezoelectric element is used as the vibrator.

The vibration blade 110 includes a bottom portion 110b disposed parallel to the powder surface of the fabrication chamber 22 (the surface of the powder layer 31) and a tapered portion 110a as a slant portion upwardly slanted forward in the direction of movement.

The holder 151 is attached to support brackets 152A and 152B, which are fixed to the movable bases 131A and 131B, via height adjusters 155 as gap adjusters between the vibration blade 110 and the powder surface of the fabrication chamber 22 (the surface of the powder layer 31).

As illustrated in FIGS. 33 and 34, each of the height adjusters 155 includes a height adjustment member 153 and an adjustment operation member 154. The height adjustment member 153 includes a first member 153a and a second member 153b arranged to be relatively movable in a vertical direction (Z direction). The adjustment operation member 154 moves the second member 153b relative to the first member 153a.

By rotating the adjustment operation member 154, the second member 153b is moved along the vertical direction to move the holder 151 upward and downward, thus allowing adjustment of the gap between the vibration blade 110 and the powder surface of the fabrication chamber 22 (the surface of the powder layer 31). For example, in FIG. 34, the holder 151 is moved upward in a direction indicated by arrow Z1 so that the gap between the vibration blade 110 and the powder surface of the fabrication chamber 22 is greater than the gap in FIG. 33.

As illustrated in FIG. 31, the bottom portion 110b of the vibration blade 110 is disposed at a position higher than a lower end (the height of the tangent) of the flattening roller 12 by Δh. In other words, as described above, the lowest surface (the bottom portion 110b) of the vibration blade 110 is disposed at a position higher than the lowest surface of the flattening roller 12. Accordingly, the powder surface roughened by the vibration blade 110 is also smoothed with the flattening roller 12, thus hardly affecting the accuracy (flatness) of the fabrication object.

Figure 35:
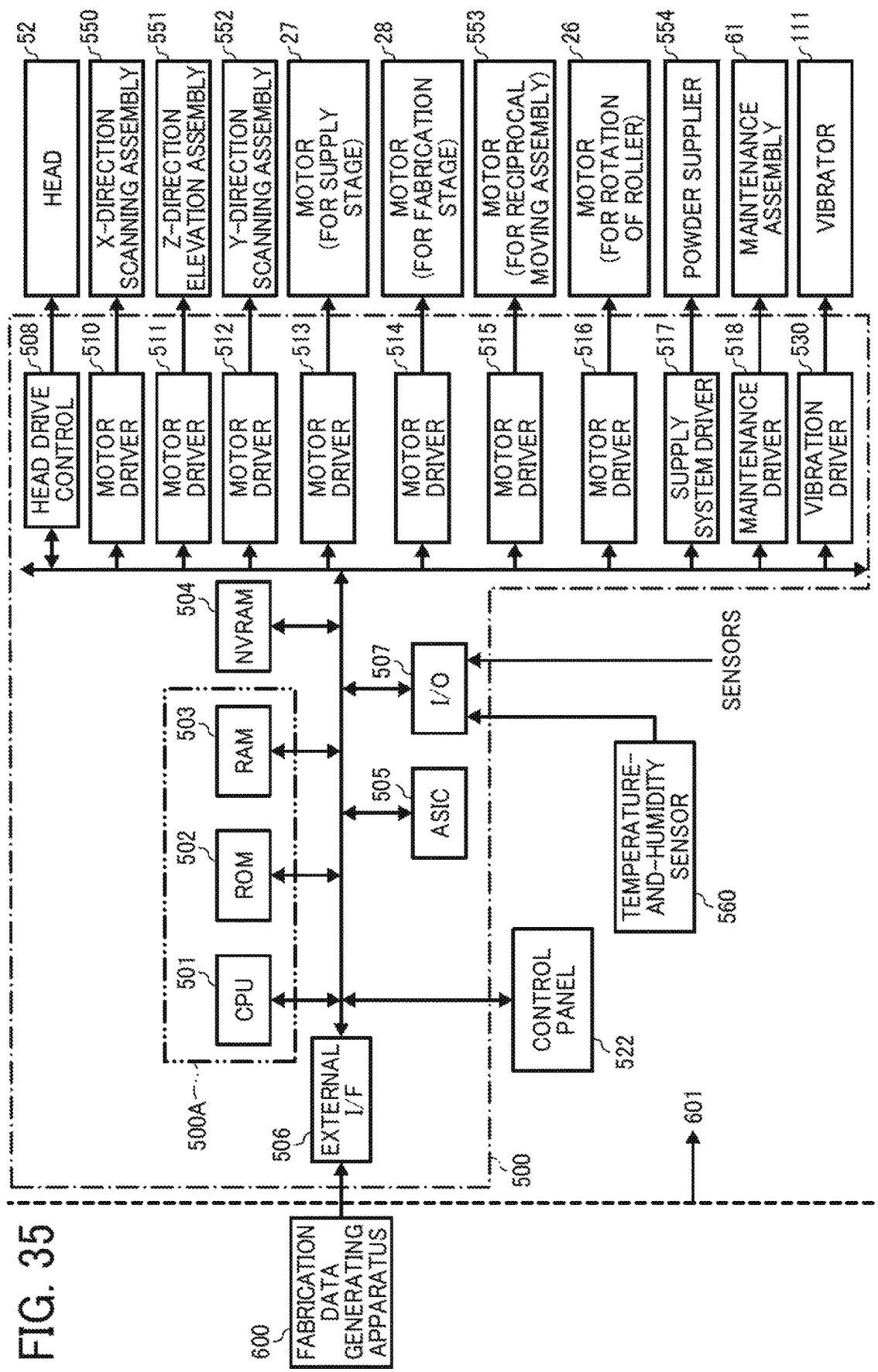
FIG. 35 is a block diagram of an outline of the controller of the three-dimensional fabricating apparatus in the fourth embodiment.

Next, an outline of a controller of the three-dimensional fabricating apparatus in this embodiment is described with reference to FIG. 35. FIG. 35 is a block diagram of the controller in the fourth embodiment.

In the fourth embodiment, the controller 500 includes a vibration driver 530 to drive the vibrator 111 to vibrate the vibration blade 110. Changing the frequency of driving signal and the drive voltage applied to the vibrator 111 from the vibration driver 530 allows changing the frequency and amplitude of vibration.

Note that the vibration of the vibration blade 110 by the vibrator 111 preferably has an amplitude of from 10 μm to 30 μm and a vibration frequency of 100 Hz and 300 Hz.

The vibration of the vibration blade 110 is applied from the vertical direction relative to the powder surface, thus allowing a reduction of deviation of the fabrication layer 30.

The bottom portion 110b of the vibration blade 110, that is, the surface of the vibration blade 110 to press the powder surface preferably has a length of approximately 25 mm in a flattening direction in which the flattening roller 12 rotates to flatten the surface of the powder 20. If the length of the bottom portion 110b of the vibration blade 110 in the flattening direction is shorter, the area of the powder pressed by the bottom portion 110b of the vibration blade 110 is smaller. When the vibration blade 110 moves in the flattening direction while pressing a narrow area of the powder, the pressed powder surface is likely to be uneven. By contrast, if the length of the bottom portion 110b of the vibration blade 110 in the flattening direction is longer, pressing is more unlikely to be performed with the bottom portion 110b and the powder surface maintained parallel to each other. Accordingly, the pressed powder surface is likely to be uneven.

The bottom portion 110b of the vibration blade 110 has a longitudinal width not less than the width of the fabrication chamber 22 (the width in a direction perpendicular to the direction indicated by arrow Y).

In this embodiment, the inclination of the tapered portion 110a of the vibration blade 110 is 45 degrees. However, the inclination is not limited to 45 degrees. The length of the tapered portion 110a in a direction along the slant surface is preferably set to approximately a length at which the powder 20 does not nm onto the vibration blade 110 when powder supply is performed while applying vibration to the powder.

Next, a flow of fabrication with the vibration applicator according to the fourth embodiment is described with reference to FIGS. 36A to 36C and 37A and 37B. FIGS. 36A to 36C and 37A and 37B are illustrations of the flow of fabrication.

Similarly with the above-described example, a description is started from a state in which a first fabrication layer 30 is formed on the fabrication stage 24 of the fabrication chamber 22.

Figure 36A:
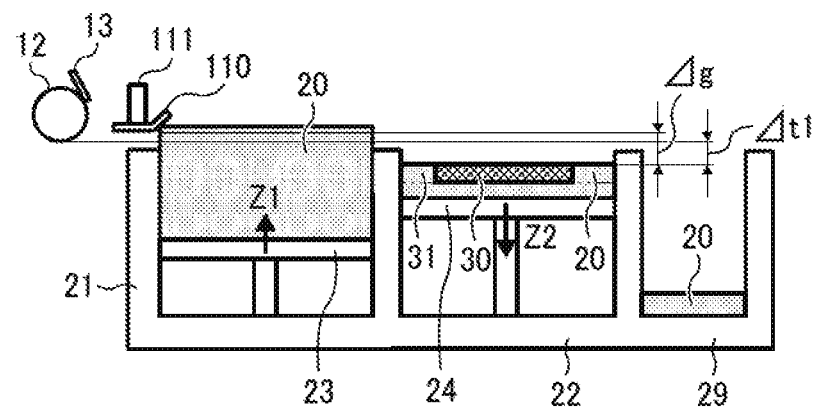
FIGS. 36A to 36C are illustrations of a flow of fabrication with the vibration applicator according to the fourth embodiment.

When a second fabrication layer 30 is formed on the first fabrication layer 30, as illustrated in FIG. 36A, the supply stage 23 of the supply chamber 21 moves upward in the direction indicated by arrow Z1, and the fabrication stage 24 of the fabrication chamber 22 moves downward in a direction indicated by arrow Z2.

At this time, a downward movement distance of the fabrication stage 24 is set so that a distance between the surface (powder surface) of the powder layer 31 of the fabrication chamber 22 and a lower portion (lower tangential portion) of the flattening roller 12 is Δt1. The distance Δt1 corresponds to the thickness of the powder layer 31 to be formed next. The vibration blade 110 is disposed at a position at which the vibration blade 110 has a gap Δg between a bottom surface of the bottom portion 110b and the powder surface of the fabrication layer 30.

Figure 36B:
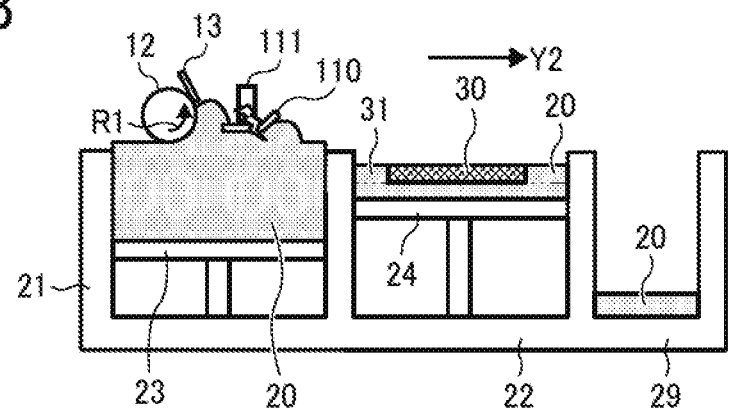

Next, as illustrated in FIG. 36B, by moving the flattening roller 12 in the direction indicated by arrow Y2 toward the fabrication chamber 22 while rotating the flattening roller 12 in the reverse direction (indicated by arrow R1), powder 20 is transferred and supplied to the fabrication chamber 22. At this time, the vibrator 111 is driven to vibrate the vibration blade 110, and powder transfer and supply are performed with vibration applied to the powder 20 to be supplied onto the existing powder layer 31 (powder vibration supply).

Figure 36C:
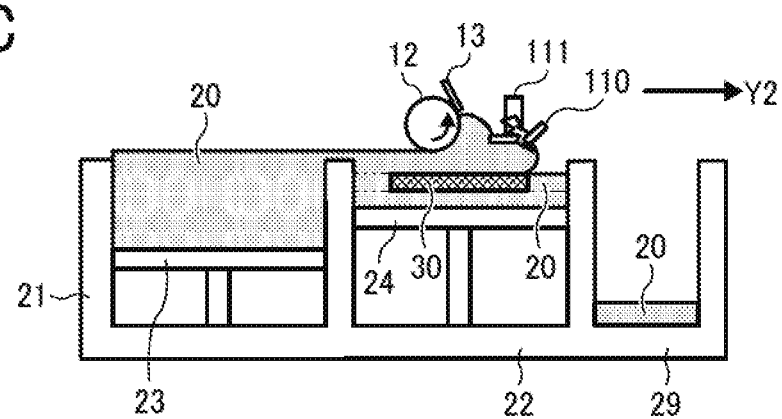

As illustrated in FIG. 36C, the flattening roller 12 is moved in parallel to the stage surface of the fabrication stage 24 of the fabrication chamber 22 to flatten the powder 20 while supplying the powder 20. Thus, the powder layer 31 is formed at a thickness of Δt1. At this time, by vibrating the vibration blade 110, with vibration being applied to the powder 20 to be supplied, powder supply and flattening are performed (powder vibration supply and flattening).

When the flattening roller 12 passes the fabrication chamber 22, driving of the vibrator 111 is stopped to stop the vibration of the vibration blade 110.

Figure 37A:
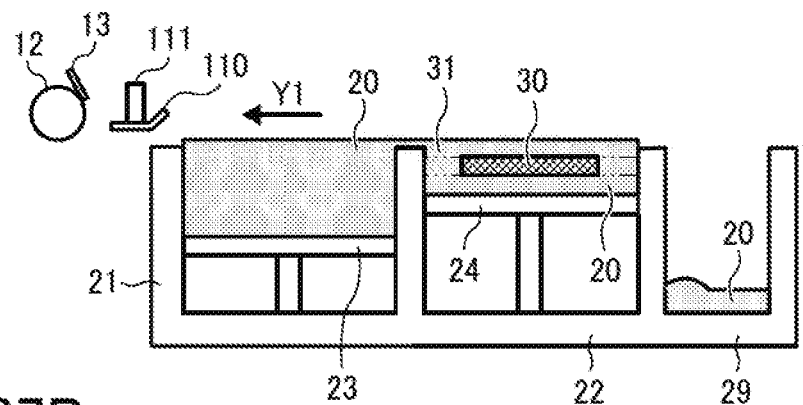
FIGS. 37A and 37B are illustrations of a flow of fabrication subsequent to the flow of FIGS. 36A to 36C.

As illustrated in FIG. 37A, the flattening roller 12 and the vibration blade 110 are moved in the Y1 direction to return to the initial position. While the flattening roller 12 and the vibration blade 110 are moved in the Y1 direction, driving of the vibrator 111 remains stopped.

Figure 37B:
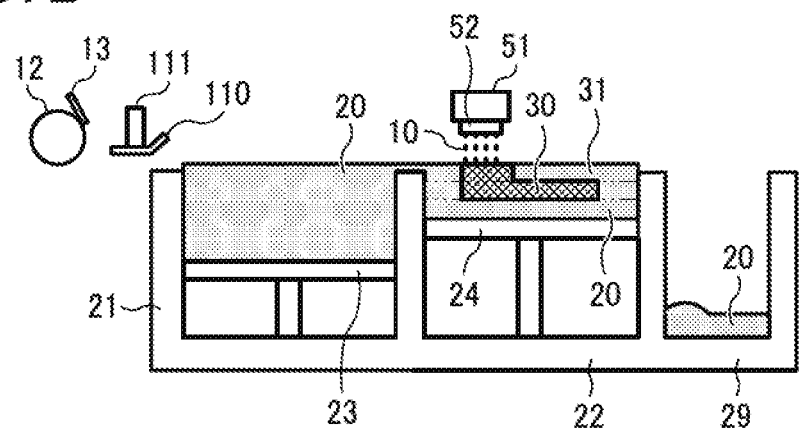

Then, as illustrated in FIG. 37B, droplets of fabrication liquid 10 are discharged from the heads 52 of the liquid discharge unit 50 to form and laminate the fabrication layer 30 on the powder layer 31 (fabrication).

Since pressure is applied to the powder 20, which is supplied while the vibration blade 110 applies vibration, the powder surface pressed is likely to be uneven. If aggregated powder 20 adheres to the bottom portion 110b of the vibration blade 110, that is, the surface to press the powder 20, drag marks are likely to occur on the powder surface when the vibration blade 110 moves on the fabrication chamber 22 in the flattening direction.

Accordingly, to enhance the accuracy of a resultant fabrication object, the powder surface is flattened after the powder 20 is supplied to the fabrication chamber 22 while the powder 20 is being vibrated with the vibration blade 110.

Hence, in this embodiment, the vibration blade 110 is disposed forward in the direction of movement of the flattening roller 12. Such a configuration allows vibration supply and flattening of the powder surface to be performed by a single movement, thus allowing more simple mechanism and control.

Note that, since the powder 20 is likely to scatter when the flattening roller 12 is rotated in the reverse direction to flatten the powder 20, the vibration blade 110 and the vibrator 111 are preferably covered with a protector, such as a protection film.

Changing driving signals transmitted from the vibration driver 530 allows control of the drive frequency (vibration frequency) and the vibration amplitude of the vibrator 111. In such a case, the vibrator 111 is preferably a piezoelectric element, in particular, a laminated piezoelectric element.

Such a configuration allows the vibration conditions (the frequency and amplitude of vibration) to be set in accordance with the powder type. Regardless of the powder type, the packing density of powder can be increased, thus allowing an increase in the density of a fabrication object.

As described above, the gap between the vibration blade 110 and the powder surface of the fabrication chamber 22 (the surface of the powder layer 31) is adjusted with the height adjustment member 153 and the adjustment operation member 154.

Hence, by adjusting the height of the vibration blade 110 in accordance with the type of the powder 20 and the state of the powder 20 (for example, a storage environment or a fabrication environment), vibration application and fabrication are performed under optimal vibration conditions, thus increasing the density and accuracy of the fabrication object.

In such a case, a configuration is employed in which the adjustment operation members 154 are driven using an actuator, such as a motor. By detecting the type and state of the powder 20, the adjustment operation member 154 is driven in accordance with results of the detection to adjust the height (the gap Δg) of the vibration blade 110.

By simultaneously driving the two adjustment operation members 154, the height of the vibration blade 110 is adjusted so that the vibration blade 110 is parallel to the longitudinal direction of the flattening roller 12. Accordingly, the vibration blade 110 is maintained to be parallel to the powder surface, thus obtaining an even density of the fabrication object.

Next, an example of the relationships among the gap Δg between the powder surface of the powder chamber and the frequency and amplitude of vibration is described with reference to FIG. 38.

Figure 38:
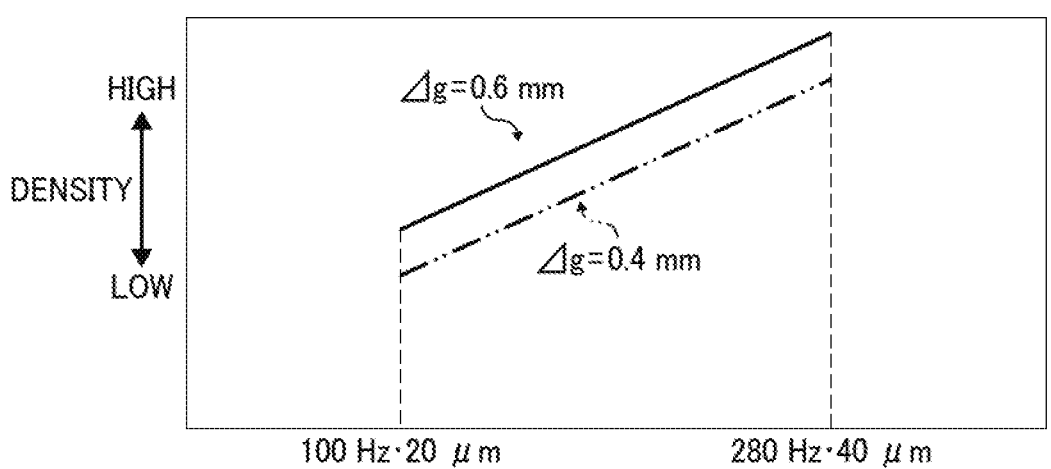
FIG. 38 is an illustration of an example of the relationships among the gap $\Delta g$ between the powder surface of the powder chamber and the frequency and amplitude of vibration.

In the example of FIG. 38, a powder, such as SUS powder, of a high specific gravity, is used as the powder 20. The gap Δg is set to 0.6 mm and 0.4 mm. In FIG. 38 are illustrated measurement results of the powder density obtained when the vibration frequency is changed from 100 Hz to 280 Hz and the vibration amplitude is changed from 20 μm to 40 μm.

From the results, it is found that, for the powder 20 of a high specific gravity, such as SUS powder, as the gap Δg is greater, the density is higher. It is also found that, as the frequency and amplitude of vibration are greater, the density is higher.

In such a case, as the gap Δg is greater, the amount of powder to be supplied is greater. In such a configuration, since the powder also acts as a cushion in movement, a deviation or damage of the fabrication layer already fabricated is prevented, thus increasing the packing density of the powder and the resultant fabrication object.

Next, a fifth embodiment of the present disclosure is described with reference to FIGS. 39A to 39C and FIGS. 40A to 40C. FIGS. 39A to 39C and FIGS. 40A to 40C are illustrations of the flow of fabrication in the fifth embodiment.

The configurations of the three-dimensional fabricating apparatus and the controller in the fifth embodiment are similar to, even if not the same as, the configurations in the fourth embodiment.

Figure 39A:
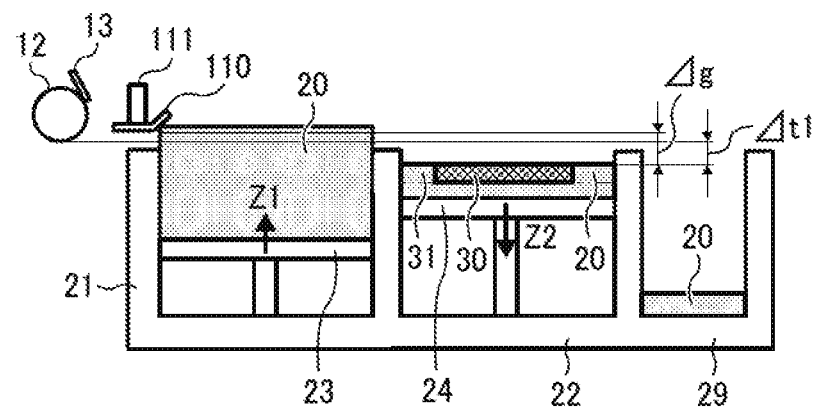
FIGS. 39A to 39C are illustrations of a flow of fabrication with the vibration applicator according to a fifth embodiment of the present disclosure.
Figure 39B:
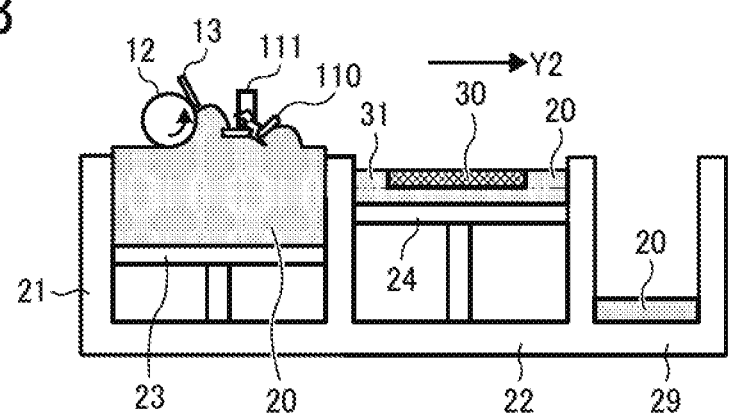
Figure 39C:
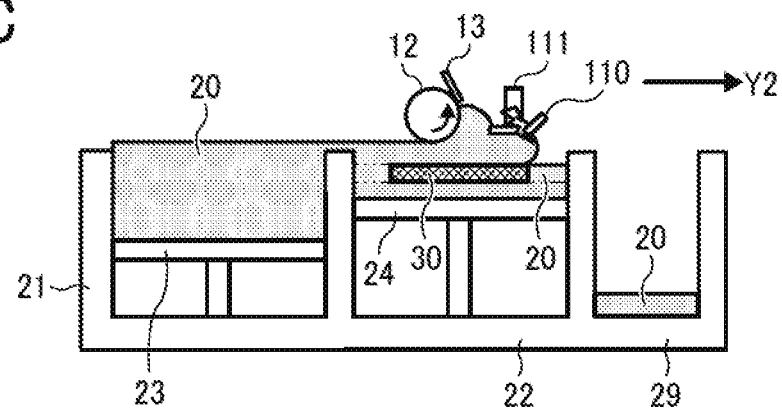

In the fifth embodiment, as illustrated in FIGS. 39A to 39C, the flattening roller 12 is moved in parallel to the stage surface of the fabrication stage 24 of the fabrication chamber 22. In a state in which, by vibrating the vibration blade 110, vibration is applied to the powder 20 to be supplied, flattening is performed while supplying the powder 20, to form the powder layer 31 at a predetermined thickness $\Delta t1$.

Figure 40A:
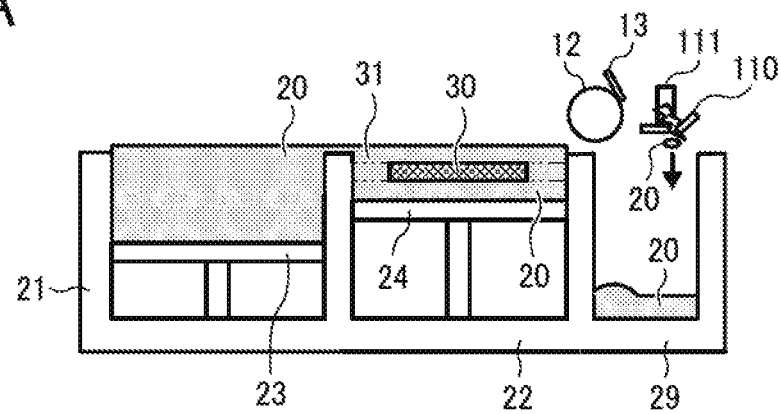
FIGS. 40A to 40C are illustrations of a flow of fabrication subsequent to the flow of FIGS. 39A to 39C.

Then, as illustrated in FIG. 40A, after the flattening roller 12 passes above the fabrication chamber 22, driving of the vibrator 111 is stopped to stop the vibration blade 110. Then, the flattening roller 12 and the vibration blade 110 are moved to a position above the surplus powder chamber 29.

Then, the vibrator 111 stopped is driven again to vibrate the vibration blade 110. At this time, the time of driving the vibrator 111 again is a very short time (e.g., within one second).

As described above, by vibrating the vibration blade 110 once stopped, residual powder 20, which having adhered to and remained on the vibration blade 110 at the start of vibration, is peeled off. Thus, the vibration blade 110 is cleaned.

Figure 40B:
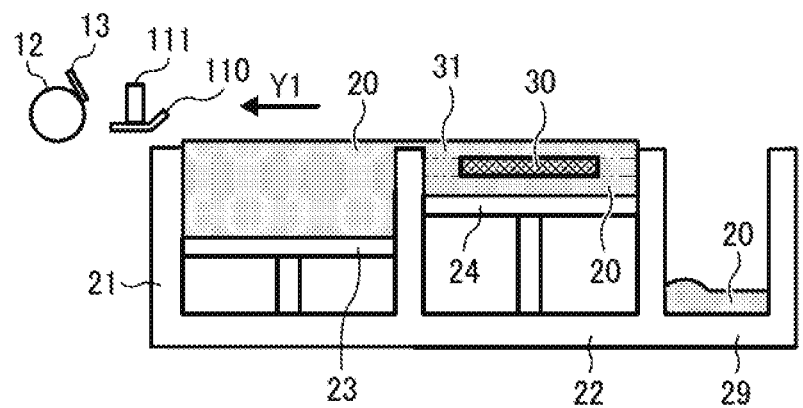
Figure 40C:
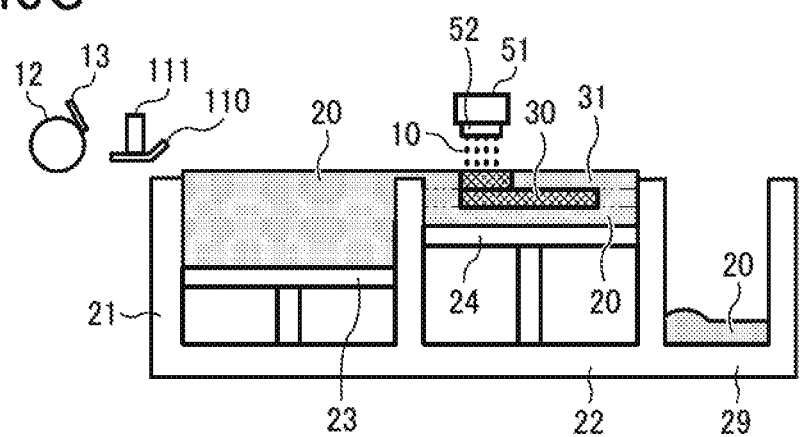

Note that, in a state in which vibration is stopped after the vibrator 111 is driven again, as illustrated in FIG. 40B, the flattening roller 12 and the vibration blade 110 are returned to the original positions (initial positions).

When the vibration blade 110 is returned to the initial position, as described above, residual powder of the vibration blade 110 is already peeled off and cleaned, thus preventing the powder 20 from dropping on the powder layer 31 flattened in the fabrication chamber 22. Such a configuration prevents non-discharge of liquid from nozzles due to powder adhering to the heads 52, thus securing the density and accuracy of the resultant fabrication object.

Figure 41:
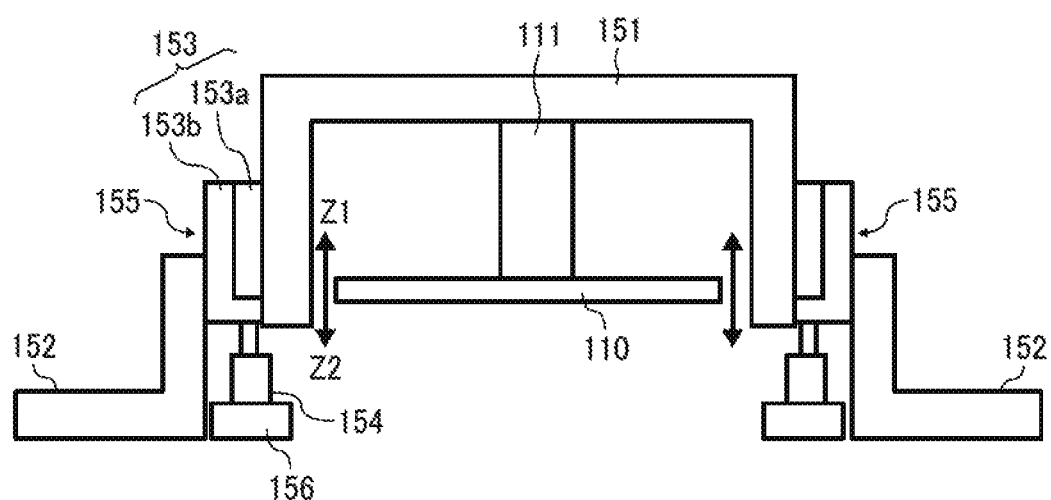
FIG. 41 is a front view of adjustment of the height of the vibration blade of the three-dimensional fabricating apparatus in a sixth embodiment of the present disclosure.

Next, a sixth embodiment of the present disclosure is described with reference to FIG. 41. FIG. 41 is a front view of adjustment of the height of the vibration blade of the three-dimensional fabricating apparatus in the sixth embodiment.

In the sixth embodiment, the height adjusters 155 described in the fourth embodiment includes a vibrator elevation actuator 156 to rotate and drive the adjustment operation member 154. Note that other configurations are similar to, even if not the same as, the configurations of the fourth embodiment.

Figure 42:
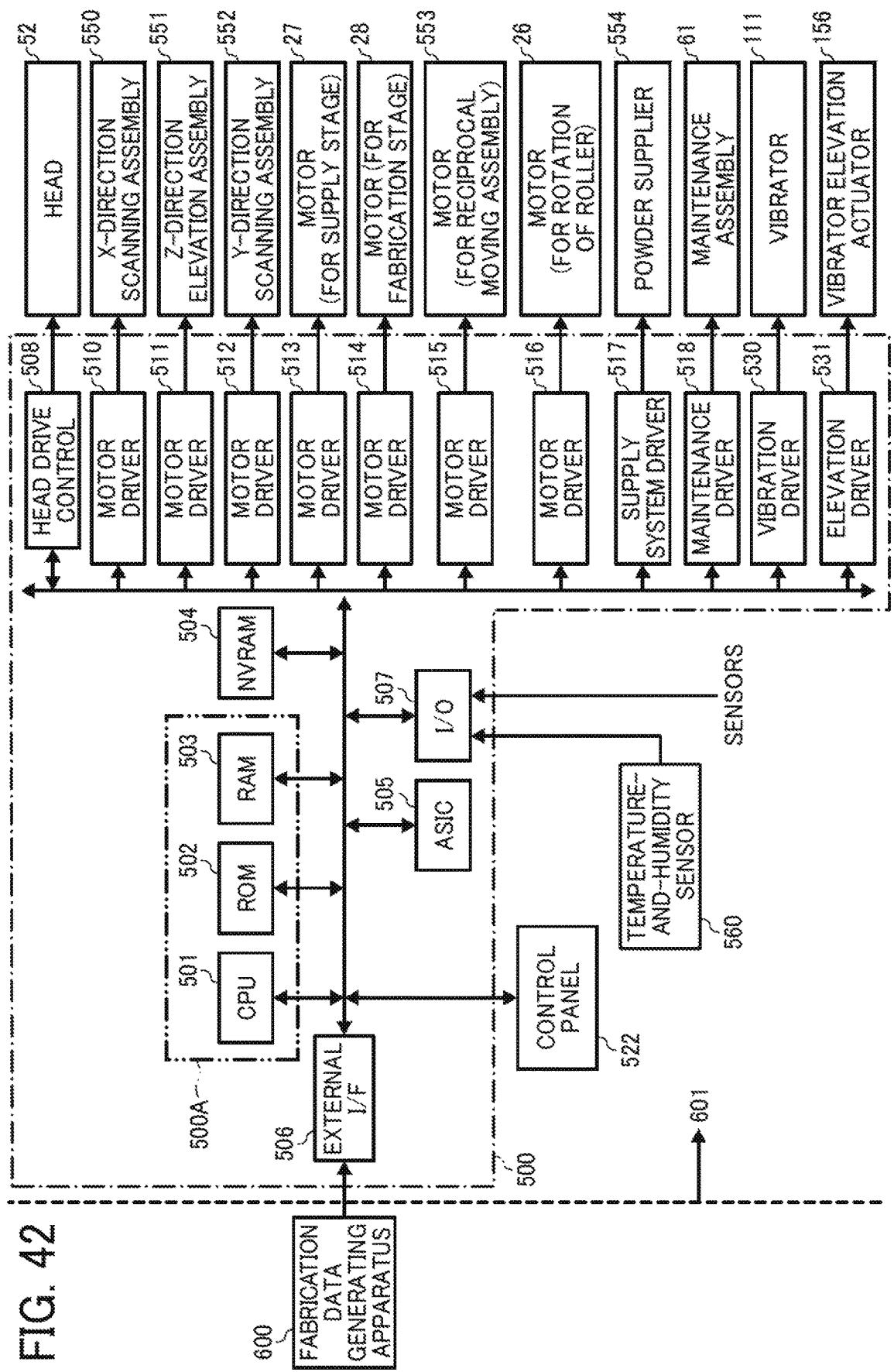
FIG. 42 is a block diagram of a controller of the three-dimensional fabricating apparatus according to the sixth embodiment.

Next, the controller in the sixth embodiment is described with reference to FIG. 42. FIG. 42 is a block diagram of a controller of the three-dimensional fabricating apparatus 601 according to the sixth embodiment.

In the fourth embodiment, the controller 500 includes a vibration driver 530 to drive the vibrator 111 to vibrate the vibration blade 110. The main controller 500A changes the frequency of driving signal and the drive voltage applied to the vibrator 111 from the vibration driver 530 to perform vibration frequency control and amplitude control to change the frequency and amplitude of vibration of the vibration blade 110.

The main controller 500A includes an elevation driver 531 to drive the vibrator elevation actuator 156. The main controller 500A performs gap control to control driving of the vibrator elevation actuator 156 via the elevation driver 531 to adjust the height of the vibration blade 110 and change the gap $\Delta g$ between the vibration blade 110 and the powder surface of the fabrication chamber 22.

Note that, in the following examples, the vibration frequency control, the vibration amplitude control, the gap control are separately described. However, the vibration frequency control, the vibration amplitude control, the gap control may be performed in combination thereof.

Next, an example of positional deviation and deformation of the fabrication layer, which may occur in flattening after tapping (pressing) of powder with blade vibration in the step of formation of the powder layer is described with reference to FIG. 43.

Figure 43:
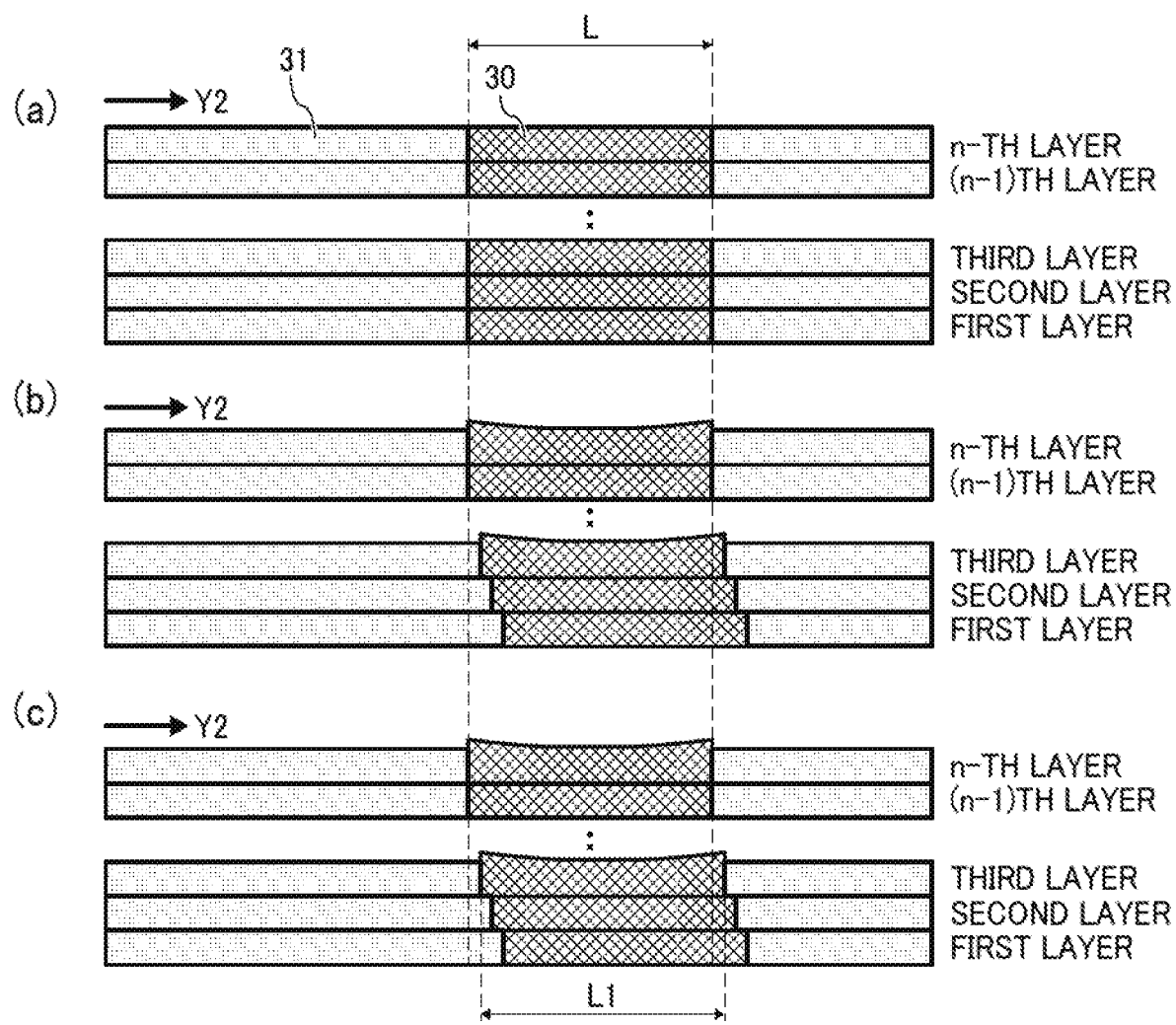
FIG. 43 is an illustration of an example of positional deviation and deformation of the fabrication layer.

As illustrated in (a) of FIG. 43, when fabrication layers 30 each having a rectangular cross section of a length L are laminated and fabricated, ideally, the fabrication layers 30 each having the rectangular cross section of the length L are fabricated without any positional deviation in any layer of from the lowermost first fabrication layer 30 to the uppermost nth fabrication layer 30.

However, as illustrated in (b) of FIG. 43, a positional deviation in the direction of movement of the flattening roller 12 may occur between the fabrication layers 30 each having the rectangular cross section of the length L. Alternatively, as illustrated in (c) of FIG. 43, the fabrication layers 30 may expand and deform (the length L1 of the fabrication layers 30 in the rectangular cross section may be greater than the length L illustrated in FIG. 43A). Further, mixed deformation of the above-described positional deviation and expansion deformation may occur in the fabrication layers 30.

The positional deviation and deformation of the fabrication layer 30 is more likely to occur as the position of the fabrication layer 30 is lower and less likely to occur as the position of the fabrication layer 30 is higher. One possible reason is that, as the volume of the fabrication layer 30 is less, in other words, the weight is smaller, the vibration applied from the upper side is likely to affect the fabrication layer 30.

Accordingly, when a certain number of fabrication layers 30 are laminated, positional deviation and deformation does not occur or occurs at a substantially negligible amount in an upper one of the fabrication layers 30.

For example, when a several hundreds of fabrication layers are laminated, though depending on the type of powder and the type and discharge conditions of fabrication liquid, positional deviation and deformation are substantially negligible in fabrication layers higher than the tenth or several tenth layer.

Figure 44:
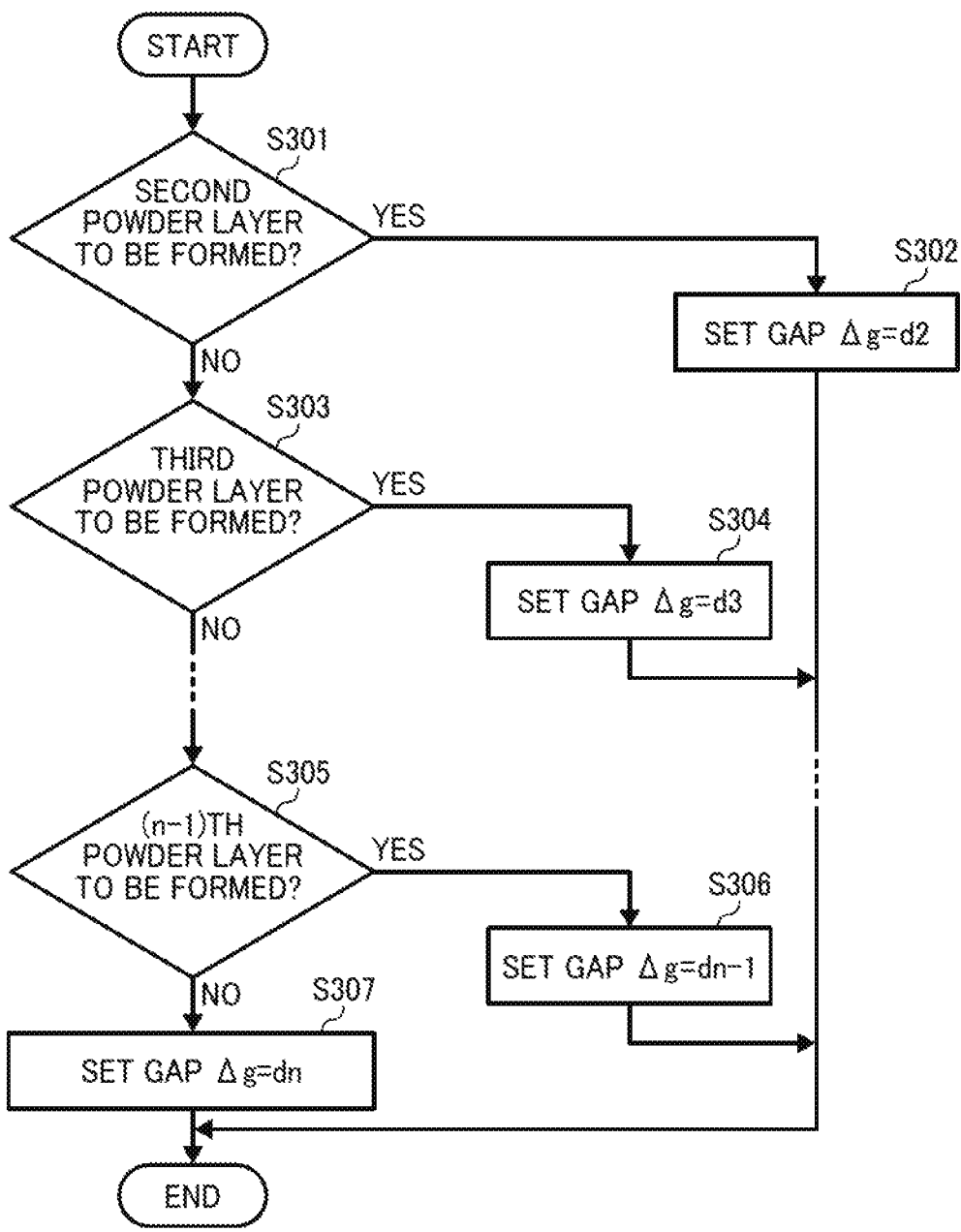
FIG. 44 is a flowchart of gap control in the sixth embodiment.
Figure 45A:
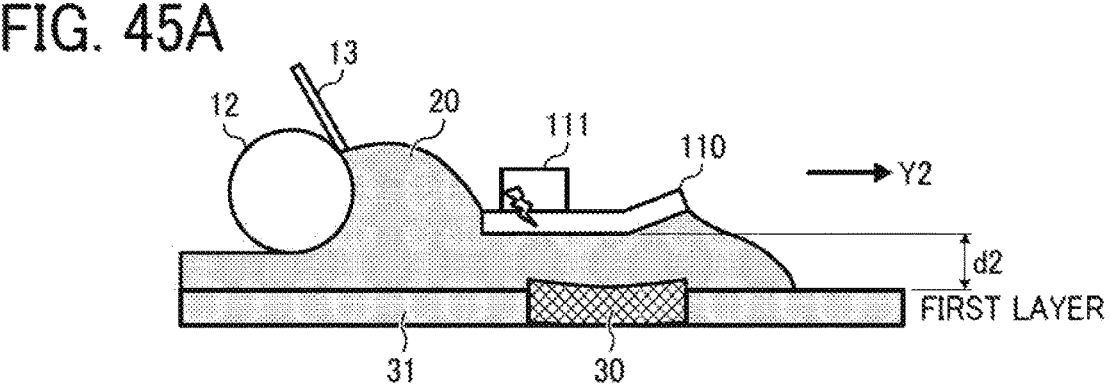
FIGS. 45A to 45C are illustrations of the gap control in the sixth embodiment.
Figure 45B:
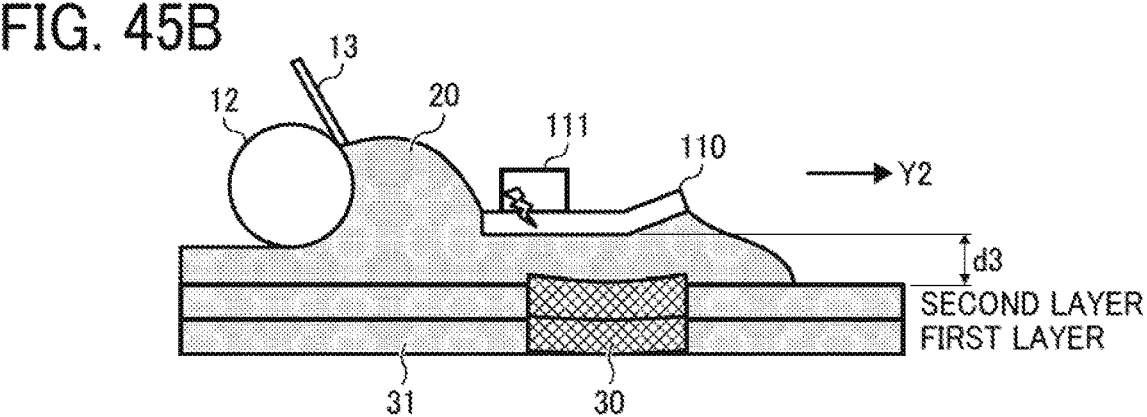
Figure 45C:
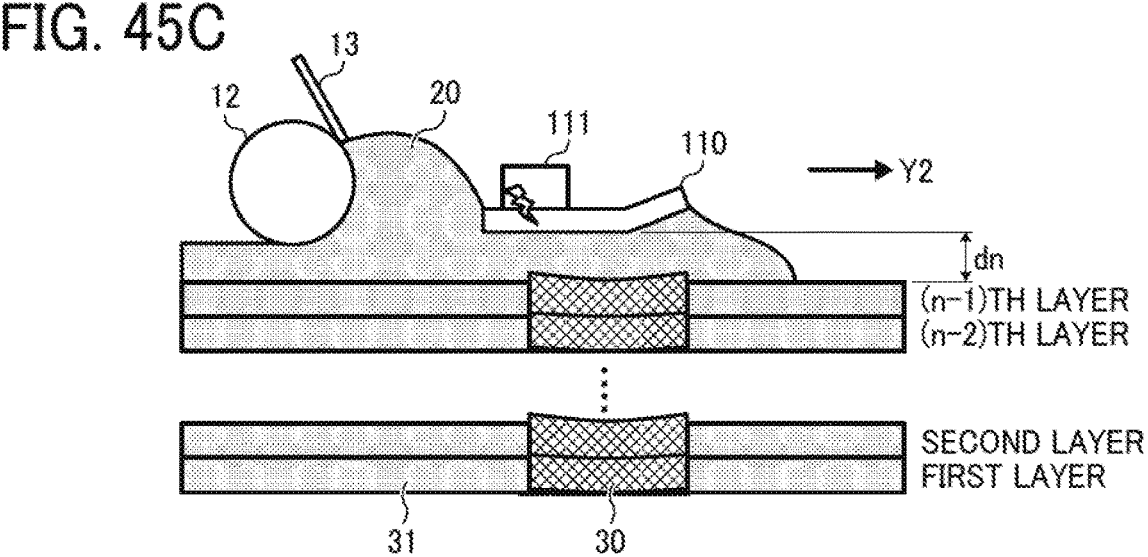

Next, the gap control in the sixth embodiment is described with reference to FIGS. 44 and 45A to 45C. FIG. 44 is a flowchart of the gap control in the sixth embodiment. FIGS. 45A to 45C are illustrations of the gap control.

At S301, the controller 500A determines the layer number of the powder layer 31 to be formed. When the powder layer 31 to be formed is a second powder layer (YES at S301), at S302 the controller 500A sets the gap $\Delta g$ between the vibration blade 110 and the powder surface of the fabrication chamber 22 to d2 (FIG. 45A). When the powder layer 31 to be formed is a third powder layer (NO at S301 and YES at S303), at S304 the controller 500A sets the gap Δg to d3 (FIG. 45B). The following steps are performed similarly. When the powder layer 31 to be formed is an (n−1)th powder layer (YES at S305), at S306 the controller 500A sets the gap Δg to dn−1. When the powder layer 31 to be formed is an nth powder layer (NO at S305), at S307 the controller 500A sets the gap Δg to dn (FIG. 45C).

Here, the relation of d2>d3> . . . >dn−1>dn is set. As the layer number of the fabrication layer 30 increases, the gap Δg gradually decreases.

In other words, as the gap between the vibration blade 110 and the surface of the exiting fabrication layer 30 is greater, the vibration energy transmitted from the vibration blade 110 to a lower fabrication layer 30 is lower and the vibration force received by the fabrication layer 30 is smaller.

Hence, the distance (the gap Δg) between the bottom portion 110b of the vibration blade 110 and the exiting uppermost fabrication layer 30 is set to be maximum when the powder 20 is supplied onto the powder layer 31 in which at least the lowermost layered fabrication object (the lowermost fabrication layer 30) has been formed. Such a configuration prevents positional deviation and deformation of the lowermost fabrication layer 30.

In addition, the gap Δg between the bottom portion 110b of the vibration blade 110 and the exiting uppermost fabrication layer 30 is set to be smaller as the number of fabrication layers 30 laminated increases. Such a configuration reduces the amount of surplus powder while reducing the positional deviation and deformation of the fabrication layers 30.

In other words, as the gap Δg between the bottom portion 110b of the vibration blade 110 and the exiting fabrication layer 30 is greater, the gap Δh between the flattening roller 12 and the vibration blade 110 is greater and the amount of powder not used for the formation of the powder layer 31 increases. Hence, in the sixth embodiment, as the position of the fabrication layer 30 is higher, the gap Δg between the flattening roller 12 and the vibration blade 110 is smaller. Such a configuration reduces the amount of surplus powder not used for the formation of the powder layer 31, thus allowing more effective use of powder.

Note that, since there is no fabrication layer 30 below the first fabrication layer 30 being the lowermost fabrication layer 30, the gap Δg in forming the first powder layer 31 is set to be a proper value, for example, the same value as the gap d2 of the second powder layer 31.

Here, the gap Δg of each fabrication layer is preferably stored in advance in, e.g., the RAM 503 of the controller 500 of the three-dimensional fabricating apparatus 601. In such a case, the gap Δg of each fabrication layer is preferably determined in advance through experiments in consideration of conditions, such as the type of the powder 20, fabrication liquid, and the thickness of laminated layers.

Figure 46:
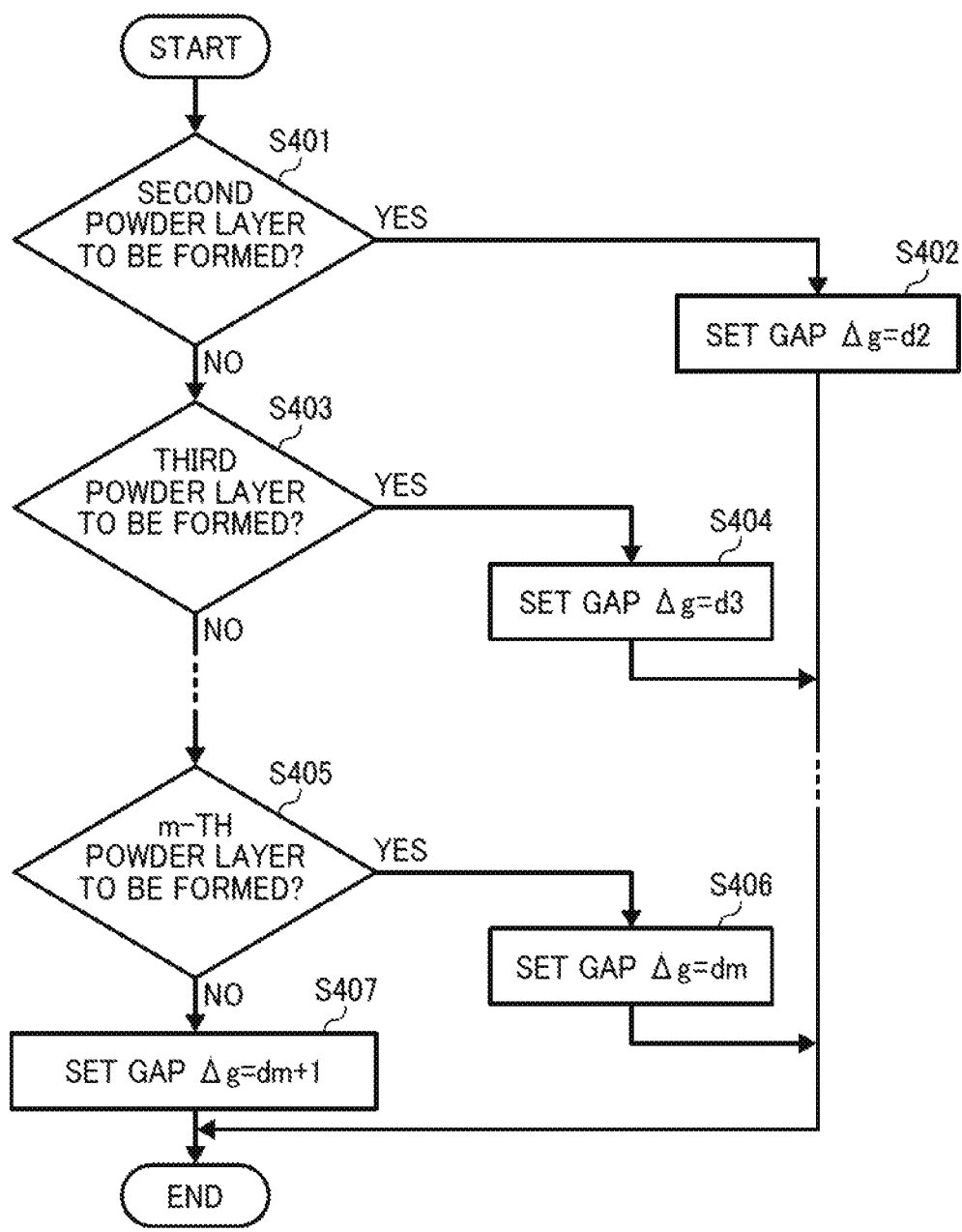
FIG. 46 is a flowchart of the gap control in a seventh embodiment of the present disclosure.

Next, a seventh embodiment of the present disclosure is described with reference to FIGS. 46 and 47A to 47D. FIG. 46 is a flowchart of the gap control in the seventh embodiment. FIGS. 47A to 47D are illustrations of the gap control.

Figure 47A:
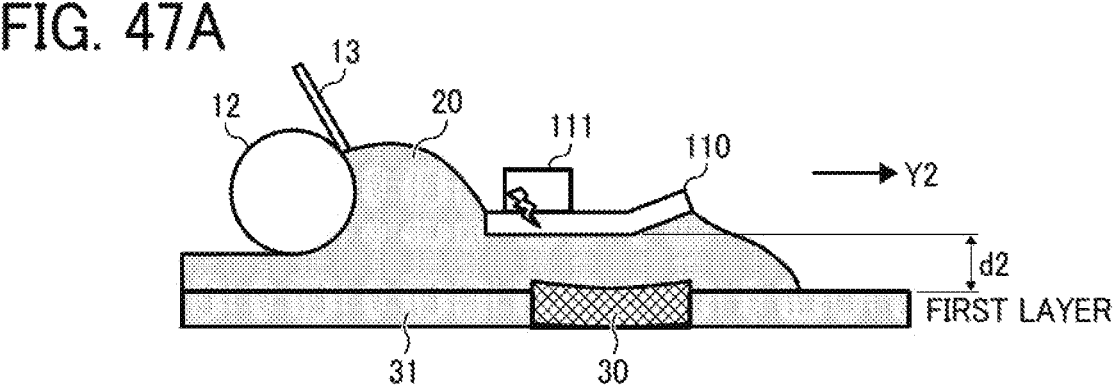
FIGS. 47A to 47D are illustrations of the gap control in the seventh embodiment.
Figure 47B:
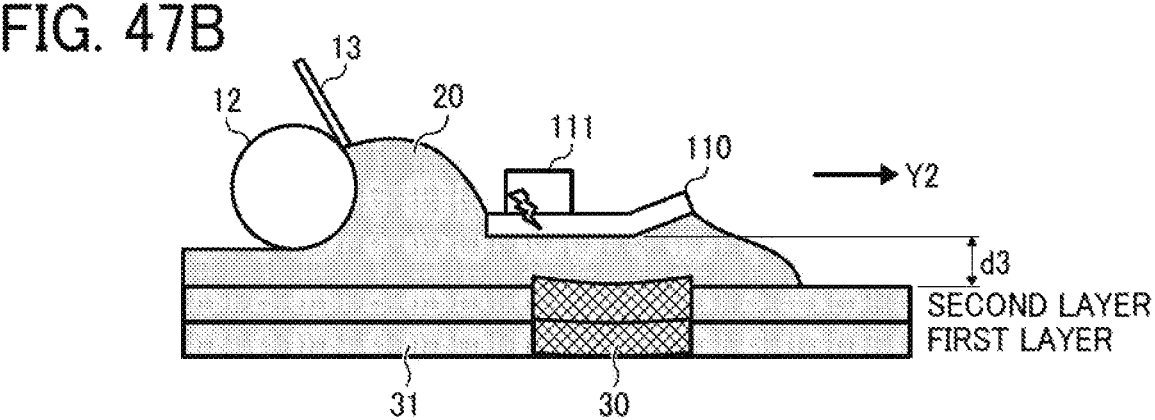
Figure 47C:
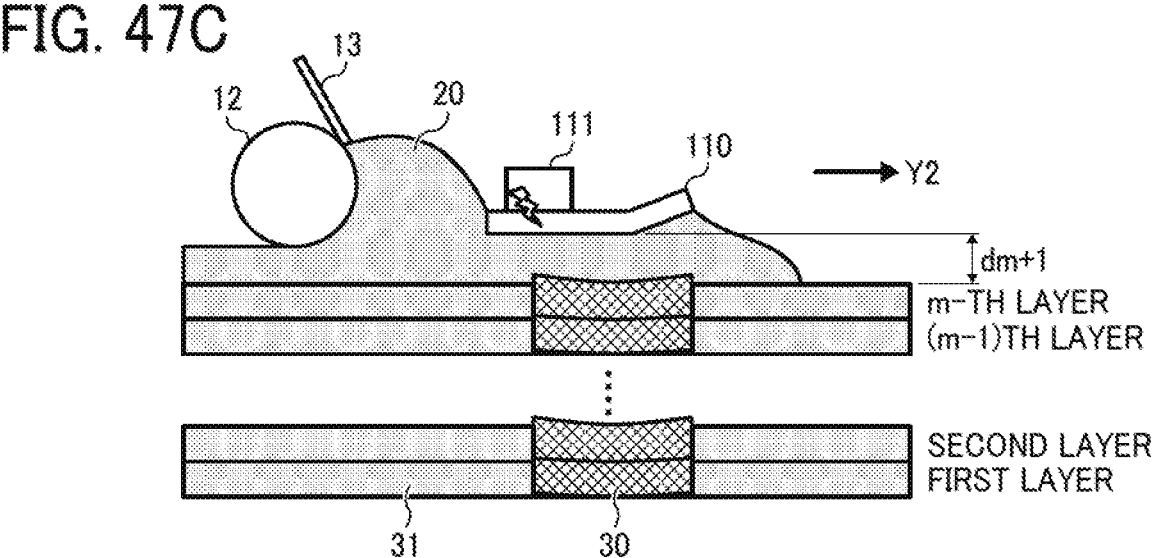
Figure 47D:
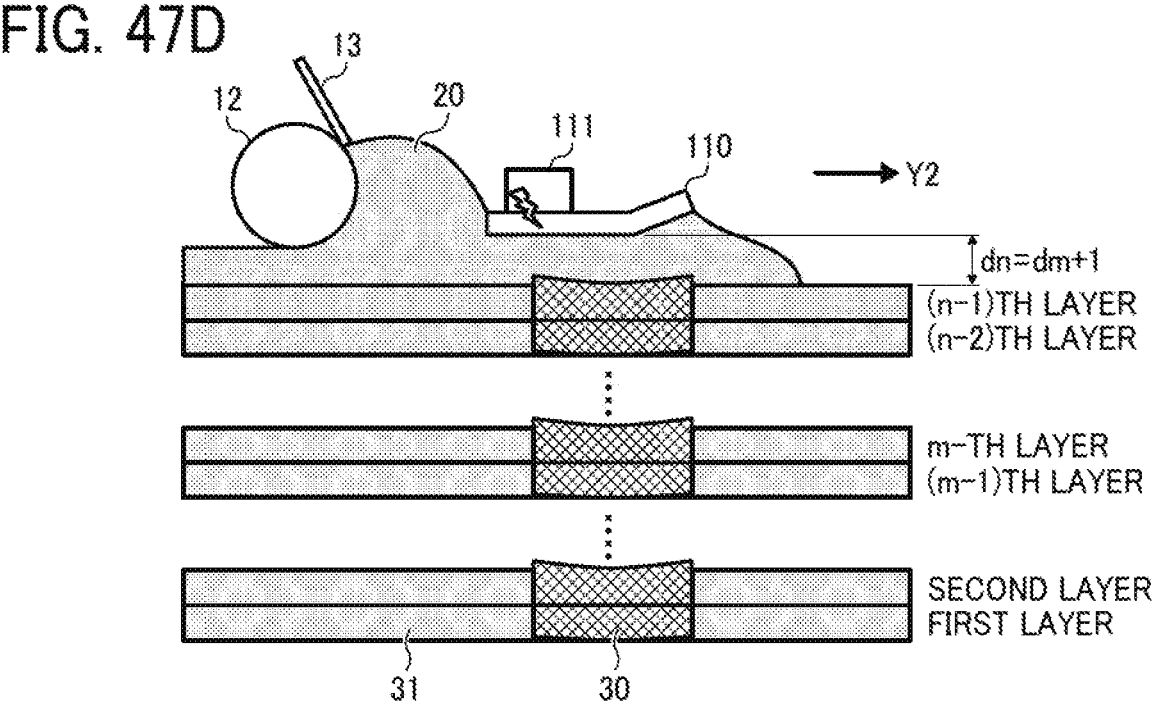

At S401, the controller 500A determines the layer number of the powder layer 31 to be formed. When the powder layer 31 to be formed is a second powder layer (YES at S401), at S402 the controller 500A sets the gap Δg between the vibration blade 110 and the powder surface of the fabrication chamber 22 to d2 (FIG. 46A). When the powder layer 31 to be formed is a third powder layer (NO at S401 and YES at S403), at S404 the controller 500A sets the gap Δg to d3 (FIG. 46B). The following steps are performed similarly. When the powder layer 31 to be formed is an m-th powder layer (m<n) (YES at S405), at S406 the controller 500A sets the gap Δg to dm. When the powder layer 31 to be formed is any layer of from an (m+1)th layer to an nth powder layer (NO at S405), at S407 the controller 500A sets the gap Δg to dm+1 (FIG. 47C).

Here, the relation of d2>d3> . . . >dm>dm+1 is set. Until the layer number of the fabrication layer 30 reaches the m-th layer, the gap Δg gradually decreases as the layer number of the fabrication layer 30 increases. For the (m+1)th and subsequent layers, the gap Δg is fixed to dm+1.

In other words, as described above, when a certain number of fabrication layers 30 are laminated, positional deviation and deformation does not occur or occurs at a substantially negligible amount in an upper one of the fabrication layers 30.

Hence, in the seventh embodiment, until the layer number reaches a predetermined threshold layer number m, the gap Δg is reduced. When the layer number exceeds the predetermined threshold layer number m, the gap Δg is set to a fixed value. Such a configuration reduces positional deviation and deformation of the fabrication layers and the amount of surplus powder, and reduces the number of switching the gap Δg, thus allowing more simple processing.

Figure 48:
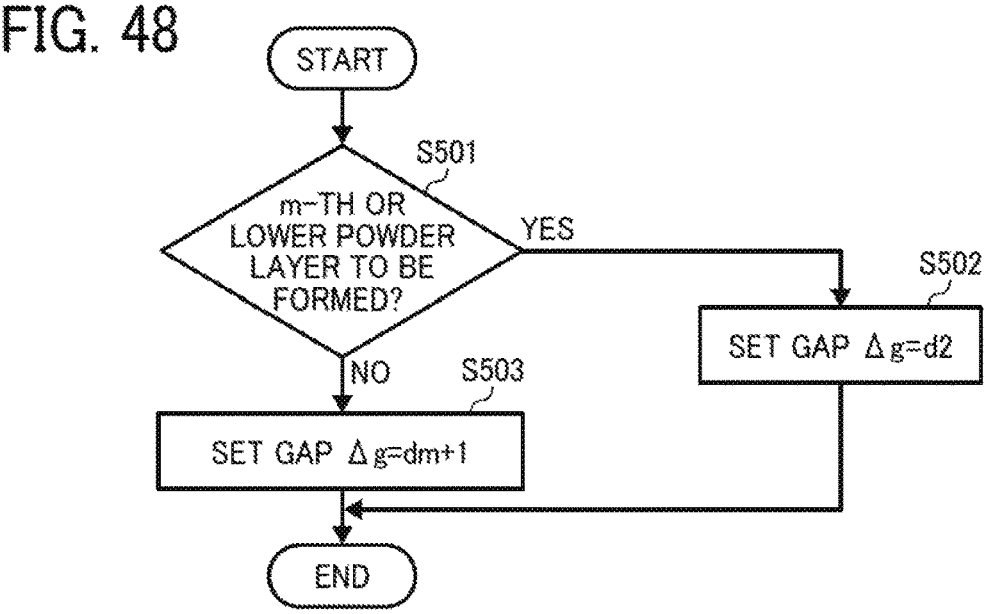
FIG. 48 is a flowchart of the gap control in the eighth embodiment of the present disclosure.

Next, an eighth embodiment of the present disclosure is described with reference to FIGS. 48 and 49A to 49D. FIG. 48 is a flowchart of the gap control in the eighth embodiment. FIGS. 49A to 49D are illustrations of the gap control.

Figure 49A:
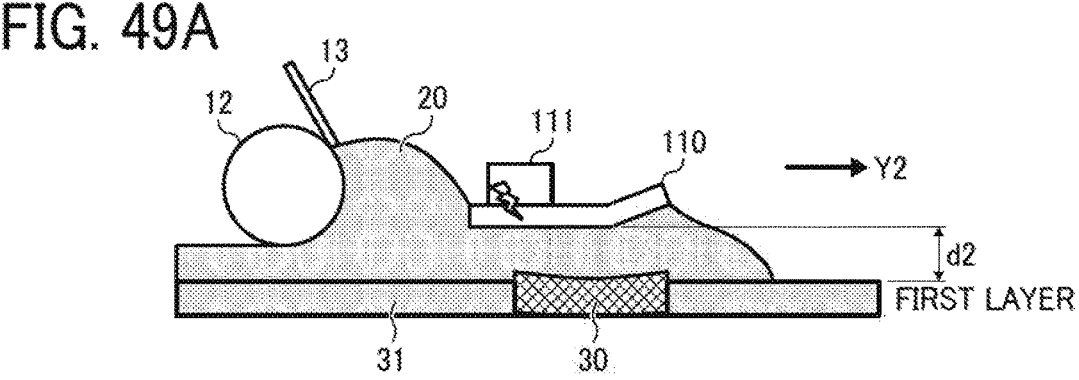
FIGS. 49A to 49D are illustrations of the gap control in the eighth embodiment of the present disclosure.
Figure 49B:
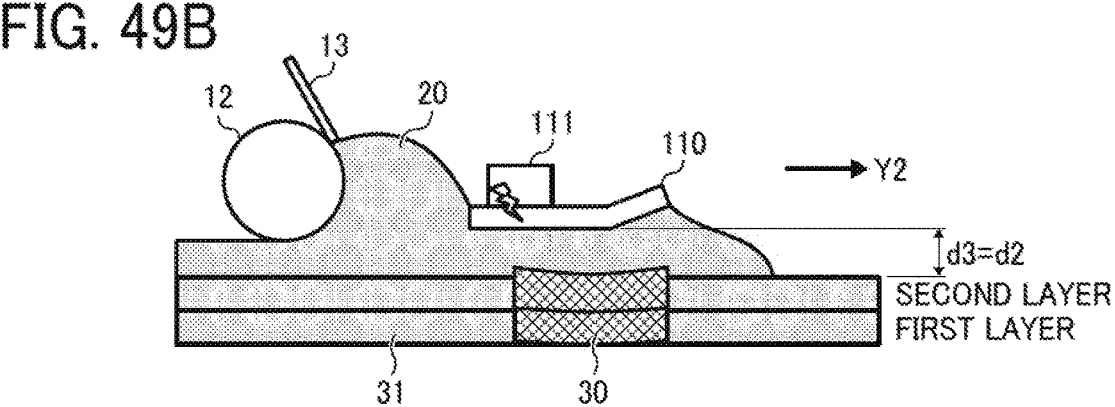
Figure 49C:
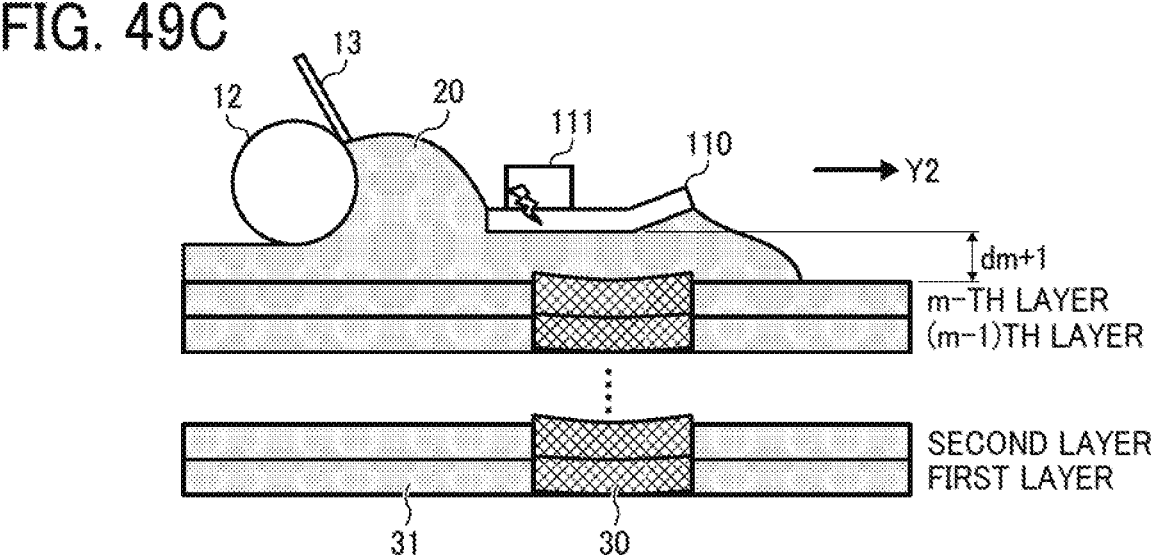
Figure 49D:
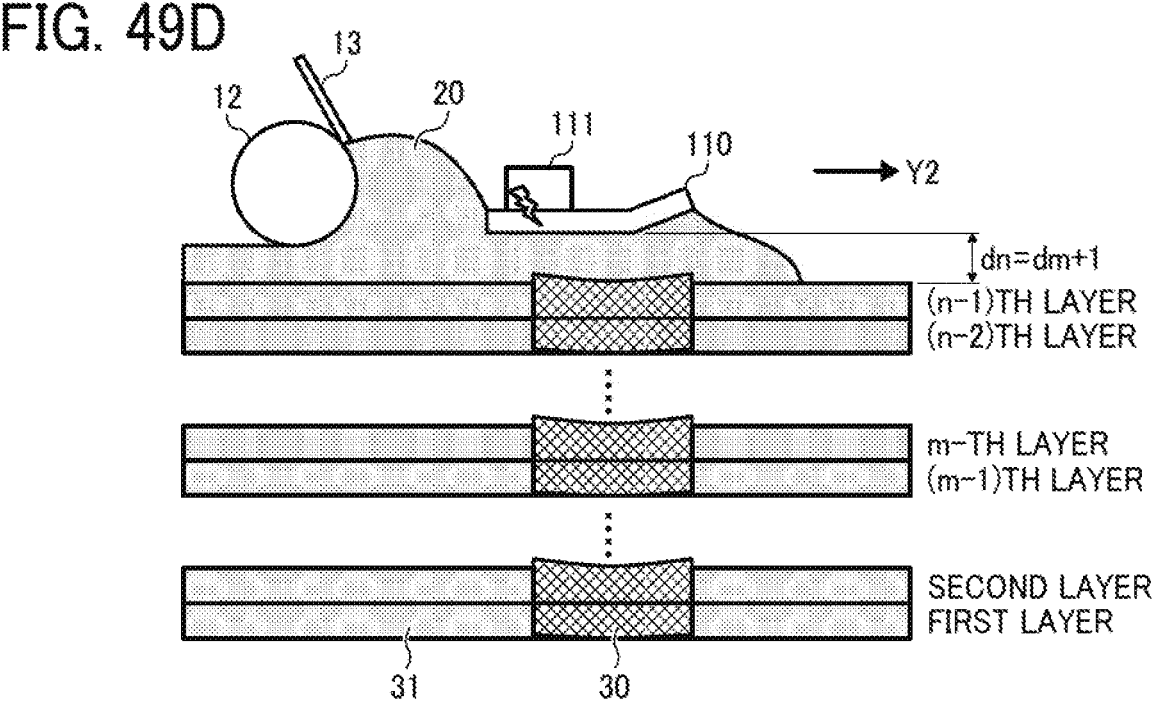

At S501, the controller 500A determines the layer number of the powder layer 31 to be formed. When the powder layer 31 to be formed is an m-th or lower powder layer (YES at S501), at S502 the controller 500A sets the gap Δg between the vibration blade 110 and the powder surface of the fabrication chamber 22 to d2 (FIGS. 49A and 49B). When the powder layer 31 to be formed is an (m+1)th or higher powder layer (NO at S501), at S503 the controller 500A sets the gap Δg to dm+1 (FIGS. 49C and 49D).

Here, the relation of d2>dn+1 is set. The gap Δg is stepwise switched based on the threshold layer number m of the fabrication layer 30.

Similarly with the second embodiment, such a configuration reduces positional deviation and deformation of the fabrication layers and the amount of surplus powder, and reduces the number of switching the gap Δg to once, thus allowing more simple processing.

Figure 50:
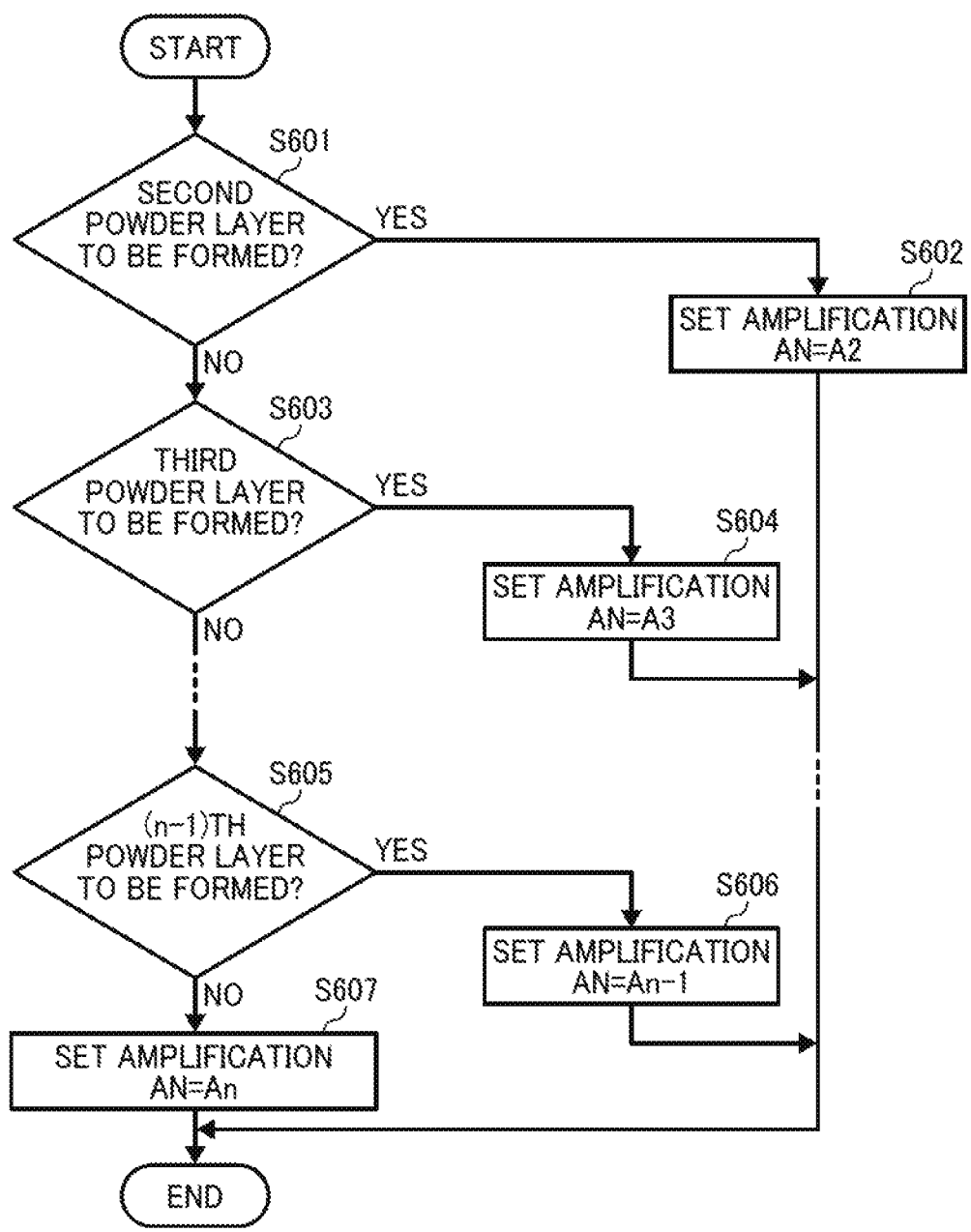
FIG. 50 is a flowchart of vibration amplitude control in a ninth embodiment of the present disclosure.

Next, a ninth embodiment of the present disclosure is described with reference to FIG. 50. FIG. 50 is a flowchart of the vibration amplitude control in the ninth embodiment.

At S601, the controller 500A determines the layer number of the powder layer 31 to be formed. When the powder layer 31 to be formed is a second powder layer (YES at S601), at S602 the controller 500A sets the vibration amplitude AN of the vibration blade 110 to A2. When the powder layer 31 to be formed is a third powder layer (NO at S601 and YES at S603), at S604 the controller 500A sets the vibration amplitude AN to A3 (FIG. 50). The following steps are performed similarly. When the powder layer 31 to be formed is an (n−1)th powder layer (YES at S605), at S606 the controller 500A sets the vibration amplitude AN to An−1. When the powder layer 31 to be formed is an nth powder layer (NO at S605), at S307 the controller 500A sets the vibration amplitude AN to An.

Here, the relation of A2>A3> . . . >An−1>An is set. As the layer number of the fabrication layer 30 increases, the vibration amplitude AN gradually increases.

In other words, as the amplitude of the vibration blade 110 is smaller, the vibration energy transmitted from the vibration blade 110 to a lower fabrication layer 30 is lower and the vibration force received by the fabrication layer 30 is smaller.

Hence, the vibration amplitude AN of the vibration blade 110 and the exiting uppermost fabrication layer 30 is set to be minimum when the powder 20 is supplied onto the powder layer 31 in which at least the lowermost layered fabrication object has been formed. Such a configuration prevents the positional deviation and deformation of the lowermost fabrication layer 30.

Increasing the vibration amplitude AN of the vibration blade 110 with an increase of the layer number enhances tapping (powder pressing) performance, thus increasing the density of powder.

Here, the vibration amplitude AN of each fabrication layer is preferably stored in advance in, e.g., the RAM 503 of the controller 500 of the three-dimensional fabricating apparatus 601. In such a case, the vibration amplitude AN of each fabrication layer is preferably determined in advance through experiments in consideration of conditions, such as the type of the powder 20, fabrication liquid, and the thickness of laminated layers.

Figure 51:
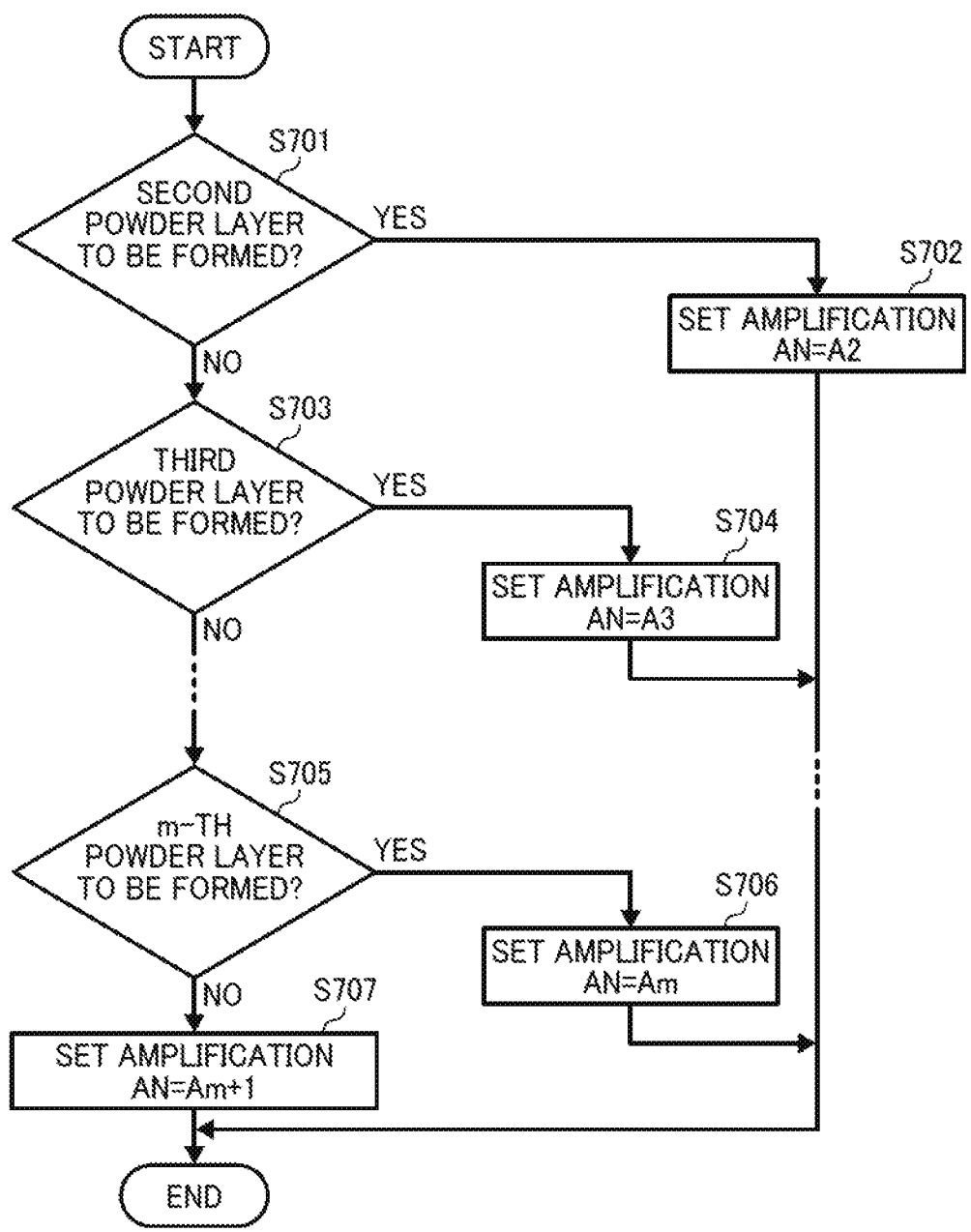
FIG. 51 is a flowchart of the vibration amplitude control in a tenth embodiment of the present disclosure.

Next, a tenth embodiment of the present disclosure will be described with reference to FIG. 51. FIG. 51 is a flowchart of the vibration amplitude control in the tenth embodiment.

At S701, the controller 500A determines the layer number of the powder layer 31 to be formed. When the powder layer 31 to be formed is a second powder layer (YES at S701), at S702 the controller 500A sets the vibration amplitude AN of the vibration blade 110 to A2. When the powder layer 31 to be formed is a third powder layer (NO at S701 and YES at S703), at S704 the controller 500A sets the vibration amplitude AN to A3. The following steps are performed similarly. When the powder layer 31 to be formed is an m-th powder layer (m<n) (YES at S705), at S706 the controller 500A sets the vibration amplitude AN to Am. When the powder layer 31 to be formed is any layer of from an (m+1)th layer to an nth powder layer (NO at S705), at S707 the controller 500A sets the vibration amplitude AN to Am+1.

Here, the relation of A2>A3> . . . >Am>Am+1 is set. Until the layer number of the fabrication layer 30 reaches the m-th layer, the vibration amplitude AN gradually increases as the layer number of the fabrication layer 30 increases. For the (m+1)th and subsequent layers, the vibration amplitude AN is fixed to Am+1.

In other words, as described above, when a certain number of fabrication layers 30 are laminated, positional deviation and deformation does not occur or occurs at a substantially negligible amount in an upper one of the fabrication layers 30.

Hence, in the tenth embodiment, until the layer number reaches a predetermined threshold layer number m, the vibration amplitude AN is increased. When the layer number exceeds the predetermined threshold layer number m, the vibration amplitude AN is set to a fixed value. Such a configuration prevents positional deviation and deformation of the fabrication layers, allows densification, and reduces the number of switching the vibration amplitude AN, thus allowing more simple processing.

Figure 52:
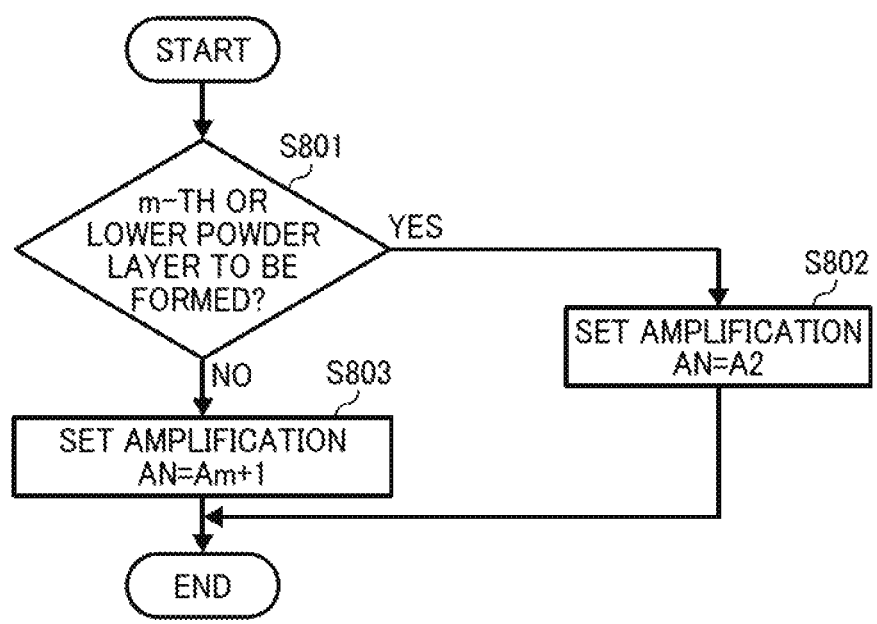
FIG. 52 is a flowchart of the vibration amplitude control in an eleventh embodiment of the present disclosure.

Next, an eleventh embodiment of the present disclosure is described with reference to FIG. 52. FIG. 52 is a flowchart of the vibration amplitude control in the eleventh embodiment.

At S801, the controller 500A determines the layer number of the powder layer 31 to be formed. When the powder layer 31 to be formed is an m-th or lower powder layer (YES at 801), at S802 the controller 500A sets the vibration amplitude AN of the vibration blade 110 to A2. When the powder layer 31 to be formed is a (m+1)th or higher powder layer (NO at S801), at S803 the controller 500A sets the vibration amplitude AN to Am+1.

Here, the relation of A2>Am+1 is set. The vibration amplitude AN is stepwisely switched based on the threshold layer number m of the fabrication layer 30. Even when the vibration amplitude AN is the threshold layer number m or lower, the vibration amplitude AN is reduced. When the vibration amplitude AN exceeds the threshold layer number m, the vibration amplitude AN is increased.

Such a configuration reduces the positional deviation and deformation of the fabrication layers, allows densification, and reduces the number of switching the vibration amplitude AN to once, thus allowing still more simple processing than the above-described tenth embodiment.

Figure 53:
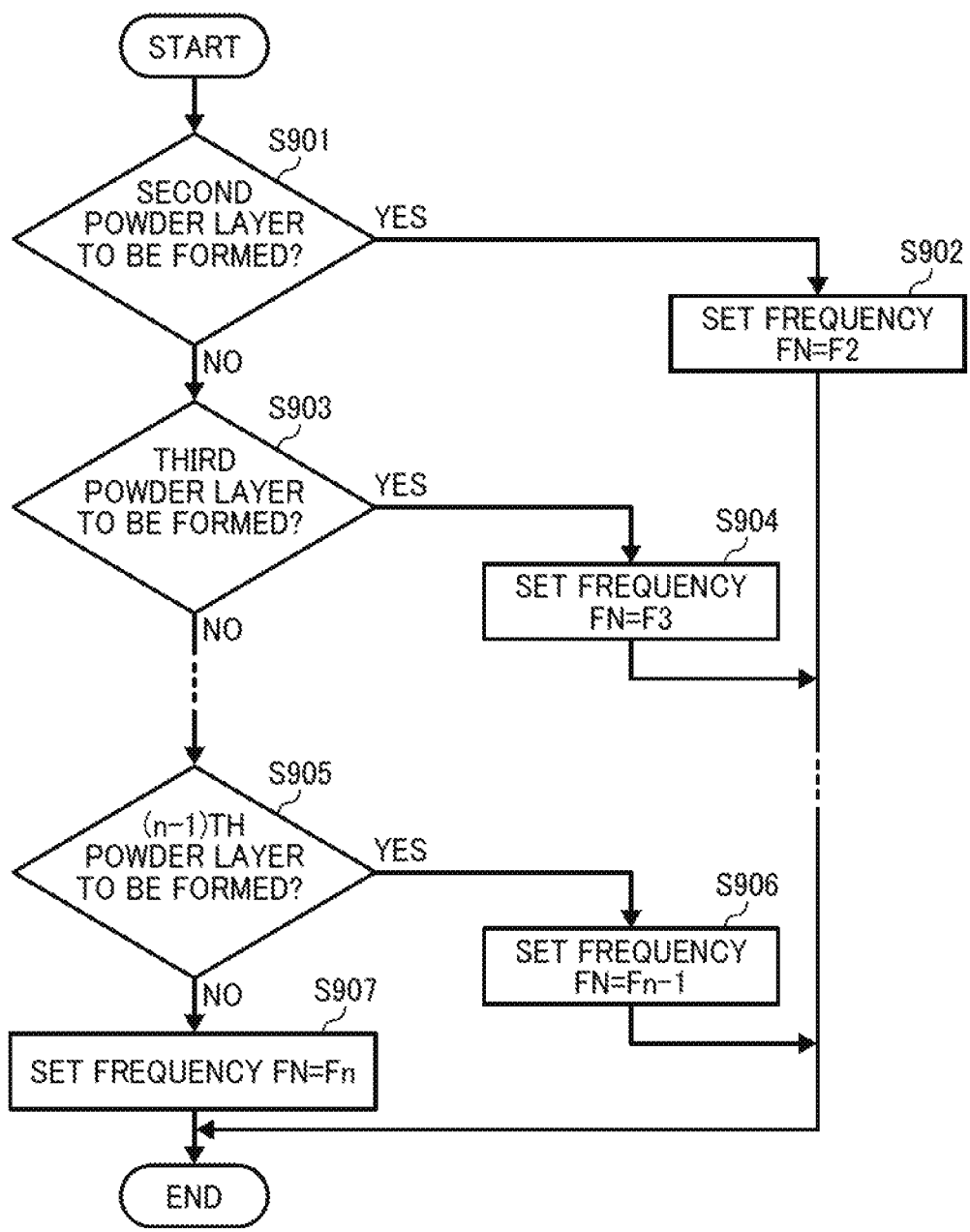
FIG. 53 is a flowchart of vibration frequency control in a twelfth embodiment of the present disclosure.

Next, a twelfth embodiment of the present disclosure is described with reference to FIG. 53. FIG. 53 is a flowchart of the vibration frequency control in the twelfth embodiment.

At S901, the controller 500A determines the layer number of the powder layer 31 to be formed. When the powder layer 31 to be formed is a second powder layer (YES at S901), at S902 the controller 500A sets the vibration frequency FN of the vibration blade 110 to F2. When the powder layer 31 to be formed is a third powder layer (NO at S901 and YES at S903), at S904 the controller 500A sets the vibration frequency FN to F3. The following steps are performed similarly. When the powder layer 31 to be formed is an (n−1)th powder layer (YES at S905), at S906 the controller 500A sets the vibration frequency FN to Fn−1. When the powder layer 31 to be formed is an nth powder layer (NO at S905), at S907 the controller 500A sets the vibration frequency FN to Fn.

Here, the relation of F2>F3> . . . >Fn−1>Fn is set. As the layer number of the fabrication layer 30 increases, the vibration frequency FN gradually increases (becomes higher).

In other words, as the vibration frequency of the vibration blade 110 is smaller, the vibration energy transmitted from the vibration blade 110 to a lower fabrication layer 30 is lower and the vibration force received by the fabrication layer 30 is smaller.

Hence, the vibration frequency FN of the vibration blade 110 and the exiting uppermost 30 is set to be minimum when the powder 20 is supplied onto the powder layer 31 in which at least the lowermost layered fabrication object has been formed. Further, by applying slower vibration, the positional deviation and deformation of the lowermost fabrication layer 30 is prevented.

Increasing the vibration frequency FN of the vibration blade 110 with an increase of the layer number enhances tapping (powder pressing) performance, thus increasing the density of powder.

Here, the vibration frequency FN of each fabrication layer is preferably stored in advance in, e.g., the RAM 503 of the controller 500 of the three-dimensional fabricating apparatus 601. In such a case, the vibration frequency FN of each fabrication layer is preferably determined in advance through experiments in consideration of conditions, such as the type of the powder 20, fabrication liquid, and the thickness of laminated layers.

Figure 54:
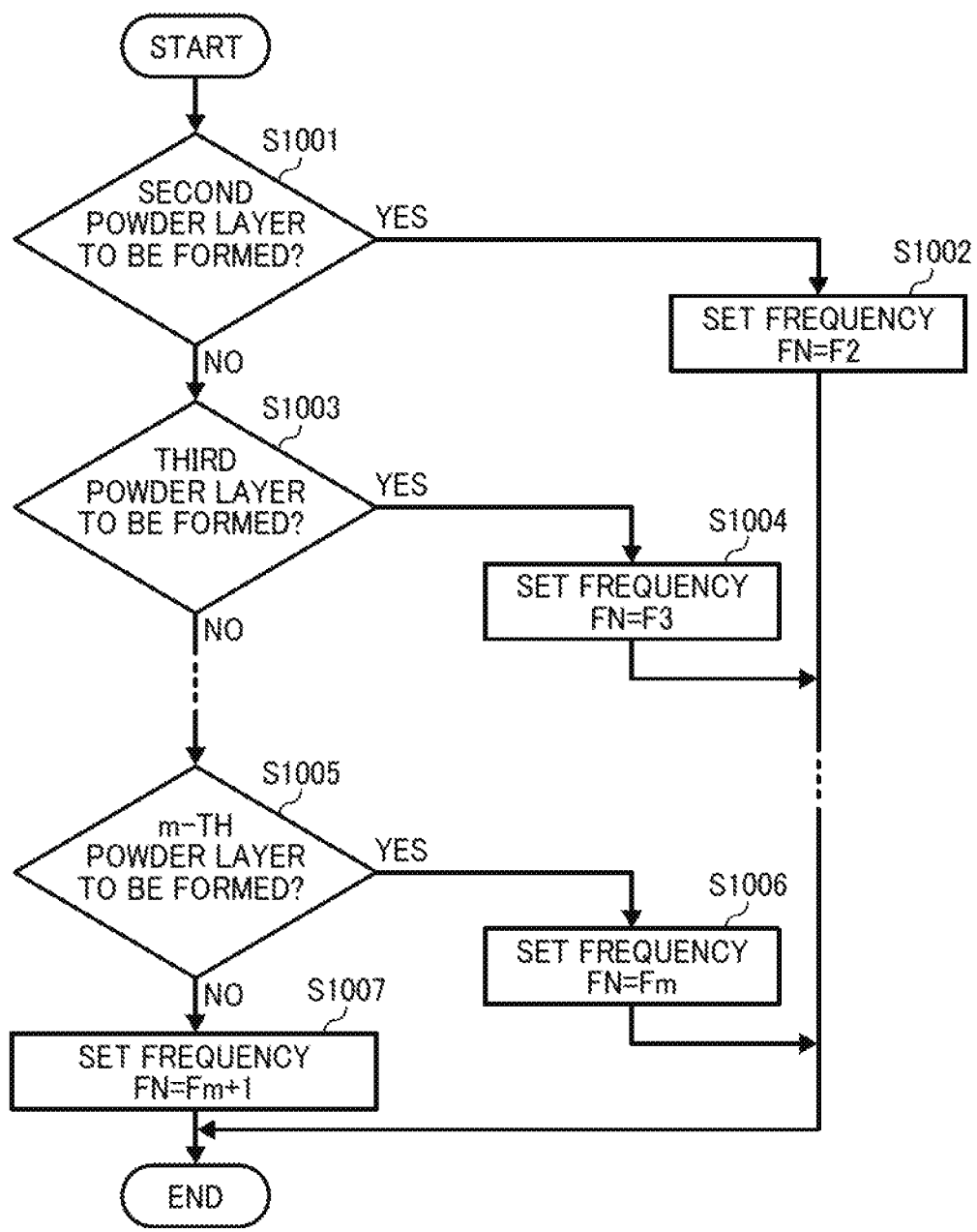
FIG. 54 is a flowchart of the vibration frequency control in a thirteenth embodiment of the present disclosure.

Next, a thirteenth embodiment of the present disclosure is described with reference to FIG. 54. FIG. 54 is a flowchart of the vibration frequency control in the thirteenth embodiment.

At S1001, the controller 500A determines the layer number of the powder layer 31 to be formed. When the powder layer 31 to be formed is a second powder layer (YES at S1001), at S1002 the controller 500A sets the vibration frequency FN of the vibration blade 110 to F2. When the powder layer 31 to be formed is a third powder layer (NO at S1001 and YES at S1003), at S1004 the controller 500A sets the vibration frequency FN to F3. The following steps are performed similarly. When the powder layer 31 to be formed is an m-th powder layer (m<n) (YES at S1005), at S1006 the controller 500A sets the vibration frequency FN to Fm. When the powder layer 31 to be formed is any layer of from an (m+1)th layer to an nth powder layer (NO at S1005), at S1007 the controller 500A sets the vibration frequency FN to Fm+1.

Here, the relation of A2>A3> . . . >Fm>Fm+1 is set. Until the layer number of the fabrication layer 30 reaches the m-th layer, the vibration frequency FN gradually increases (becomes higher) as the layer number of the fabrication layer 30 increases. For the (m+1)th and subsequent layers, the vibration frequency FN is fixed to Fm+1.

In other words, as described above, when a certain number of fabrication layers 30 are laminated, positional deviation and deformation does not occur or occurs at a substantially negligible amount in an upper one of the fabrication layers 30.

Hence, in the thirteenth embodiment, until the layer number reaches a predetermined threshold layer number m, the vibration frequency FN is reduced. When the layer number exceeds the predetermined threshold layer number m, the vibration frequency FN is set to a fixed value. Such a configuration prevents positional deviation and deformation of the fabrication layers, allows densification, and reduces the number of switching the vibration frequency FN, thus allowing more simple processing.

Figure 55:
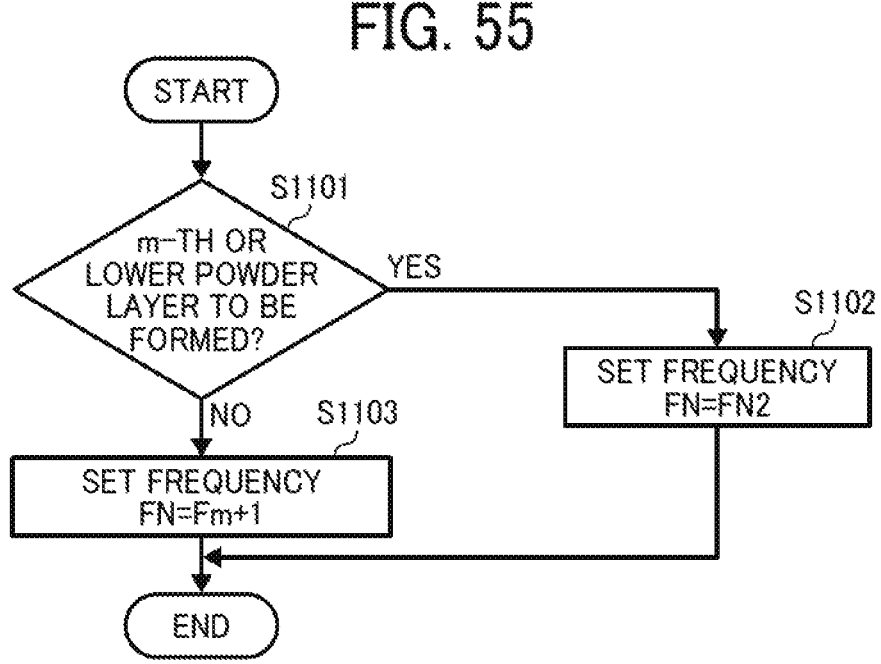
FIG. 55 is a flowchart of the vibration frequency control in a fourteenth embodiment of the present disclosure.

Next, a fourteenth embodiment of the present disclosure is described with reference to FIG. 55. FIG. 55 is a flowchart of the vibration frequency control in the fourteenth embodiment.

At S1101, the controller 500A determines the layer number of the powder layer 31 to be formed. When the powder layer 31 to be formed is an m-th or lower powder layer (YES at S1101), at S1102 the controller 500A sets the vibration frequency FN of the vibration blade 110 to F2. When the powder layer 31 to be formed is an (m+1)th or higher powder layer (NO at S1101), at S1103 the controller 500A sets the vibration frequency FN to Fm+1.

Here, the relation of F2>Fm+1 is set. The vibration frequency FN is stepwise switched based on the threshold layer number m of the fabrication layer 30. Even when the vibration frequency FN is the threshold layer number m or lower, the vibration frequency FN is reduced. When the vibration frequency FN exceeds the threshold layer number m, the vibration frequency FN is increased.

Such a configuration reduces the positional deviation and deformation of the fabrication layers, allows densification, and reduces the number of switching the vibration frequency FN to once, thus allowing still more simple processing than the above-described thirteenth embodiment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A three-dimensional fabrication apparatus comprising:
a fabrication chamber in which powder is layered to form a powder layer, the powder of the powder layer is bonded together in a desired shape to form a layered fabrication object, and another layered fabrication object is laminated on the layered fabrication object;
a liquid discharge device configured to discharge a fabrication liquid onto the powder in the fabrication chamber;
a vibration applicator configured to apply vibration to the powder layer onto which the fabrication liquid is discharged from the liquid discharge device; and
a controller configured to control the liquid discharge device to discharge the fabrication liquid onto the powder in the fabrication chamber and configured to control the vibration applicator to apply vibration to the powder layer when the liquid discharge device discharges the fabrication liquid onto the powder layer to form the layered fabrication object,
wherein the controller is configured to drive the vibration applicator prior to a start of the liquid discharge device discharging the fabrication liquid onto the powder layer to form the layered fabrication object and after an end of the liquid discharge device discharging the fabrication liquid,
wherein the controller is configured to drive the vibration applicator during a period from a start to an end of formation of the layered fabrication object in a single layer of the powder layer, and
wherein the controller is configured to drive the vibration applicator for a time period after the end of the liquid discharge device discharging the fabrication liquid, the time period being based on a viscosity of the discharging liquid.

2. The three-dimensional fabrication apparatus according to claim 1, further comprising a fabrication stage on which said another layered fabrication object is laminated on the layered fabrication object,
wherein the vibration applicator is disposed in the fabrication chamber, to apply vibration to the fabrication stage, and
wherein the vibration applicator is movable upward and downward in the fabrication chamber.

3. The three-dimensional fabrication apparatus according to claim 1, further comprising:
a flattening unit to flatten the powder supplied to the fabrication chamber to form the powder layer; and
another vibration applicator disposed forward in a direction of movement of the flattening unit in which the flattening unit moves when the flattening unit flattens the powder,
wherein said another vibration applicator applies vibration to the powder before the flattening unit flattens the powder.

4. The three-dimensional fabrication apparatus according to claim 3, wherein the controller is configured to continuously drive said another vibration applicator after the flattening unit passes above the fabrication chamber.

5. The three-dimensional fabrication apparatus according to claim 3, further comprising a common drive source to move the flattening unit and said another vibration applicator.

6. The three-dimensional fabrication apparatus according to claim 1, wherein the controller is configured to change at least one of frequency and amplitude of vibration of the vibration applicator.

7. The three-dimensional fabrication apparatus according to claim 1, further comprising a height adjuster to adjust a height of a contact surface of the vibration applicator to contact the powder.

8. The three-dimensional fabrication apparatus according to claim 3, wherein said another vibration applicator includes:
 a blade to contact the powder; and
 a vibrator to vibrate the blade,
 wherein the blade includes:
  a bottom portion disposed parallel to a surface of the powder in the fabrication chamber; and
  a slant portion upwardly slanted forward in the direction of movement of the flattening unit,
 wherein said another vibration applicator vibrates the blade in a direction vertical to the surface of the powder in the fabrication chamber.

9. The three-dimensional fabrication apparatus according to claim 8, further comprising a vibration driver to stop driving of the vibrator after the vibrator passes above the fabrication chamber and to restart driving of the vibrator.

10. The three-dimensional fabrication apparatus according to claim 1, wherein at least one of frequency and amplitude of variation of the vibration applicator is gradually or stepwisely greater as a number of lamination of the layered fabrication object is greater.

11. A three-dimensional fabrication apparatus comprising:
 a fabrication chamber in which powder is layered to form a powder layer, the powder of the powder layer is bonded together in a desired shape to form a layered fabrication object, and another layered fabrication object is laminated on the layered fabrication object;
 a liquid discharge device to discharge a fabrication liquid onto the powder in the fabrication chamber;
 a flattening unit to flatten the powder supplied to the fabrication chamber to from the powder layer; and
 a vibration applicator to apply vibration to the powder when the powder is supplied to the fabrication chamber,
 wherein, when the vibration applicator applies to vibration to the powder supplied onto a surface of the powder layer, in which the layered fabrication object has been formed, a gap between a contact surface of the vibration applicator to contact the powder and the surface of the powder layer on which the powder is supplied is maximum when the powder is supplied to the powder layer in which at least a lowermost layered fabrication object has been formed,
 wherein the flattening unit includes a flattening roller, and the vibration applicator is attached to the flattening roller such that the flattening roller and the vibration applicator move together along the fabrication chamber.

12. The three-dimensional fabrication apparatus according to claim 11, wherein the gap is gradually or stepwisely lower as a number of lamination of the layered fabrication object is greater.

13. The three-dimensional fabrication apparatus according to claim 3, wherein the flattening unit includes a flattening roller, said another vibration applicator is attached to the flattening roller such that the flattening roller and said another vibration applicator move together along the fabrication chamber.

* * * * *